US012478533B2

(12) United States Patent
Lim et al.

(10) Patent No.: US 12,478,533 B2
(45) **Date of Patent: *Nov. 25, 2025**

(54) SURGICAL FRAME FACILITATING ARTICULATABLE SUPPORT FOR A PATIENT DURING SURGERY AND METHOD FOR USE THEREOF

(71) Applicant: Warsaw Orthopedic, Inc., Warsaw, IN (US)

(72) Inventors: Roy Lim, Germantown, TN (US); Matthew Morrison, Cordova, TN (US); Richard Hynes, Melbourne Beach, FL (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 314 days.

This patent is subject to a terminal disclaimer.

(21) Appl. No.: 18/125,397

(22) Filed: Mar. 23, 2023

(65) Prior Publication Data

US 2023/0225922 A1 Jul. 20, 2023

Related U.S. Application Data

(63) Continuation of application No. 17/103,431, filed on Nov. 24, 2020, now Pat. No. 11,612,533, which is a (Continued)

(51) Int. Cl.
*A61G 13/08* (2006.01)
*A61G 13/00* (2006.01)
(Continued)

(52) U.S. Cl.
CPC ......... *A61G 13/08* (2013.01); *A61G 13/0054* (2016.11); *A61G 13/02* (2013.01);
(Continued)

(58) Field of Classification Search
CPC .... A61G 13/08; A61G 13/0054; A61G 13/02; A61G 13/04; A61G 13/06; A61G 13/121;
(Continued)

(56) References Cited

U.S. PATENT DOCUMENTS 2,691,979 A 10/1954 Watson
3,060,925 A 10/1962 Honsaker et al.
(Continued)

FOREIGN PATENT DOCUMENTS

CN 2100875 U 4/1992
CN 201185976 1/2009
(Continued)

OTHER PUBLICATIONS

Examination Report dated Apr. 8, 2020 from Australian Application No. 2016308175.

(Continued)

*Primary Examiner* — Myles A Throop

(57) ABSTRACT

A positioning frame and method for use thereof for supporting a patient to facilitate different surgical approaches to the spine is provided. The positioning frame includes a main support beam, first and second support structures, a torso-lift support, and a pelvic-tilt support. The main support beam has a first end, a second end, and a length extending between the first and second ends. The main support beam defines and is rotatable an axis of rotation relative to at least the first and second support structures to adjust the rotatable position of the patient support thereby. The torso-lift support is attached to the main support beam, and is configured to pivot to move the torso of the patient between an unlifted position and a lifted position. The pelvic-tilt support is also attached to the main support beam, and is configured to support and move the thighs and the lower legs of the patient to facilitate adjustment of the hips of the patient.

20 Claims, 45 Drawing Sheets

Related U.S. Application Data continuation of application No. 15/239,256, filed on Aug. 17, 2016, now Pat. No. 10,966,892.

(60) Provisional application No. 62/314,950, filed on Mar. 29, 2016, provisional application No. 62/206,064, filed on Aug. 17, 2015.

(51) Int. Cl.
*A61G 13/02* (2006.01)
*A61G 13/04* (2006.01)
*A61G 13/06* (2006.01)
*A61G 13/12* (2006.01)

(52) U.S. Cl.
CPC ............. *A61G 13/04* (2013.01); *A61G 13/06* (2013.01); *A61G 13/121* (2013.01); *A61G 13/122* (2013.01); *A61G 13/123* (2013.01); *A61G 13/1235* (2013.01); *A61G 13/1245* (2013.01); *A61G 13/125* (2013.01); *A61G 13/129* (2013.01); *A61G 13/1295* (2013.01); *A61G 2200/322* (2013.01); *A61G 2200/325* (2013.01)

(58) Field of Classification Search
CPC ................ A61G 13/122; A61G 13/123; A61G 13/1235; A61G 13/1245; A61G 13/125; A61G 13/129; A61G 13/1295; A61G 2200/322; A61G 2200/325; A61G 2203/74
See application file for complete search history.

(56) References Cited

U.S. PATENT DOCUMENTS

| | | | |
|---|---|---|---|
| 3,227,440 | A | 1/1966 | Scott |
| 3,293,667 | A | 12/1966 | Ohrberg |
| 3,306,287 | A | 2/1967 | Arp |
| 3,389,702 | A | 6/1968 | Kennedy |
| 3,828,377 | A | 8/1974 | Fary, Sr. |
| 4,029,089 | A | 6/1977 | Mulhlland |
| 4,194,257 | A | 3/1980 | Martin et al. |
| 4,397,051 | A | 8/1983 | Wheeler |
| 4,446,587 | A | 5/1984 | Jump |
| 4,627,119 | A | 12/1986 | Hachey et al. |
| 4,655,200 | A | 4/1987 | Knight |
| 4,705,026 | A | 11/1987 | Chaussy |
| 4,866,796 | A | 9/1989 | Robinson |
| 4,872,656 | A | 10/1989 | Brendgord |
| 4,901,384 | A | 2/1990 | Eary |
| 4,915,101 | A | 4/1990 | Cuccia |
| 5,005,233 | A | 4/1991 | Toivio et al. |
| 5,009,407 | A | 4/1991 | Watanabe |
| 5,088,706 | A | 2/1992 | Jackson |
| 5,103,511 | A | 4/1992 | Sequin |
| 5,131,106 | A | 7/1992 | Jackson |
| 5,362,302 | A | 11/1994 | Jenson et al. |
| 5,390,383 | A | 2/1995 | Carn |
| 5,406,658 | A | 4/1995 | Olkkonen et al. |
| 5,410,769 | A | 5/1995 | Waterman |
| 5,444,882 | A | 8/1995 | Andrews |
| 5,544,371 | A | 8/1996 | Fuller |
| 5,570,482 | A | 11/1996 | Asakawa |
| 5,613,254 | A | 3/1997 | Clayman |
| 5,642,302 | A | 6/1997 | Dumont |
| 5,673,443 | A | 10/1997 | Marmor |
| 5,860,899 | A | 1/1999 | Rassman |
| 5,991,651 | A | 11/1999 | LaBarbera |
| 6,003,176 | A | 12/1999 | Wasley |
| 6,076,525 | A | 6/2000 | Hoffman |
| 6,112,349 | A | 9/2000 | Connolly |
| 6,154,901 | A | 12/2000 | Carr |
| 6,260,220 | B1 | 7/2001 | Lamb |
| 6,295,671 | B1 | 10/2001 | Reesby et al. |
| 6,311,349 | B1 | 11/2001 | Kazakia |
| 6,367,104 | B1 | 4/2002 | Fallbo, Sr. et al. |
| 6,378,149 | B1 | 4/2002 | Sanders et al. |
| 6,516,483 | B1 | 2/2003 | VanSteenburg |
| 6,566,833 | B2 | 5/2003 | Barlett |
| 6,615,430 | B2 | 9/2003 | Heimbrock |
| 6,671,905 | B2 | 1/2004 | Bartlett et al. |
| 6,681,423 | B2 | 1/2004 | Zachrisson |
| 6,701,553 | B1 | 3/2004 | Hand et al. |
| 6,701,554 | B2 | 3/2004 | Heimbrock |
| 6,701,558 | B2 | 3/2004 | VanSteenburg |
| 6,715,169 | B2 | 4/2004 | Niederkrom |
| 6,728,983 | B2 | 5/2004 | Bartlett et al. |
| 6,732,390 | B2 | 5/2004 | Krywiczanin |
| 6,739,006 | B2 | 5/2004 | Borders et al. |
| 6,820,621 | B2 | 11/2004 | DeMayo |
| 6,874,181 | B1 | 4/2005 | Connolly et al. |
| 6,934,986 | B2 | 8/2005 | Krywiczanin et al. |
| 6,941,951 | B2 | 9/2005 | Hubert et al. |
| 6,966,081 | B1 | 11/2005 | Sharps |
| 7,100,225 | B1 | 9/2006 | Bailey |
| 7,152,261 | B2 | 12/2006 | Jackson |
| 7,189,214 | B1 | 3/2007 | Saunders |
| 7,219,379 | B2 | 5/2007 | Krywiczanin et al. |
| 7,234,180 | B2 | 6/2007 | Horton et al. |
| 7,290,302 | B2 | 11/2007 | Sharps |
| 7,426,930 | B1 | 9/2008 | Bailey |
| 7,472,440 | B2 | 1/2009 | Bartlett et al. |
| 7,484,253 | B1 | 2/2009 | Coppens |
| 7,496,980 | B2 | 3/2009 | Sharps |
| 7,600,281 | B2 | 10/2009 | Skripps |
| 7,669,262 | B2 | 3/2010 | Skripps |
| 7,739,762 | B2 | 6/2010 | Lamb et al. |
| 7,882,583 | B2 | 2/2011 | Skripps |
| 8,118,029 | B2 | 2/2012 | Gneiting et al. |
| 8,286,283 | B2 | 10/2012 | Copeland et al. |
| 8,286,637 | B2 | 10/2012 | Kaska |
| 8,407,831 | B2 | 4/2013 | White et al. |
| 8,413,660 | B2 | 4/2013 | Weinstein et al. |
| 8,439,948 | B1 | 5/2013 | King |
| 8,443,473 | B2 | 5/2013 | Maxwell |
| 8,584,281 | B2 | 11/2013 | Diel et al. |
| 8,635,725 | B2 | 1/2014 | Tannoury et al. |
| 8,726,431 | B2 | 5/2014 | Sverdlik et al. |
| 9,072,646 | B2 | 7/2015 | Skripps et al. |
| 9,265,680 | B2 | 2/2016 | Sharps |
| 9,339,430 | B2 | 5/2016 | Jackson et al. |
| 9,358,170 | B2 | 6/2016 | Jackson |
| 9,414,982 | B2 | 8/2016 | Jackson |
| 9,498,397 | B2 | 11/2016 | Hight et al. |
| 9,522,078 | B2 | 12/2016 | Pizzini |
| 9,554,959 | B2 | 1/2017 | Carn |
| 9,655,793 | B2 | 5/2017 | Hertz |
| 9,700,476 | B2 | 7/2017 | Hoel et al. |
| 9,713,562 | B2 | 7/2017 | Perlman et al. |
| 9,744,089 | B2 | 8/2017 | Jackson |
| 9,937,006 | B2 | 4/2018 | Skripps et al. |
| 9,993,380 | B2 | 6/2018 | Jackson |
| 10,136,863 | B2 | 11/2018 | Kaiser et al. |
| 10,314,758 | B2 | 6/2019 | Dolliver et al. |
| 10,342,722 | B2 | 7/2019 | Garrido |
| 10,406,054 | B1 | 9/2019 | Scholl et al. |
| 10,426,684 | B2 | 10/2019 | Dubois et al. |
| 10,543,142 | B2 | 1/2020 | Lim et al. |
| 10,548,796 | B2 | 2/2020 | Lim et al. |
| 10,576,006 | B2 | 3/2020 | Lim et al. |
| 10,695,252 | B2 | 6/2020 | Jackson |
| 10,722,413 | B2 | 7/2020 | Lim et al. |
| 10,729,607 | B2 | 8/2020 | Jackson |
| 10,751,240 | B2 | 8/2020 | Lim et al. |
| 10,835,438 | B2 | 11/2020 | Jackson |
| 10,835,439 | B2 | 11/2020 | Lim et al. |
| 10,849,809 | B2 | 12/2020 | Lim et al. |
| 10,874,570 | B2 | 12/2020 | Lim et al. |
| 10,881,570 | B2 | 1/2021 | Lim et al. |
| 10,888,484 | B2 | 1/2021 | Lim et al. |
| 10,893,996 | B2 | 1/2021 | Lim et al. |
| 10,898,401 | B2 | 1/2021 | Lim et al. |
| 10,900,448 | B2 | 1/2021 | Lim et al. |

(56) References Cited

U.S. PATENT DOCUMENTS 11,612,533 B2* 3/2023 Lim .................. A61G 13/1295 5/607
2002/0138905 A1 10/2002 Barltett et al.
2002/0138906 A1 10/2002 Barltett et al.
2002/0157186 A1 10/2002 VanSteenburg
2003/0140419 A1 7/2003 Barltett et al.
2003/0140420 A1 7/2003 Niederkrom
2003/0145382 A1 8/2003 Krywiczanin
2003/0178027 A1 9/2003 DeMayo et al.
2004/0010849 A1 1/2004 Krywiczanin et al.
2004/0133983 A1 7/2004 Newkirk
2005/0132495 A1 6/2005 Girard et al.
2005/0181917 A1 8/2005 Dayal
2006/0037141 A1 2/2006 Krywiczanin et al.
2006/0123546 A1 6/2006 Horton
2006/0162076 A1 7/2006 Bartlett et al.
2006/0162084 A1 7/2006 Mezue
2007/0113336 A1 5/2007 Sharps
2008/0034502 A1 2/2008 Copeland et al.
2008/0134434 A1 6/2008 Celauro
2008/0222811 A1 9/2008 Gilbert et al.
2009/0139030 A1 6/2009 Yang
2010/0037397 A1 2/2010 Wood
2010/0051303 A1 3/2010 Ullrich et al.
2010/0192300 A1 8/2010 Tannoury
2010/0293719 A1 11/2010 Klemm et al.
2011/0099716 A1 5/2011 Jackson
2012/0103344 A1 5/2012 Hunter
2012/0144589 A1 6/2012 Skripps et al.
2012/0255122 A1 10/2012 Diel et al.
2013/0111666 A1 5/2013 Jackson
2013/0133137 A1 5/2013 Jackson
2013/0191994 A1 8/2013 Bellows et al.
2013/0283526 A1 10/2013 Gagliardi
2013/0307298 A1 11/2013 Meiki
2014/0020183 A1 1/2014 Dominick
2014/0059773 A1 3/2014 Carn
2014/0068861 A1* 3/2014 Jackson ................. A61G 13/08 5/624
2014/0109316 A1 4/2014 Jackson et al.
2014/0137327 A1 5/2014 Tannoury et al.
2014/0250598 A1 9/2014 Sharps et al.
2015/0044956 A1 2/2015 Hacker
2015/0245971 A1 9/2015 Bernardoni et al.
2015/0272681 A1 10/2015 Skripps et al.
2015/0283006 A1 10/2015 Akins
2016/0000621 A1 1/2016 Jackson
2016/0000627 A1 1/2016 Jackson et al.
2016/0081582 A1 3/2016 Rapoport
2016/0089287 A1 3/2016 Buerstner
2016/0193099 A1 7/2016 Drake
2017/0027797 A1 2/2017 Dolliver et al.
2017/0049651 A1* 2/2017 Lim ..................... A61G 13/125
2017/0049653 A1 2/2017 Lim
2017/0079864 A1 3/2017 Riley
2017/0112698 A1 4/2017 Hight et al.
2017/0135891 A1 5/2017 Kettner
2017/0151115 A1 6/2017 Jackson
2017/0341232 A1 11/2017 Perplies
2017/0348171 A1 12/2017 Jackson
2018/0116891 A1 5/2018 Beale et al.
2018/0185228 A1 7/2018 Catacchio et al.
2018/0193104 A1 7/2018 Beale et al.
2018/0363596 A1* 12/2018 Lim ................... F02M 31/0825
2019/0000702 A1 1/2019 Lim et al.
2019/0000707 A1* 1/2019 Lim ................... A61G 13/1235
2019/0029906 A1 1/2019 Konsin et al.
2019/0046381 A1 2/2019 Lim et al.
2019/0046383 A1* 2/2019 Lim ..................... A61G 13/123
2019/0209409 A1 7/2019 Jackson et al.
2020/0000668 A1 1/2020 Lim et al.
2020/0060913 A1 2/2020 Lim et al.
2020/0060914 A1 2/2020 Lim et al.
2020/0060915 A1* 2/2020 Lim ....................... A61G 13/08
2020/0138659 A1 5/2020 Lim et al.
2020/0138660 A1 5/2020 Jackson
2020/0170868 A1 6/2020 Jackson
2020/0188208 A1 6/2020 Lim et al.
2020/0281788 A1 9/2020 Lim et al.
2020/0297568 A1* 9/2020 Lim ....................... A61G 7/015
2020/0337923 A1 10/2020 Lim et al.
2020/0337926 A1* 10/2020 Lim .................. A61G 13/1285
2020/0337927 A1* 10/2020 Lim ....................... A61G 13/04
2020/0360214 A1 11/2020 Lim et al.
2021/0069047 A1 3/2021 Lim et al.
2021/0085550 A1 3/2021 Lim et al.
2021/0330532 A1 10/2021 Lim et al.
2021/0330536 A1 10/2021 Lim et al.
2021/0330537 A1 10/2021 Lim et al.
2022/0241128 A1 8/2022 Newkirk et al.
2024/0050298 A1 2/2024 Lim et al.

FOREIGN PATENT DOCUMENTS

CN 103298440 A 9/2013
EP 3158986 4/2017
EP 3434248 1/2019
EP 3900689 10/2021
EP 3900690 10/2021
FR 3092990 8/2020
JP 2012-228509 11/2012
JP 5237301 7/2013
JP 2017099859 6/2017
JP 2017113528 6/2017
JP 2018069048 5/2018
WO WO9321853 11/1993
WO 9835643 8/1998
WO 2000062731 10/2000
WO 2007058673 5/2007
WO 2017031225 2/2017
WO 2017139548 8/2017
WO 2017218683 12/2017
WO 2019032491 2/2019
WO 2021158769 8/2021

OTHER PUBLICATIONS

Examination Report dated Jan. 3, 2021 from Australian Application No. 2016308175.
Office Action and Search Report issued Aug. 27, 2019 for corresponding Chinese application No. 201680046857.4.
Second Office Action dated Mar. 24, 2020 from Chinese Application No. 201680046857.4.
Office Action issued Dec. 17, 2019 for corresponding Japanese Application No. 2018-504646 with English translation.
International Search Report dated Nov. 21, 2016 from International Application No. PCT/US2016/047394.
Extended Search Report issued Mar. 20, 2019 for corresponding EP Application No. 16837764.6.
Written Opinion of International Searching Authority issued Nov. 21, 2016 for International Application No. PCT/US2016/047394.
International Preliminary Report on Patentability issued Feb. 20, 2018 for PCT/US2016/047394.
Office Action issued Jun. 2, 2020 for Japanese application No. 2018-566265 with English translation.
International Search Report and Written Opinion dated Dec. 4, 2018 in PCT/US2018/045480.
International Preliminary Report on Patentability and Written Opinion dated Feb. 11, 2020 in PCT/US2018/045480.
International Search Report and Written Opinion dated Dec. 4, 2019 from International Application No. PCT/US2019/046979.

* cited by examiner

SURGICAL FRAME FACILITATING ARTICULATABLE SUPPORT FOR A PATIENT DURING SURGERY AND METHOD FOR USE THEREOF

The present application is a continuation of U.S. application Ser. No. 17/103,431, filed Nov. 24, 2020; which is a continuation of U.S. application Ser. No. 15/239,256, filed Aug. 17, 2016; and claims benefit of U.S. Provisional Application No. 62/206,064, filed Aug. 17, 2015, and of U.S. Provisional Application No. 62/314,950, filed Mar. 29, 2016; all of which are incorporated by reference herein.

BACKGROUND OF THE INVENTION

Field of the Invention

The present invention relates to a surgical frame for supporting a patient during surgery. The surgical frame includes components that can be adjusted to facilitate positioning and repositioning of a patient during surgery and/or to accommodate differently sized patients. The components of the surgical frame are configured to afford supported movement of a patient during surgery. Preferred components of the surgical frame afford adjustment of the position of the upper body (including the head, shoulders, arms, and chest), and the lower body (including the hips, legs, and feet) of a patient. Additionally, the surgical frame includes components that afford movement of the entirety of the surgical frame. In doing so, the entirety of the surgical frame can be pivoted to further adjust the position of a patient during surgery including between a prone position and a lateral position. In a preferred embodiment of the surgical frame the patient can be positioned in a prone position, a lateral position, or an angled position therebetween, by way of example, at a 45 degree angle.

Description of the Prior Art

Traditionally, it has been difficult to articulate the bodies of patients during surgery. It is inherently difficult to position and reposition a patient under general anesthesia. To illustrate, multiple operating room personnel may be required for positioning a patient to afford a first surgical approach, and repositioning the patient to afford a second surgical approach may again require multiple operating room personnel.

Given the inherent difficulty in moving a patient during surgery, there exists a need for a surgical frame for supporting a patient thereon that affords positioning and repositioning of the patient to afford multiple surgical approaches.

SUMMARY OF THE INVENTION

The present invention in one preferred embodiment contemplates a positioning frame for supporting a patient, the positioning frame including at least one main beam having a first end, a second end, and a length extending between the first and second end, the at least one main beam defining an axis of rotation relative to at least a first support structure and a second support structure, the at least one main being rotatable about the axis of rotation between at least a first position and a second position, the axis of rotation substantially corresponding to a cranial-caudal axis of the patient when the patient is supported on the positioning frame; the first and second support structures supporting the at least one main beam, the first and second support structure spacing the at least one main beam from the ground; a torso-lift support attached to the at least one main beam, the torso-lift support including a chest support plate being configured to support the chest of the patient, the torso-lift support being pivotally connected to the at least one main beam, the torso-lift support being configured to pivot the chest support plate between at least a first position and a second position to move the torso of the patient between an unlifted position and a lifted position; and a pelvic-tilt support attached to the at least one main beam, the pelvic-tilt support including a thigh cradle and a lower leg cradle, the thigh support being configured to support the thighs of the patient, and the lower leg cradle being configured to support the lower legs of the patient, the thigh cradle and the lower leg cradle being pivotal with respect to one another to facilitate adjustment of the hips of the patient.

The present invention in another preferred embodiment contemplates A positioning frame for supporting a patient, the positioning frame including at least one main beam having a first end, a second end, and a length extending between the first and second end, the at least one main beam defining an axis of rotation relative to at least a first support structure and a second support structure, the at least one main being rotatable about the axis of rotation between at least a first position and a second position, the axis of rotation substantially corresponding to a cranial-caudal axis of the patient when the patient is supported on the positioning frame; the first and second support structures supporting the at least one main beam, the first and second support structure spacing the at least one main beam from the ground; a torso-lift support attached to the at least one main beam, the torso-lift support including a chest support plate being configured to support the chest of the patient, the torso-lift support being pivotally connected to the at least one main beam, the torso-lift support being configured to pivot the chest support plate between at least a first position and a second position to move the torso of the patient between an unlifted position and a lifted position; a pelvic-tilt support attached to the at least one main beam, the pelvic-tilt support including a thigh cradle and a lower leg cradle, the thigh support being configured to support the thighs of the patient, and the lower leg cradle being configured to support the lower legs of the patient, the thigh cradle and the lower leg cradle being pivotal with respect to one another to facilitate adjustment of the hips of the patient; a coronal adjustment assembly attached to the at least one main beam, the coronal adjustment assembly being configured to move at least a portion of the torso of the patient away from a portion of the at least one main beam; and at least one actuator for articulating at least one of the at least one main beam, the torso-lift support, the pelvic-tilt support, and the coronal adjustment assembly.

The present invention in yet another preferred embodiment contemplates a method of performing surgical using a positioning frame to position portions of the body of a patient, the method including positioning the patient on the positioning frame by approximately aligning the cranial-caudal axis of the body of the patient with an axis of rotation of a main support beam; supporting the torso of the patient on a torso-lift support, the torso-lift support being attached to the main support beam; supporting the thighs and lower legs of the patient on a pelvic-tilt support; the pelvic-tilt support being attached to the main support beam; and rotating the main support being about the axis of rotation there to move the patient between a first position and a second position, the patient being in a prone position in the first position and in a lateral position in the second position.

The present invention in yet another preferred embodiment contemplates an adjustable surgical frame for supporting a patient to facilitate different surgical approaches to the spine of the patient, the adjustable surgical frame including a first end, an opposite second end, and a length extending between the first and second ends thereof, the surgical frame having a longitudinal axis extending between the first and second ends along the length thereof, the surgical frame being moveable between a first position, a second position, and a third position, the surgical frame being supported by a first support surface in the first position, a second support surface in the second position, and a third support surface in the third position, a chest support being configured to support the chest of the patient on the surgical frame, at least a portion of the chest support being movable in a direction transverse to the longitudinal axis of the surgical frame to facilitate positioning and repositioning of the chest of the patient thereon, a hip and upper leg support being configured to support the hips and upper legs of the patient on the surgical frame, at least a portion of the hip and upper leg support being pivotally adjustable to facilitate positioning and repositioning of the hips and upper legs of the patient, and a feet and lower leg support being configured to support the feet and the lower legs of the patient on the surgical frame, at least a portion of the feet and lower leg support being moveable in a direction aligned with the longitudinal axis of the surgical frame to facilitate positioning and repositioning of the feet and lower legs of the patient, where the coronal plane of the patient is oriented approximately horizontal when the surgical frame is in the first position, the coronal plane of the patient is oriented approximately 45° with respect to horizontal and vertical when the surgical frame is in the second position, the coronal plane of the patient is oriented approximately vertical when the surgical frame is in the third position.

The present invention in yet another preferred embodiment contemplates a method including providing the surgical frame having a first end, an opposite second end, and a length extending between the first and second ends, the surgical frame having a longitudinal axis extending between the first and second ends along the length thereof, the surgical frame including at least a chest support, a hip and upper leg support, and a feet and lower leg support, adjusting the chest support, the hip and upper leg support, and the feet and lower leg support to accommodate the size of the patient, positioning the patient on the surgical frame by contacting portions the chest of the patient with the chest support, contacting portions of the hips and upper legs of the patient with the hip and upper leg support, and contacting at least the feet of the patient with the feet and lower leg support, moving the surgical frame between a first position, a second position, and a third position, and performing surgery on the patient when the surgical frame is disposed in the first, second, and third positions, where the coronal plane of the patient is oriented approximately horizontal when the surgical frame is in the first position and the patient is supported thereby, the coronal plane of the patient is oriented approximately 45° with respect to horizontal and vertical when the surgical frame is in the second position and the patient is supported thereby, and the coronal plane of the patient is oriented approximately vertical when the surgical frame is in the third position and the patient is supported thereby.

The present invention in yet another preferred embodiment contemplates an adjustable surgical frame for supporting a patient to facilitate different surgical approaches to the spine of the patient, the adjustable surgical frame having a first end, an opposite second end, and a length extending between the first and second ends thereof, the surgical frame having a longitudinal axis extending between the first and second ends along the length thereof, the surgical frame having a first support surface, a second support surface, and a third support surface, a chest support, at least a portion of the chest support being movable in a direction transverse to the longitudinal axis of the surgical frame to facilitate positioning and repositioning of the chest of the patient thereon, a hip and upper leg support, at least a portion of the hip and upper leg support being pivotally adjustable to facilitate positioning and repositioning of the hips and upper legs of the patient, a feet and lower leg support, at least a portion of the feet and lower leg support being moveable in a direction aligned with the longitudinal axis of the surgical frame to facilitate positioning and repositioning of the feet and lower legs of the patient, where a first plane extends through the surgical frame, and the surgical frame is moveable between and supports the patient in a first position, a second position, and a third position, the surgical frame being supported by the first support surface in the first position, the second support surface in the second position, and the third support surface in the third position, the first plane being oriented approximately horizontal when the surgical frame is in the first position, the first plane being oriented approximately 45° with respect to horizontal and vertical when the surgical frame is in the second position, and the first plane being oriented approximately vertical when the surgical frame is in the third position.

These and other objects of the present invention will be apparent from review of the following specification and the accompanying drawings.

BRIEF DESCRIPTION OF THE DRAWINGS

The accompanying drawings, which are incorporated in and constitute a part of the specification, illustrate preferred embodiments of the invention and, together with the description, serve to explain the objects, advantages, and principles of the invention. In the drawings.

DETAILED DESCRIPTION OF THE PREFERRED EMBODIMENTS

The following description is intended to be representative only and not limiting. Many variations, therefore, can be anticipated according to these teachings. For example, a dynamic surgical table system is disclosed in U.S. Pat. No. 7,234,180, the contents of which are incorporated herein by reference. Reference will now be made in detail to the preferred embodiments of this invention, examples of which are illustrated in the accompanying drawings.

As depicted in FIGS. 1A-5C, a surgical frame is generally indicated by the numeral 10. The surgical frame 10 is provided to facilitate positioning and repositioning of a patient P during surgery and/or to accommodate differently sized patients. To that end, the surgical frame 10 includes various features that facilitate supported movement of the patient P (FIG. 2A) during surgery. As discussed below, the surgical frame 10 affords positioning and repositioning of the upper body (including the chest), hips, legs, and feet of the patient P during surgery and/or to accommodate differently sized patients. Furthermore, the surgical frame 10 includes various features that facilitate pivotal movement of the entire surgical frame 10. In doing so, the surgical frame 10 can be pivoted to move the patient P from a prone-supported position, to a 45°-supported position, to a side-supported position, and back again.

Figure 1A:
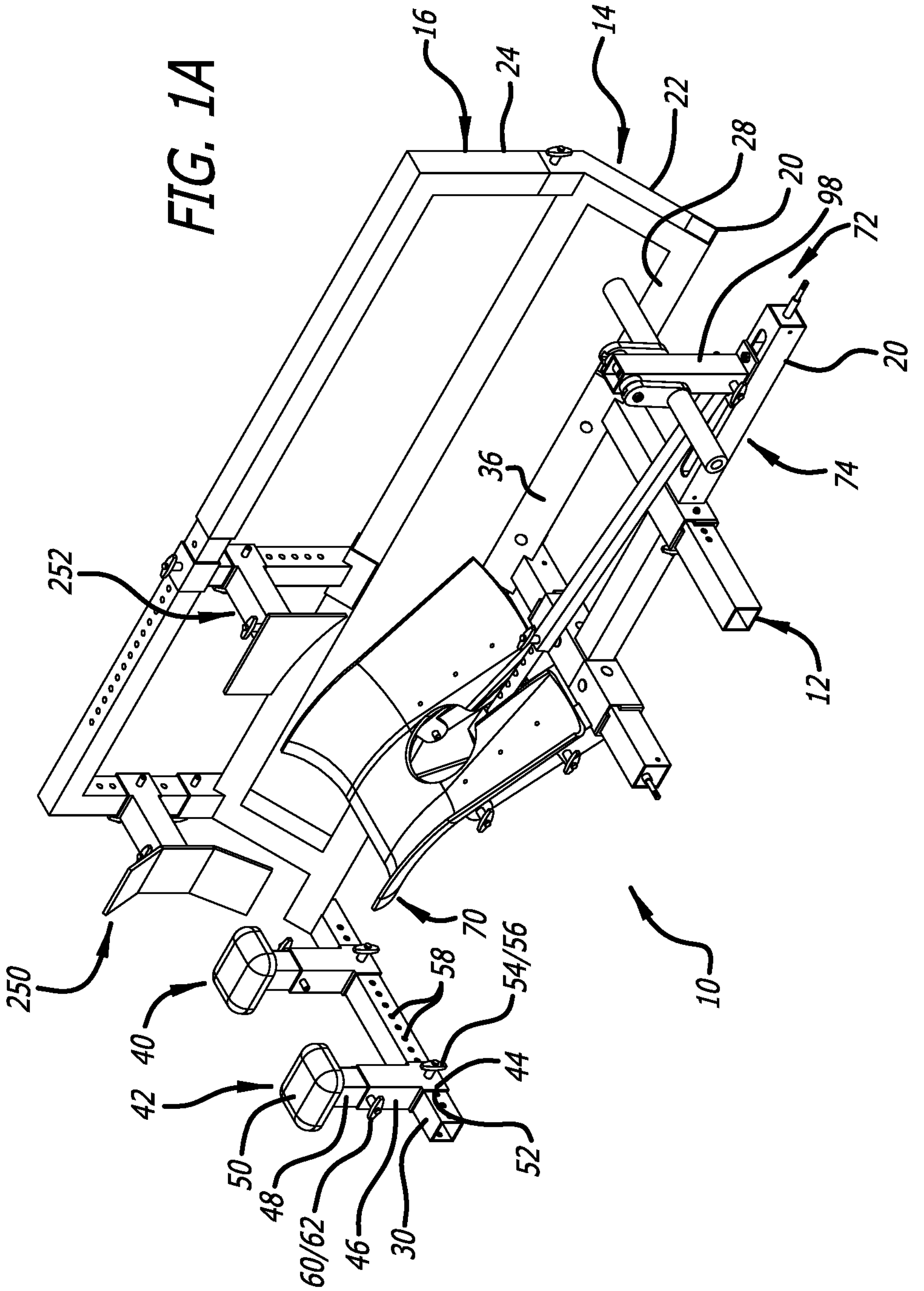
FIG. 1A is a top perspective view of a surgical frame according to the present invention.

As depicted in FIG. 1A, the surgical frame 10 includes a first portion 12, a second portion 14, and a third portion 16. As discussed below, the first and second portions 12 and 14 share some components therebetween, and the second and third portions 14 and 16 share some components therebetween. The first portion 12 includes support surfaces 20 that support the surgical frame 10 such that the patient P can be supported in the prone position, the second portion 14 includes support surfaces 22 that support the surgical frame 10 such that the patient P can be supported in the 45°-supported position, and the third portion 16 includes support surfaces 24 that support the surgical frame 10 such that the patient P can be supported in the side-supported position.

Figure 1B:
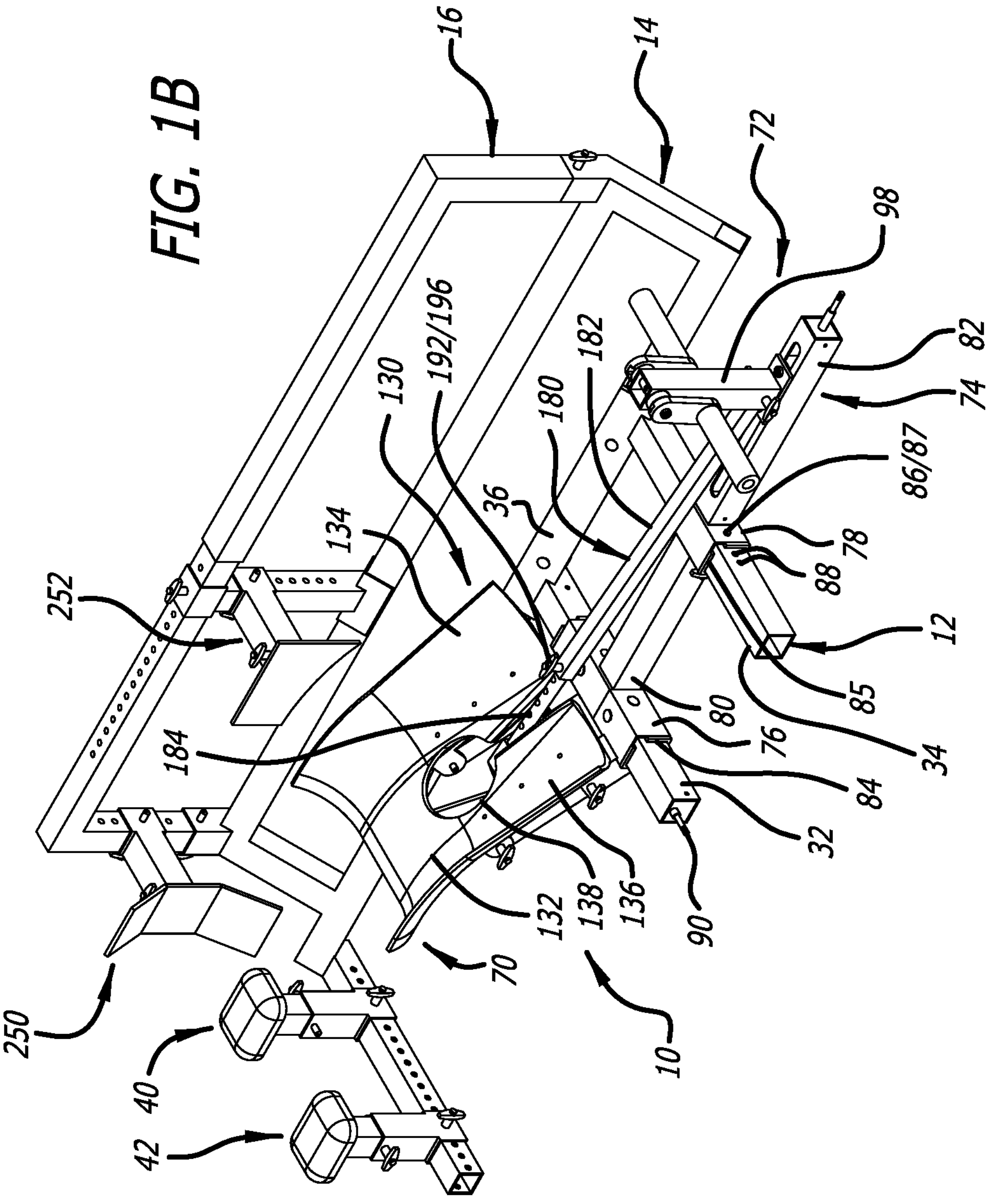
FIG. 1B is the perspective view of FIG. 1A identifying additional features thereof.

The first portion 12 includes various frame members. The first portion 12 includes a first frame member 28, a second frame member 30, a third frame member 32 (FIG. 1B), and a fourth frame member 34 (FIG. 1B). The third and fourth frame members 32 and 34 can be integrally formed with the first frame member 28. However, to afford an additional degree of movement, the third and fourth frame members 32 and 34 can be attached to a moveable frame member 36. As depicted in FIG. 1A, the second frame member 30 extends outwardly from the first frame member 28, and the third and fourth frame members 32 and 34 extend outwardly from the moveable frame member 36. The moveable frame member 36 includes a cavity 38 (FIG. 1E) for receiving the first frame member 28 therethrough, and the moveable frame member 36 is slidable along the first frame member 28. The moveable frame member 36 affords repositioning of the third and fourth frame members 32 and 34 along the first frame member 28 relative to the remainder of the surgical frame 10. The first frame member 28 and the moveable frame member 36 are axially aligned with the longitudinal axis of the surgical frame 10, and the second, third, and fourth frame members 30, 32, and 34 are perpendicular with respect to the first axially-aligned member 28.

The second frame member 30 supports first and second chest support mechanisms 40 and 42. Each of the first and second chest support mechanisms 40 and 42 include a collar portion 44, an upright portion 46, an extension portion 48, and a chest pad 50. As discussed below, components of the first and second chest support mechanisms 40 and 42 can be adjusted to position and reposition the upper body (including the chest) of the patient P during surgery and/or to accommodate differently sized patients.

The collar portions 44 of the first and second chest support mechanisms 40 and 42 are moveable with respect to the second frame member 30, and the extension portions 48 are moveable with respect to the upright portions 46. Furthermore, the chest pads 50 are attached to the extension portions 48. Movement of the collar portions 44 with respect to the second frame member 30, and movement of the extension portions 48 with respect to the upright portions 46 serves in facilitating positioning and repositioning of the chest pads 50.

Each of the collar portions 44 include an aperture 52 for receiving the second frame member 30 therethrough to facilitate slidable movement of the first and second chest support mechanisms 40 and 42 on the second frame member 30.

The first and second chest support mechanisms 40 and 42 each include a pin 54, and the collar portions 44 each include apertures 56 through opposed sides thereof for receiving one of the pins 54. Furthermore, the second frame member 30 includes various sets of apertures 58 along and through opposed sides thereof for receiving the pins 54. When the apertures 56 are aligned with one of the sets of apertures 58, insertion of one of the pins 54 through the apertures 56 and one of the sets of apertures 58 serves to hold the first and second chest support mechanisms 40 and 42 in position with respect to the second frame member 30. As such, the first and second chest support mechanisms 40 and 42 can be positioned and repositioned along the second frame member 30.

The extension portion 48 is partially received within the upright portion 46, and is moveable outwardly and inwardly with respect to the upright portion 46. Each of the first and second chest support mechanisms 40 and 42 include a pin 60, and the upright portions 46 each include apertures 62 through opposed sides thereof for receiving one of the pins 60. Furthermore, each of the extension portions 48 include various sets of apertures (not shown) along and through opposed sides thereof for receiving one of the pins 60. When the apertures 62 are aligned with one of the sets of apertures in one of the extension portions 48, insertion of one of the pins 60 through the apertures 62 and one of the sets of apertures in one of the extension portions 48 serves to hold the extension portion 48 (and the chest pad 50 attached thereto) in position with respect to the corresponding upright portion 46. As such, the chest pads 50 of the first and second chest support mechanisms 40 and 42 can be positioned and repositioned with respect to the upright portions 46 (and the remainder of the first and second chest support mechanisms 40 and 42).

The third and fourth frame members 32 and 34 support hip and upper leg support mechanism 70 and feet support mechanism 72. As discussed below, components of the hip and upper leg support mechanism 70 and the feet support mechanism 72 can be adjusted to position and reposition the lower body (including the hips, legs, and feet) of the patient P during surgery and/or to accommodate differently sized patients. In situations where the patient P is being positioned for back surgery, hip and upper leg support mechanism 70 offers a significant advantage to the surgeon by permitting the positioning of the patient's back into a preferred position for access to the surgical site. By way of example, during posterior lumbar surgery, the patient's back can by curved via movement of the hip and upper leg support mechanism 70 to a more distracted/open orientation on the posterior side between adjacent vertebrae so as to facilitate removal of the disc therebetween and/or subsequent insertion of a spinal implant therein.

As depicted in FIG. 1B, the third and fourth frame members 32 and 34 support sub-frame 74 which undergirds the hip and upper leg support mechanism 70 and feet support mechanism 72. The sub-frame 74 is moveable along the third and fourth frame members 32 and 34. The sub-frame 74 includes a first collar member 76 (FIG. 1B), a second collar member 78, a first cross member 80, and a second cross member 82. The first and second collar members 76 and 78 are attached to one another with first cross member 80, and the second cross member 82 extends outwardly from the second collar portion 78. As depicted in FIG. 1B, the first and second cross members 80 and 82 are perpendicularly oriented with respect to the first and second collar members 76 and 78. The first and second collar members 76 and 78 and the first and second cross members 80 and 82 are welded or otherwise fixedly attached to one another.

The first and second collar members 76 and 78 are hollow. As such, the first and second collar members 76 and 78 include cavities 84 and 85, respectively, extending therethrough from one end to the other end thereof. The third frame member 32 is received through the first collar member 76, and the fourth frame member 34 is received through the second collar member 78. As such, the first and second collar members 76 and 78 are moveable along the third and fourth frame members 32 and 34, respectively. The movement of the first and second collar members 76 and 78 along the third and fourth frame members 32 and 34, respectively, facilitates movement of the sub-frame 74 (and hence, the hip and upper leg support mechanism 70 and the feet support mechanism 72) relative to the remainder of the surgical frame 10. As discussed above, the moveable frame member 36 also affords repositioning of the third and fourth frame members 32 and 34 (and the sub-frame 74, and the hip and upper leg support mechanism 70 and the feet support mechanism 72 supported by the sub-frame 74) along the first frame member 28. As such, the positions of the hip and upper leg support mechanism 70 and the feet support mechanism 72 can be changed by moving the moveable frame member 36 along the first frame member 28, and by moving the sub-frame 74 along the third and fourth frame members 32 and 34.

The sub-frame includes a pin 86, and the second collar member 78 includes apertures 87 through opposed sides thereof for receiving the pin 86. Furthermore, the fourth frame member 34 includes various sets of apertures 88 along and through opposed sides thereof for receiving the pin 86. When the apertures 87 are aligned with one of the sets of apertures 88, insertion of the pin 86 through the apertures 87 and the sets of apertures 88 serves to hold the second collar member 78 (and hence, the sub-frame 74) in position relative to the fourth frame member 34.

As discussed above, the first and second collar members 76 and 78 of the sub-frame 74 are moveable along the third and fourth frame members 32 and 34, respectively. To facilitate such movement (especially when the patient P is positioned on the surgical frame 10), the third frame member 32 and the first collar member 76 include an internal mechanism (not shown) that translates rotational movement of a shaft 90 extending through the third frame member 32 into movement of the sub-frame 74 (and the hip and upper leg support mechanism 70 and the feet support mechanism 72 attached thereto). Rotation of the shaft 90 in one direction moves the sub-frame 74 (and the hip and upper leg support mechanism 70 and the feet support mechanism 72 attached thereto) toward the first frame member 28, and rotation of the shaft 90 in the other direction moves the sub-frame 74 (and the hip and upper leg support mechanism 70 and the feet support mechanism 72 attached thereto) away from the first frame member 28. Thus, via movement of the sub-frame 74, the hip and upper leg support mechanism 70 and the feet support mechanism 72 can be moved toward and away from the first frame member 28 to position and reposition the lower body of the patient P during surgery and/or to accommodate differently sized patients.

Figure 1C:
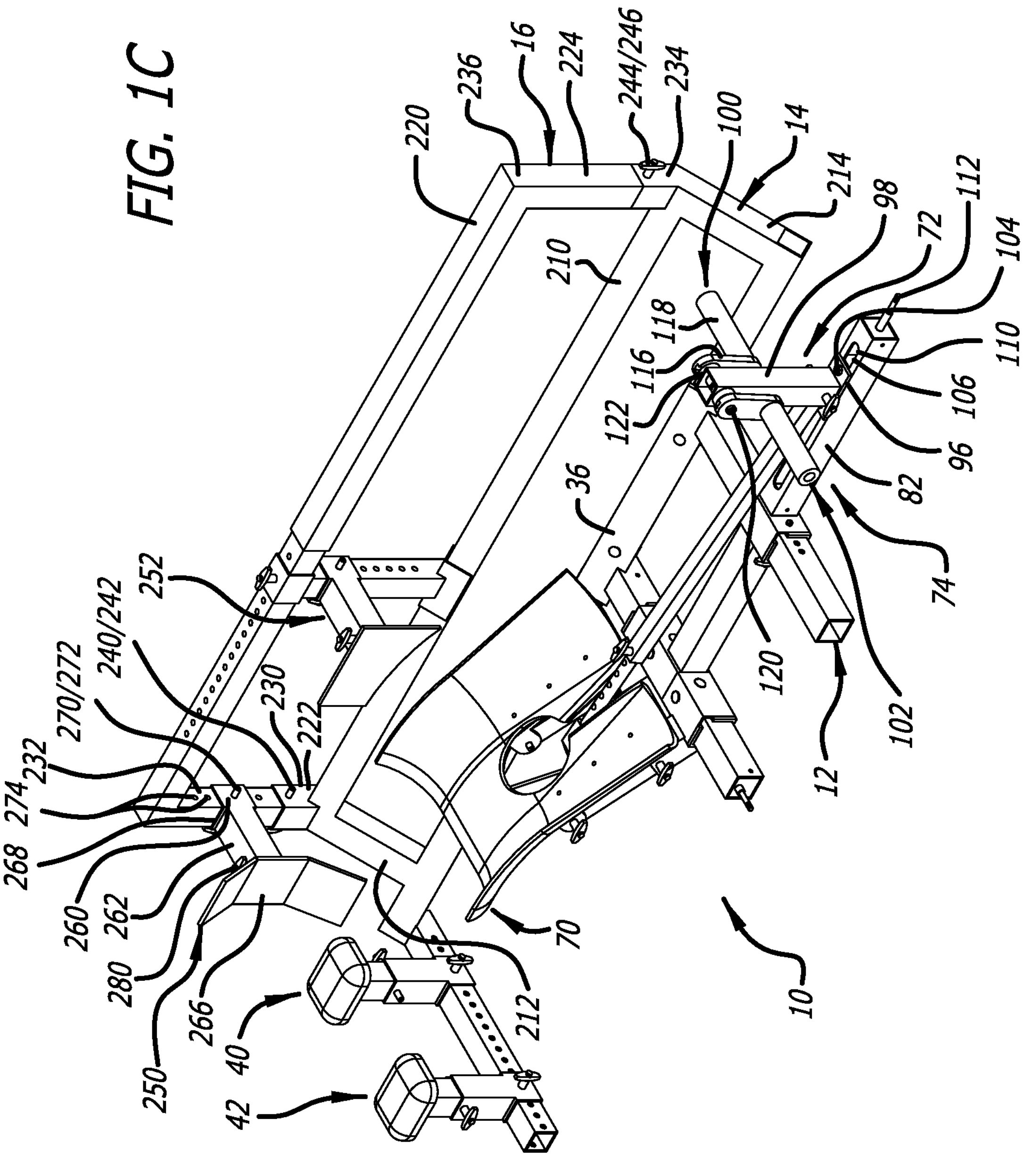
FIG. 1C is the perspective view of FIGS. 1A and 1B identifying additional features thereof.

As depicted in FIG. 1C, the feet support mechanism 72 is moveably attached to the second cross member 82. The feet support mechanism 72 includes a flange portion 96, an upright portion 98, a first foot support 100, and a second foot support 102.

The flange portion 96 attaches the feet support mechanism 72 to the second cross member 82 using bolts 104 attached to a truck 106 moveable within the second cross member 82. The bolts 104 are attached to the truck 106 through a slot 110 formed in the second cross member 82. The truck 106 is confined within the interior of the second cross member 82, and the slot 110 affords movement of both the truck 106 and the feet support mechanism 72 attached thereto relative to the second cross member 82. To facilitate such movement (especially when the patient P is positioned on the surgical frame 10), the second cross member 82 includes an internal mechanism (not shown) that translates rotational movement of a shaft 112 extending through the second cross member 82 into movement of the truck 106 (and the feet support mechanism 72 attached thereto). Rotation of the shaft 112 in one direction moves the truck 106 (and the feet support mechanism 72 attached thereto) toward the fourth frame member 34, and rotation of the shaft 112 in the other direction moves the truck 106 (and the feet support mechanism 72 attached thereto) away from the fourth frame member 34. As such, movement of the feet support mechanism 72 toward and away from the fourth frame member 34 serves to position and reposition the legs of the patient P during surgery and/or to accommodate differently sized patients.

The first and second foot supports 100 and 102 are provided on opposed sides of the upright portion 98. The first and second foot supports 100 and 102 each include an arm portion 116 and an extension portion 118. The arm portions 116 of the first and second foot supports 100 and 102 are attached to either side of the upright portion 98 using a pin 120, and washers 122 received on the pin 120 are positioned between the arm portions 116 and the upright member 98. The pin 120 allows the first and second foot supports 100 and 102 to pivot. The extension portions 118 support the feet of the patient thereon, and, as the patient is positioned and repositioned, the extension portions 118 move via pivotal movement of the first and second foot supports 100 and 102 to accommodate such positioning.

As depicted in FIG. 1B, the hip and upper leg support mechanism 70 includes a patient support platform 130 for anteriorly supporting the hips and the upper legs of the patient P. As discussed below, the angle and location of the patient support platform 130 can be adjusted to position and reposition the hips and the upper legs of the patient P during surgery and/or to accommodate differently sized patients.

The patient support platform 130 includes a body portion 132, a first leg portion 134, and a second leg portion 136. A slot 138 separates the first and second leg portions 134 and 136 from one another. The body portion 132 serves in supporting the hips of the patient P, the first and second leg portions 134 and 136 serves in supporting the upper legs of the patient, and the slot 138 serves to limit contact of the support platform 130 with the groin area of the patient.

Figure 1D:
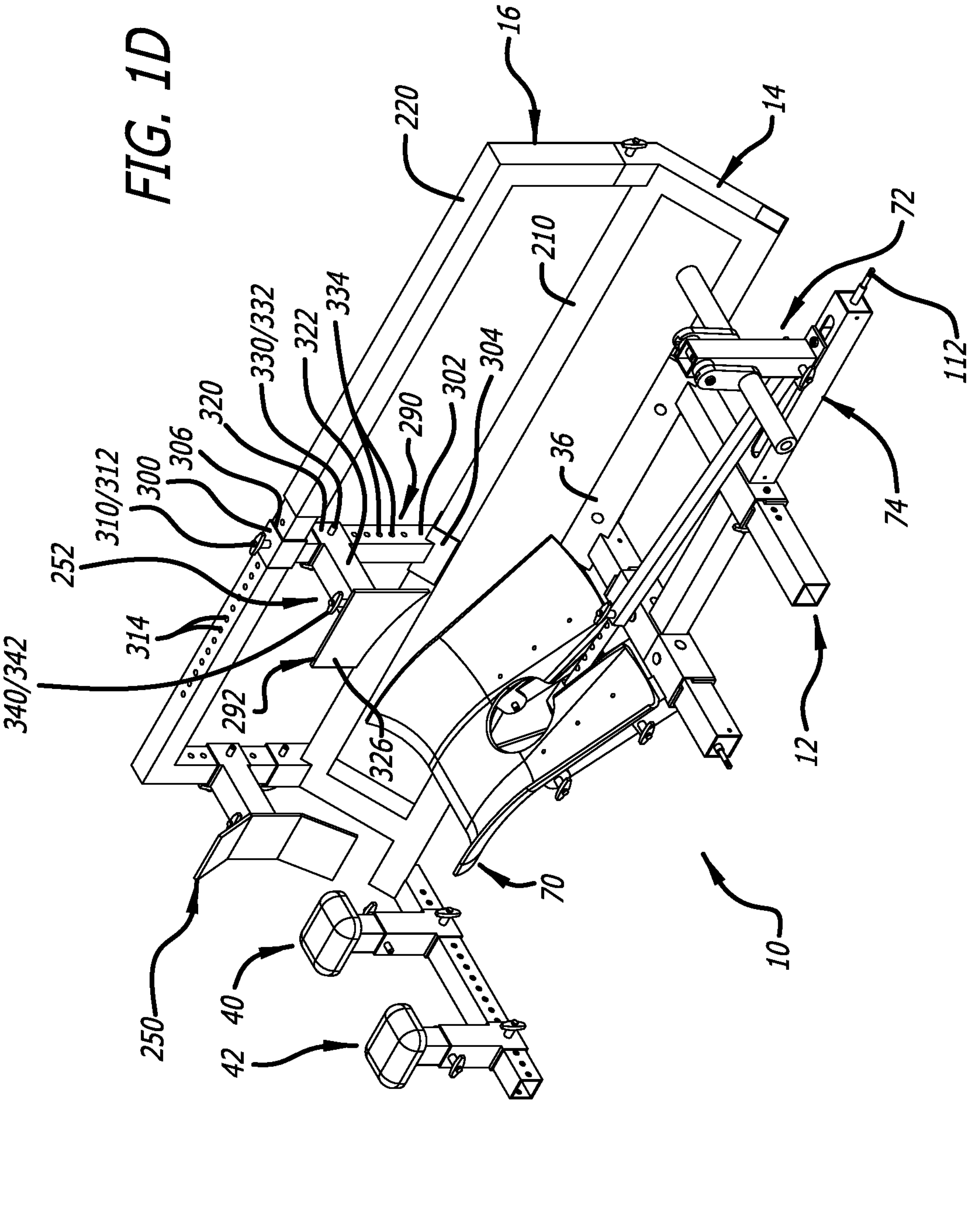
FIG. 1D is the perspective view of FIGS. 1A, 1B, and 1C identifying additional features thereof.
Figure 1E:
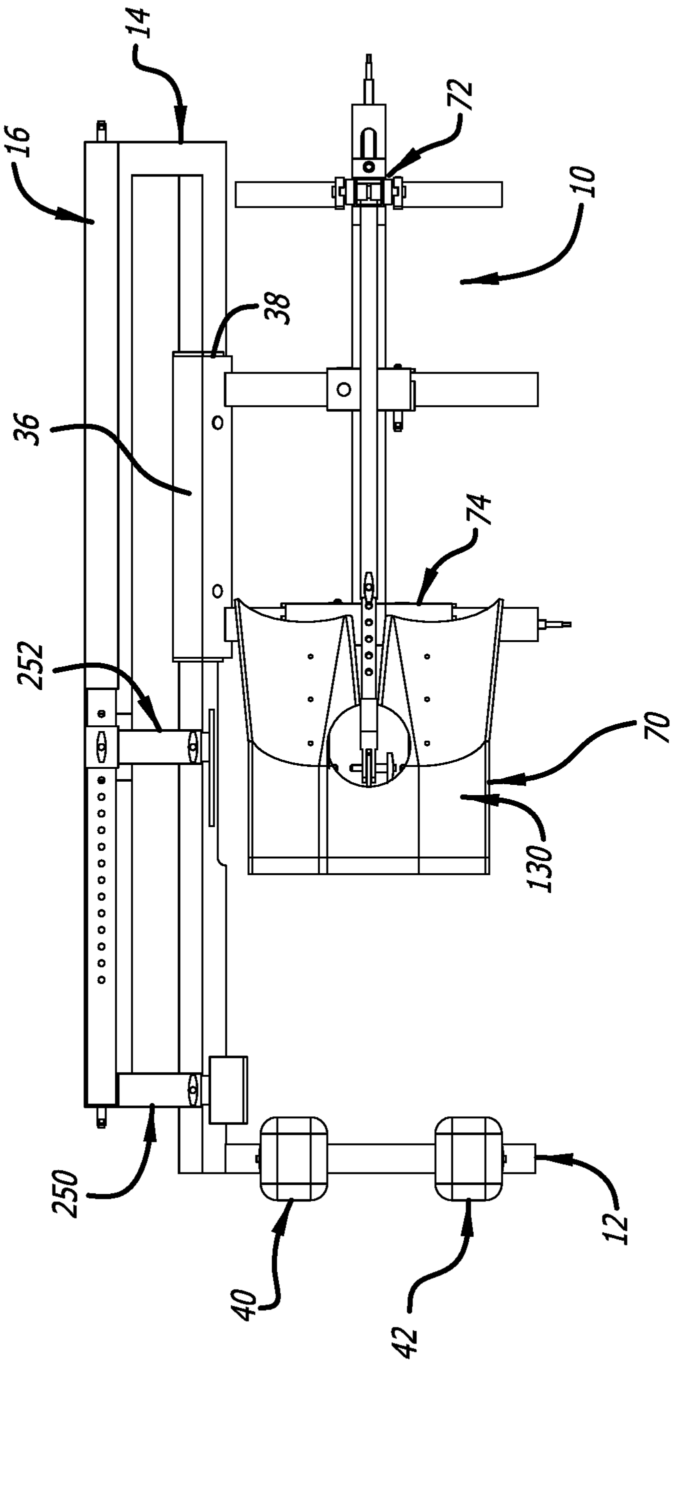
FIG. 1E is a top plan view of the surgical frame of FIG. 1A.
Figure 1F:
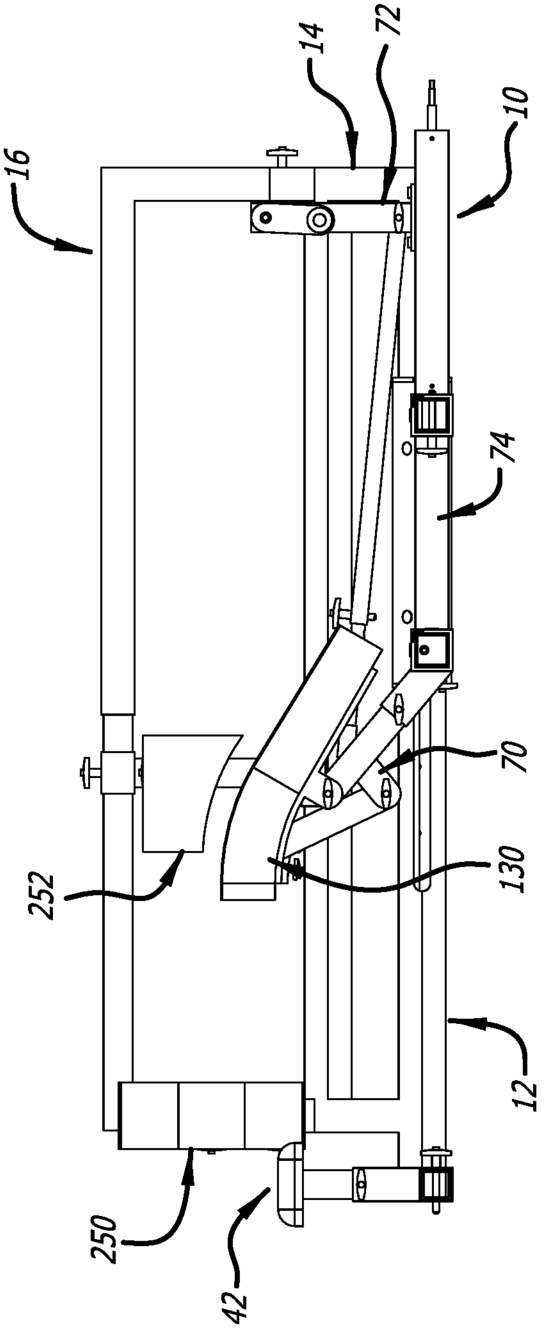
FIG. 1F is a side elevational view of the surgical frame of FIG. 1A.
Figure 1G:
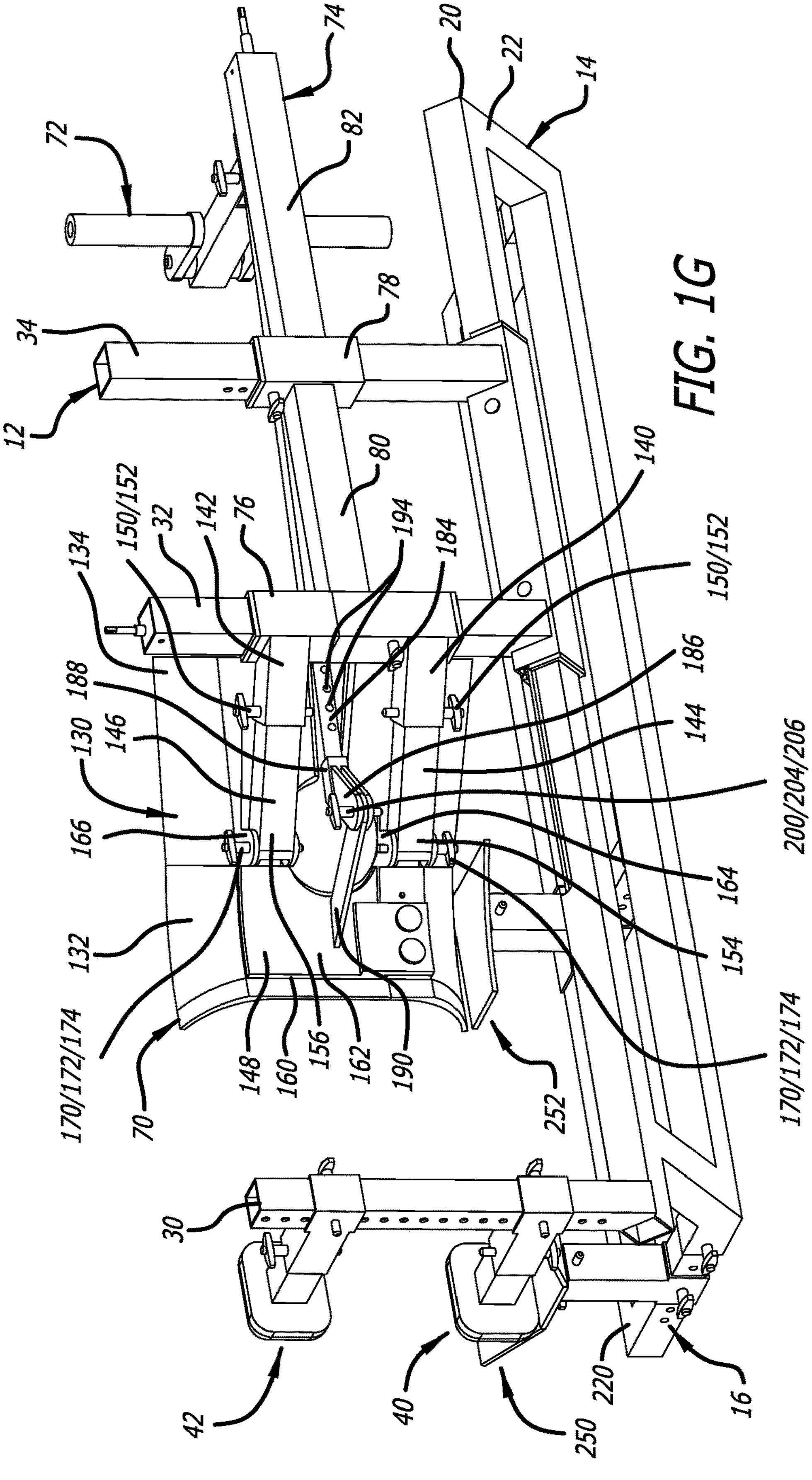
FIG. 1G is a bottom perspective view of the surgical frame of FIG. 1A.

As depicted in FIG. 1G, the hip and upper leg support mechanism 70 also includes a first angled portion 140, a second angled portion 142, a first extension portion 144, a second extension portion 146, and a plate 148. The first and second angled portions 140 and 142, the first and second extension portions 144 and 146, and the plate 148 support the patient support platform 130. As discussed below, the patient support platform 130 is attached to the plate 148, and the plate 148 is pivotally attached to the first and second extension portions 144 and 146. Furthermore, the first and second extension portions 144 and 146 are moveable outwardly and inwardly with respect to the first and second angled portions 140 and 142. Thus, pivotal movement of the plate 148, and outward and inward movement of the extension portions 144 and 146 can affect the position of the patient support platform 130. The pivotal movement of the plate 148 affects the angle of the patient support platform 130, and the inward and outward movement of the extension portions 144 and 146 affects the location of the patient support platform 130.

The first and second angled portions 140 and 142 are attached to the first collar member 76 of the sub-frame 74, and the first and second extension portions 144 and 146 are partially received within the first and second angled portions 140 and 142, respectively. As seen in FIG. 1G, the first and second angled portions 140 and 142 extend upwardly at an angle from the first collar member 76. The first and second extension portions 144 and 146 are moveable outwardly and inwardly within the first and second angled portions 140 and 142. Furthermore, because the first and second extension portions 144 and 146 are received in the first and second angled portions 140 and 142, the angles of the first and second extension portions 144 and 146 correspond to the angles of the first and second angled portions 140 and 142. Each of the first and second angled portions 140 and 142 include apertures 150 through opposed sides thereof, and each of the first and second extension portions 144 and 146 include various sets of apertures (not shown) along and through opposed sides thereof. When the apertures 150 are aligned with one of the sets of apertures, insertion of pins 152 therethrough serves to hold the first and second extension portions 144 and 146 in position with respect to the first and second angled portions 140 and 142. As such, the first and second extension portions 144 and 146 can be positioned and repositioned with respect to the first and second angled portions 140 and 142.

End portions 154 and 156 of the first and second extension portions 144 and 146, respectively, are attached to the plate 148. The plate 148 is attached to the patient support platform 130, and the plate 148 includes a top surface 160 and a bottom surface 162. The top surface 160 contacts the patient support platform 130, and the bottom surface 162 includes a first clevis 164 and a second clevis 166 facilitating attachment of the first and second extension portions 144 and 146 to the plate 148. Attachment of the end portions 154 and 156 to plate 148 allows for pivotal movement of the plate 148 (and the patient support platform 130 attached thereto) with respect to the first and second extension portions 144 and 146. Furthermore, movement of the first and second extension portions 144 and 146 with respect to the first and second angled portions 140 and 142 allows for outward and inward movement of plate 148 (and the patient support platform 130 attached thereto). As such, the angle and location of the patient support platform 130 can be adjusted to position and reposition the hips and the upper legs of the patient during surgery and/or to accommodate differently sized patients.

The first and second clevises 164 and 166 can be integrally formed with the plate 148. The end portion 154 is received in the first clevis 164 and the second end portion 156 is received in the second clevis 166. Each of the first and second clevises 164 and 166 include apertures 170 therethrough, and each of the end portions 154 and 156 include apertures (not shown) therethrough on opposed sides of the first and second extension portions 144 and 146. Fixed pins 172 can be received through the apertures 170 and the apertures to pivotally attach the end portions 154 and 156 to the first and second clevises 164 and 166, respectively. Furthermore, each of the fixed pins 172 includes a handle 174 that can be tightened onto the fixed pins 172 to hold the first and second clevises 164 and 166 in position relative to the end portions 154 and 156.

As discussed above, given that the plate 148 is attached to the patient support platform 130, the pivotal movement of the plate 148 affords corresponding pivotal movement of the patient support platform 130 attached thereto. Thus, tightening of the handles 174 onto the fixed pins 172 serves to hold the plate 148 and the patient support platform 130 attached thereto in position relative to the first and second extension portions 144 and 146. Furthermore, as discussed above, given that the plate 148 is attached to the first and second extension portions 144 and 146, movement of the first and second extension portions 144 and 146 outwardly and inwardly affords corresponding outward and inward movement of the plate 148 and the patient support platform 130 attached thereto. Thus, insertion of the pins 152 through one of the sets of apertures in each of the first and second extension portions 144 and 146 serves to hold the first and second extension portions 144 and 146, the plate 148 attached to the first and second extension portions 144 and 146, and the patient support platform 130 attached to the plate 148 in position relative to the first and second angled portions 140 and 142.

As depicted in FIGS. 1B and 1G, the position of the patient support platform 130 can be affected during surgery using telescoping mechanism 180. The telescoping mechanism 180 extends from the feet support mechanism 72 to the plate 148 of the hip and upper leg support mechanism 70. The telescoping mechanism 180 includes a base portion 182 attached to the upright portion 98 of the feet support mechanism 72, an extension portion 184 partially received in the base portion 182, and a clevis 186 provided on an end portion 188 of the extension portion 184. As discussed below, the lengthening and shortening of the telescoping mechanism 180 can be used to adjust the angle of the patient support platform 130.

The extension portion 184 is moveable outwardly and inwardly with respect to the base portion 182. Moving the extension portion 184 outward lengthens the telescoping mechanism 180, and moving the extension portion 184 inward shortens the telescoping mechanism 180. The base portion 182 includes apertures 192 in opposed sides thereof, and the extension portion 184 includes sets of apertures 194 along and through opposed sides thereof. When the apertures 192 are aligned with one of the sets of apertures 194, insertion of a pin 196 through the apertures 192 and one of the sets of apertures 194 serves to hold the base portion 182 and the extension portion 184 in position with respect to one another. As such, the extension portion 184 can be positioned and repositioned with respect to the base portion 182.

The clevis 186 is attached to an extension arm 190 depending downwardly from the plate 148. The clevis 186 can be integrally formed with the extension portion 184, and the extension arm 190 can be integrally formed with plate 148. The extension arm 190 is received within the clevis 186. As depicted in FIG. 1G, the clevis 186 includes apertures 200 therethrough, and the extension arm 190 includes an aperture (not shown). Fixed pin 204 can be received through the apertures 200 and the aperture in the extension arm 190 to attach the extension portion 184 to the extension arm 190. Furthermore, the fixed pin 204 includes a handle 206 that can be tightened onto the fixed pin 204 to hold the clevis 186 in position relative to the extension arm 190.

The lengthening or shortening of the telescoping mechanism 180 can be used to adjust the angle of the patient support platform 130. As discussed above, the plate 148 is pivotally attached to the first and second extension portions 144 and 146 via the first and second clevises 164 and 166. The extension arm 190 attached to the plate 148 serves as a moment arm to facilitate pivotal movement of the plate 148 on the first and second clevises 164 and 166. Movement of the extension arm 190 toward the first and second chest support mechanisms 40 and 42 serves to move the body portion 132 of the patient support platform 130 downwardly, and movement of the extension arm 190 toward the feet support mechanism 72 serves to move the body portion 132 of the patient support platform 130 upwardly. Lengthening of the telescoping mechanism 180 moves the extension arm 190 toward the first and second chest support mechanisms 40 and 42, and shortening of the telescoping mechanism 180 moves the extension arm 190 toward the feet support mechanism 72. As such, by adjusting the telescoping mechanism 180, the angle of the plate 148 and the patient support platform 130 attached thereto can be adjusted to position and reposition the hips and the upper legs of the patient P during surgery and/or to accommodate differently sized patients.

As depicted in FIG. 1C, the second portion 14 of the surgical frame 10 includes the first frame member 28, a fifth frame member 210, a sixth frame member 212, and a seventh frame member 214. The first frame member 28 is shared between the first and second portions 12 and 14 of the surgical frame 10, and the sixth and seventh frame members 212 and 214 connect the first and fifth frame members 28 and 210 together. Furthermore, the third portion 16 of the surgical frame 10 includes the fifth frame member 210, an eighth frame member 220, a ninth frame member 222, and a tenth frame member 224. The fifth frame member 210 is shared between the second and third portions 14 and 16 of the surgical frame 10, and the ninth and tenth frame members 222 and 224 connect the fifth and eighth frame members 210 and 220 together.

A portion of the third portion 16 can be separable from the remainder of the surgical frame 10. As depicted in FIG. 1C, the ninth and tenth frame members 222 and 224 can be formed of two components that are removably attached to one another. For example, the ninth frame member 222 includes a first portion 230 and a second portion 232, and tenth frame member 224 includes a first portion 234 and a second portion 236. The first portion 230 is attached to the fifth frame member 210 and the second portion 232 is attached to the eighth frame member 220, and the first portion 234 is attached to the fifth frame member 210 and the second portion 236 is attached to the eighth frame member 220. The first portion 230 includes apertures 240 through opposed sides thereof, the second portion 232 includes apertures (not shown) through opposed sides thereof, and a pin 242 is inserted through the apertures 240 in the first portion 230 and the apertures in the second portion 232 to facilitate removable attachment between the first and second portions 230 and 232. Furthermore, the first portion 234 includes apertures 244 through opposed sides thereof, the second portion 236 includes apertures (not shown) through opposed sides thereof, and a pin 246 is inserted through the apertures 244 in the first portions 234 and the apertures in the second portion 236 to facilitate removable attachment between the first and second portions 234 and 236. As such, the eighth frame member 220, and the second portions 232 and 236 of the ninth and tenth frame members 222 and 224, respectively, can be removed from the remainder of the surgical frame 10.

In addition to the first and second chest support mechanisms 40 and 42, the hip and upper leg support mechanism 70, and the feet support mechanism 72, the surgical frame 10 includes a lateral shoulder/upper torso mechanism 250 and a lateral hip support mechanism 252. As discussed below, components of the lateral shoulder/upper torso mechanism 250 and the lateral hip support mechanism 252 can be adjusted to position and reposition the upper body (including the chest) and the hips of the patient P during surgery and/or to accommodate differently sized patients.

As depicted in FIG. 1C, the lateral shoulder/upper torso mechanism 250 is moveable along the second portion 232 of the ninth frame member 222, and also moveable outwardly and inwardly with respect to the ninth frame member 222. The lateral shoulder/upper torso mechanism 250 includes a collar portion 260, a base portion 262, an extension portion 264 (FIG. 3A), and a shoulder/upper torso contacting portion 266. The collar portion 260 is moveable along the ninth frame member 222, and the extension portion 264 is partially received in the base portion 262 and is moveable outwardly and inwardly with respect thereto.

The collar portion 260 includes an aperture 268 for receiving the second portion 232 of the ninth frame member 222 therethrough to facilitate slidable movement of the lateral shoulder/upper torso mechanism 250 on the ninth frame member 222. The lateral shoulder/upper torso mechanism 250 includes a pin 270, the collar portion 260 includes apertures 272 through opposed sides thereof for receiving the pin 270, and the second portion 232 of the ninth frame member 222 includes various sets of apertures 274 along and through opposed sides thereof for receiving the pin 270. When the apertures 272 are aligned with one of the sets of apertures 274, insertion of the pin 270 through the apertures 272 and one of the sets of apertures 274 serves to hold the lateral shoulder/upper torso mechanism 250 in position with respect to the ninth frame member 222. As such, the lateral shoulder/upper torso mechanism 250 can be positioned and repositioned along the ninth frame member 222.

The extension portion 264 is partially received within the base portion 262, and is moveable outwardly and inwardly with respect to the base portion 262. The lateral shoulder/upper torso mechanism 250 includes a pin 280, the base portion 262 includes apertures (not shown) through opposed sides thereof for receiving the pin 280, and the extension portion 264 includes various sets of apertures (not shown) along and through opposed sides thereof for receiving the pin 280. When the apertures in the base portion 262 are aligned with one of the sets of apertures in the extension portion 264, insertion of the pin 280 through the apertures in the base portion 262 and one of the sets of apertures in the extension portion 264 serves to hold the position of the extension portion 264 (and the shoulder/upper torso contacting portion 266 attached thereto) in position with respect to the base portion 262. As such, the shoulder/upper torso contacting portion 266 of the lateral shoulder/upper torso support mechanism 250 can be positioned and repositioned with respect to the base portion 262 (and the remainder of the lateral shoulder/upper torso mechanism 250).

As depicted in FIG. 1D, the lateral hip support mechanism 252 is moveable along both the fifth frame member 210 and the eighth frame member 220, and also moveable outwardly and inwardly with respect to the fifth frame member 210 and the eighth frame member 220. The lateral hip support mechanism 252 includes a first portion 290 and a second portion 292. The first portion 290 is supported between the fifth frame member 210 and the eighth frame member 220, and the second portion 292 is attached by the first portion 290.

The first portion 290 of the lateral hip support mechanism 252 includes a collar portion 300, a base portion 302, and a slidable portion 304. The collar portion 300 is moveable with respect to the eighth frame member 220, and the slidable portion 304 is moveable with respect to the fifth frame member 210. The collar portion 300 includes an aperture 306 for receiving the eighth frame member 220 therethrough to facilitate slidable movement of the first portion 290 on the eighth frame member 220. Furthermore, the slidable portion 304 is configured to rest on the fifth frame member 210 to facilitate slidable movement thereon. The first portion 290 includes a pin 310, the collar portion 300 includes apertures 312 through opposed sides thereof for receiving the pin 310, and the eighth frame member 220 includes various sets of apertures 314 along and through opposed sides thereof for receiving the pin 310. When the apertures 312 are aligned with one set of the apertures in the eighth frame member 220, insertion of the pin 310 through the apertures 312 and one of the sets of apertures 314 in the eighth frame member 220 serves to hold the position of the first portion of the lateral hip support mechanism 252 relative to the fifth frame member 210 and the eighth frame member 220. As such, the first portion 290 (and the second portion 292 attached thereto) of the lateral hip support mechanism 252 can be positioned and repositioned with respect to the fifth frame member 210 and the eighth frame member 220.

The second portion 292 of the lateral hip support mechanism 252 includes a collar portion 320, a base portion 322, an extension portion 324 (FIG. 3A), and a hip-contacting portion 326. The collar portion 320 is moveable along the base portion 302 of the first portion 290, and the extension portion 324 is partially received within the base portion 302 and is moveable outwardly and inwardly with respect thereto.

To facilitate movement of the second portion 292 relative to the first portion 290, the lateral hip support mechanism 252 includes a pin 330, the collar portion 320 includes apertures 332 through opposed sides thereof for receiving the pin 330 therethrough, and the base portion 302 of the first portion 290 includes various sets of apertures 334 along and through opposed sides thereof for receiving the pin 330 therethrough. When the apertures 332 are aligned with one of the sets of apertures 334, insertion of the pin 330 through the apertures 332 and one of the sets of apertures 334 serves to hold the second portion 292 in position with respect to the base portion 302 of the first portion 290. As such, the second portion 292 of the hip support mechanism 252 can be positioned and repositioned along the base portion 302 of the first portion 290.

Additionally, to facilitate movement of the extension portion 324 relative to the base portion 322, the lateral hip support mechanism 252 includes a pin 340, the base portion 322 includes apertures 342 through opposed sides thereof for receiving the pin 340, and the extension portion 324 includes various sets of apertures (not shown) along and through opposed sides thereof for receiving the pin 340. When the apertures 342 are aligned with one of the sets of apertures, insertion of the pin 340 through the apertures 342 and one of the sets of apertures serves to hold the extension portion 324 (and the hip-contacting portion 326 attached thereto) in position with respect to the base portion 322. As such, the hip-contacting portion 326 of the lateral hip support mechanism 252 can be positioned and repositioned with respect to the base portion 322 (and the remainder of the lateral hip support mechanism 252).

As discussed above, the surgical frame 10 affords positioning and repositioning of the upper body (including the chest), hips, legs, and feet of the patient P during surgery and/or to accommodate differently sized patients. In summary, the locations of chest support pads 50 of the first and second chest support mechanisms 40 and 42 can be adjusted to position and reposition the upper body (including the chest) of the patient P. The angle and location of the patient support platform 130 of the hip and upper leg support mechanism 70 can be adjusted to position and reposition the hips and upper legs of the patient P. The location of the feet support mechanism 72 can be adjusted to position and reposition the legs of the patient P. The positions of the hip and upper leg support mechanism 70 and the feet support mechanism 72 (and the patient P received thereon) also can be changed by moving the moveable frame member 36 along the first frame member 28, and by moving the sub-frame 74 along the first and second frame members 32 and 34. Furthermore, the location of the shoulder/upper torso contacting portion 266 of the lateral shoulder/upper torso mechanism 250, and the location of the hip-contacting portion 326 of the lateral hip support mechanism 252 can be adjusted to position and reposition the shoulders and hips of the patient P. The movement afforded by the various mechanisms of the surgical frame 10 affords articulation of portions of the body of the patient P to change the degree of surgical access to the body during surgery. The movement afforded by the various mechanisms of the surgical frame 10 also affords the accommodation of differently sized patients.

Figure 2A:
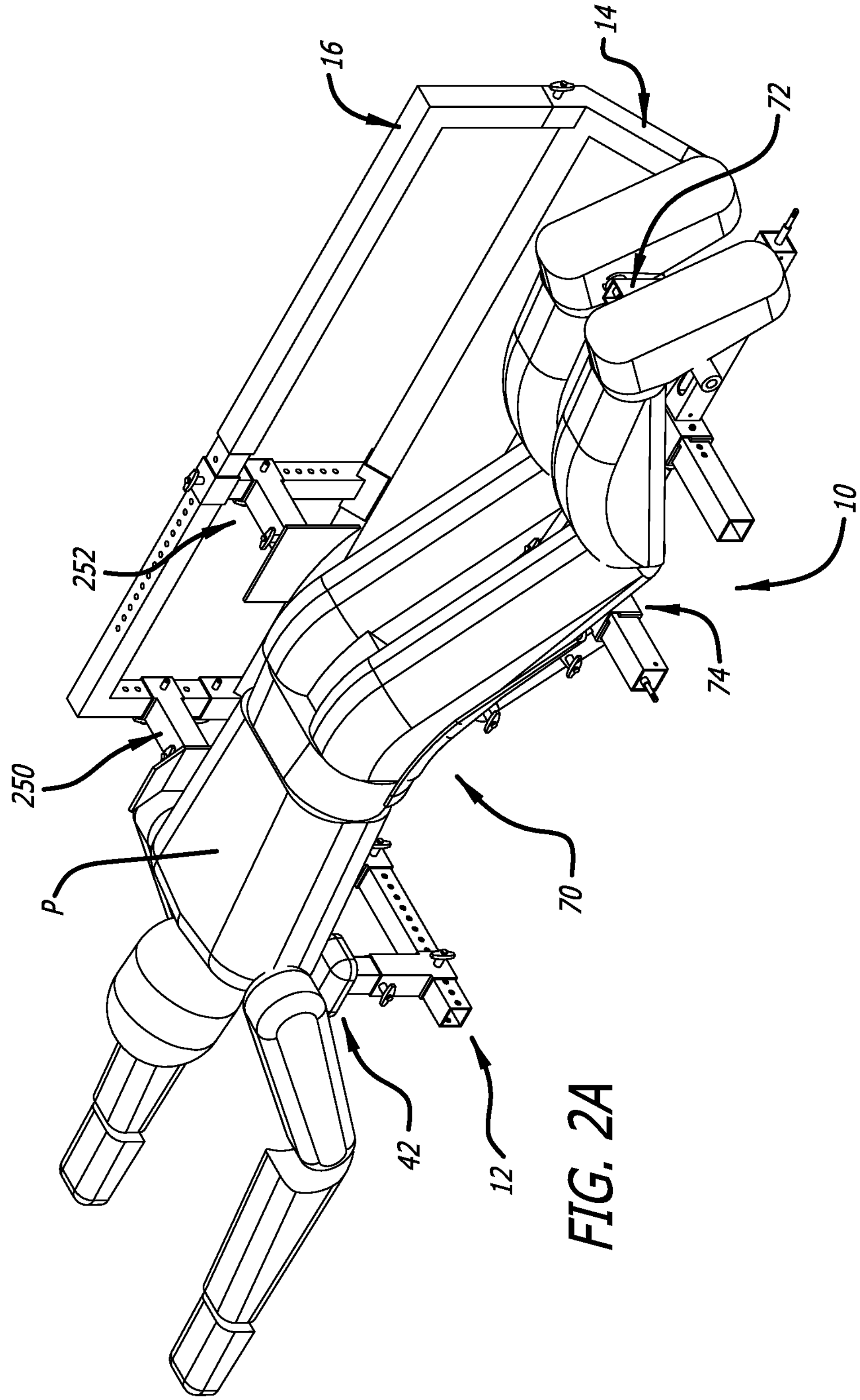
FIG. 2A is a top perspective view of the surgical frame of FIG. 1A, components thereof having been adjusted to maintain a patient in a first position.

FIGS. 2A-5C serve in illustrating the articulation of the body of the patient P afforded by the various mechanisms of the surgical frame 10. FIGS. 2A-2C depict the patient P positioned on the surgical frame 10 in the prone position. The body contacting portions of the first and second chest support mechanisms 40 and 42, the hip and upper leg support mechanism 70, the feet support mechanism 72, the lateral shoulder/upper torso mechanism 250, and the lateral hip support mechanism 252 are located in the same position as depicted in FIGS. 1A-1C.

Figure 2B:
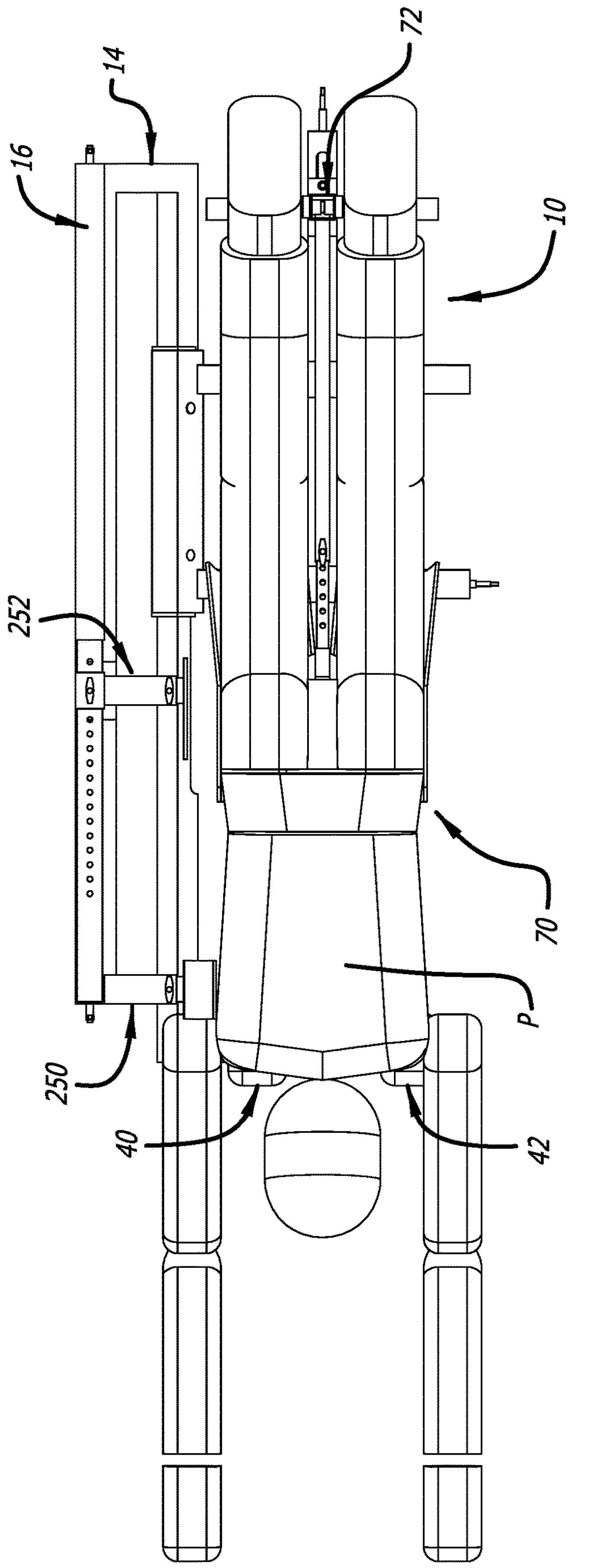
FIG. 2B is a top plan view of the surgical frame of FIG. 1A, the components thereof having been adjusted as shown in FIG. 2A to maintain the patient in the first position.
Figure 2C:
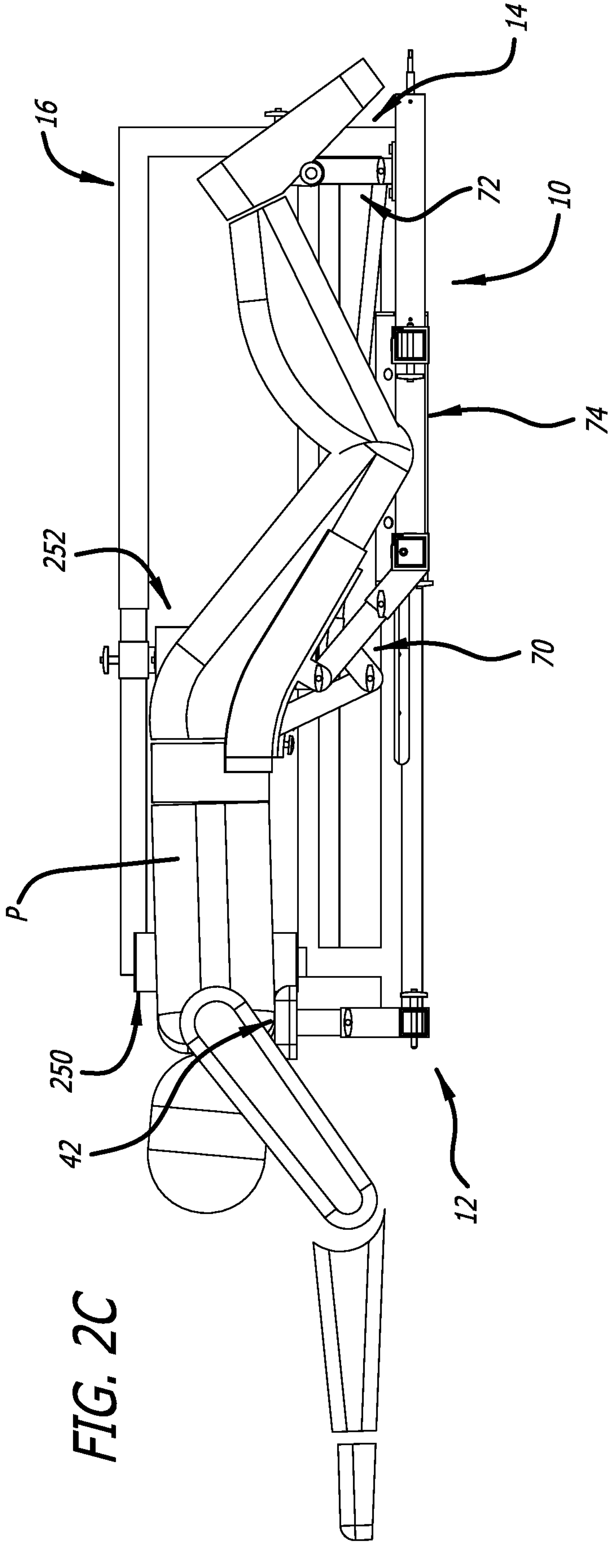
FIG. 2C is a side elevational view of the surgical frame of FIG. 1A, the components thereof having been adjusted as shown in FIG. 2A to maintain the patient in the first position.
Figure 3A:
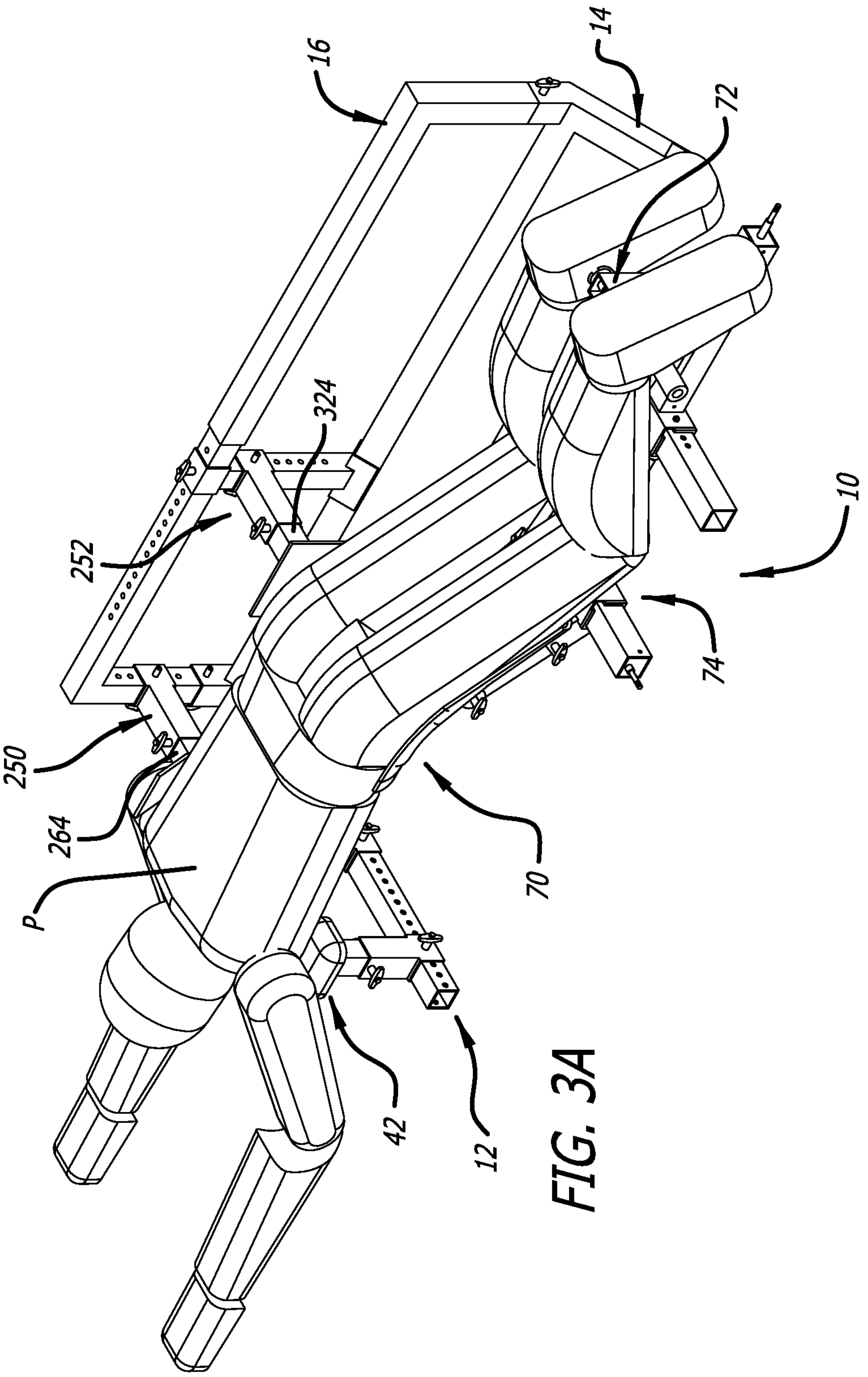
FIG. 3A is a top perspective view of the surgical frame of FIG. 1A, the components thereof having been adjusted to maintain the patient in a second position.
Figure 3B:
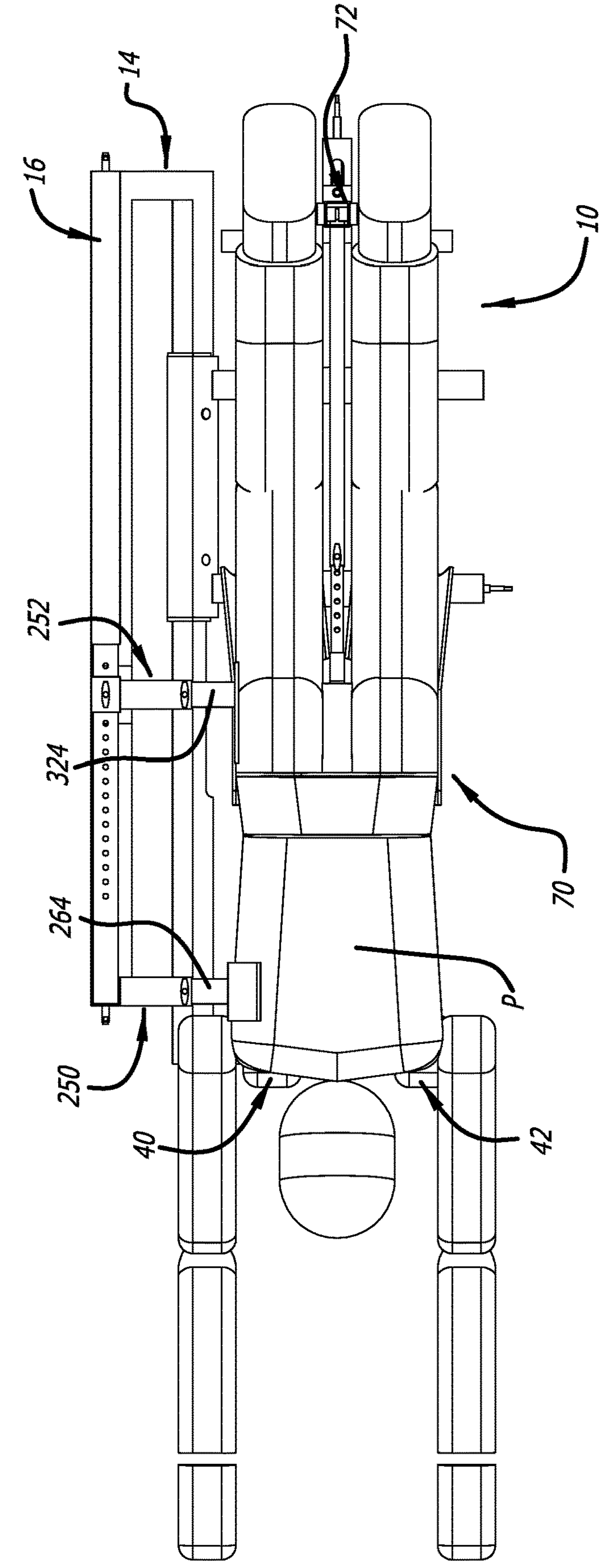
FIG. 3B is a top plan view of the surgical frame of FIG. 1A, the components thereof having been adjusted as shown in FIG. 3A to maintain the patient in the second position.
Figure 3C:
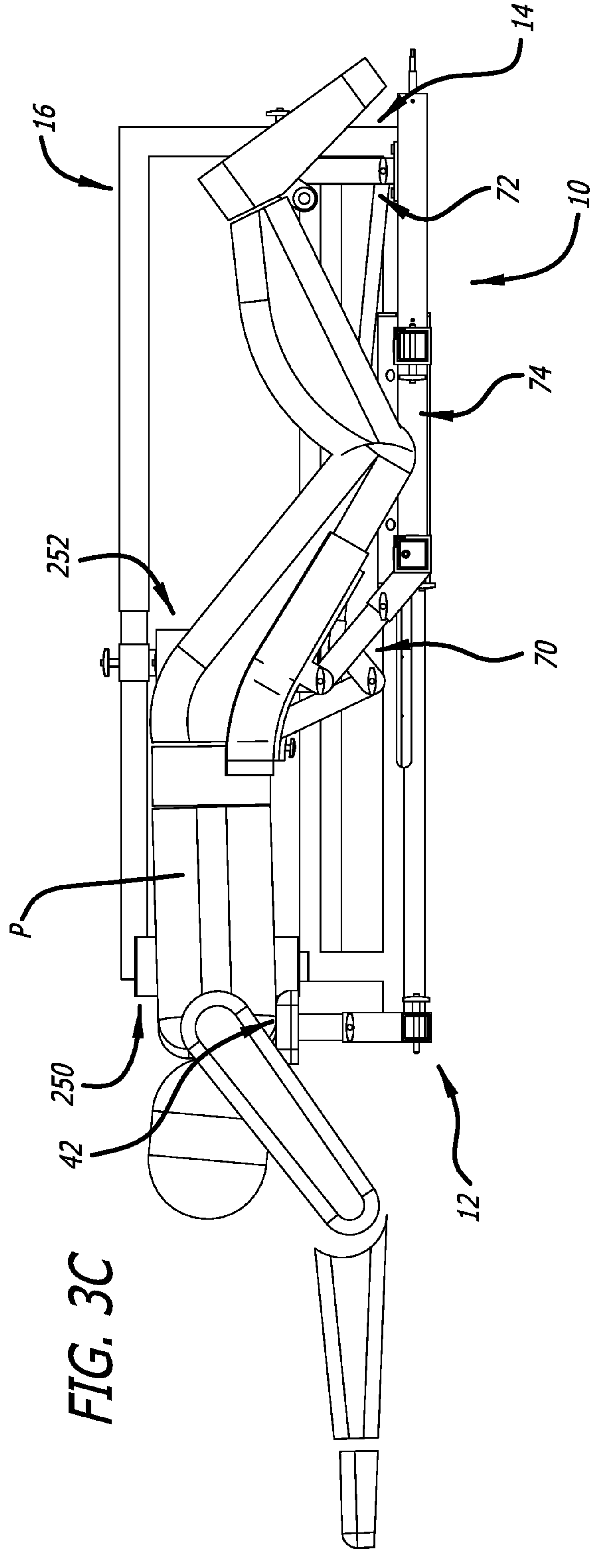
FIG. 3C is a side elevational view of the surgical frame of FIG. 1A, the components thereof having been adjusted as shown in FIG. 3A to maintain the patient in the second position.
Figure 4A:
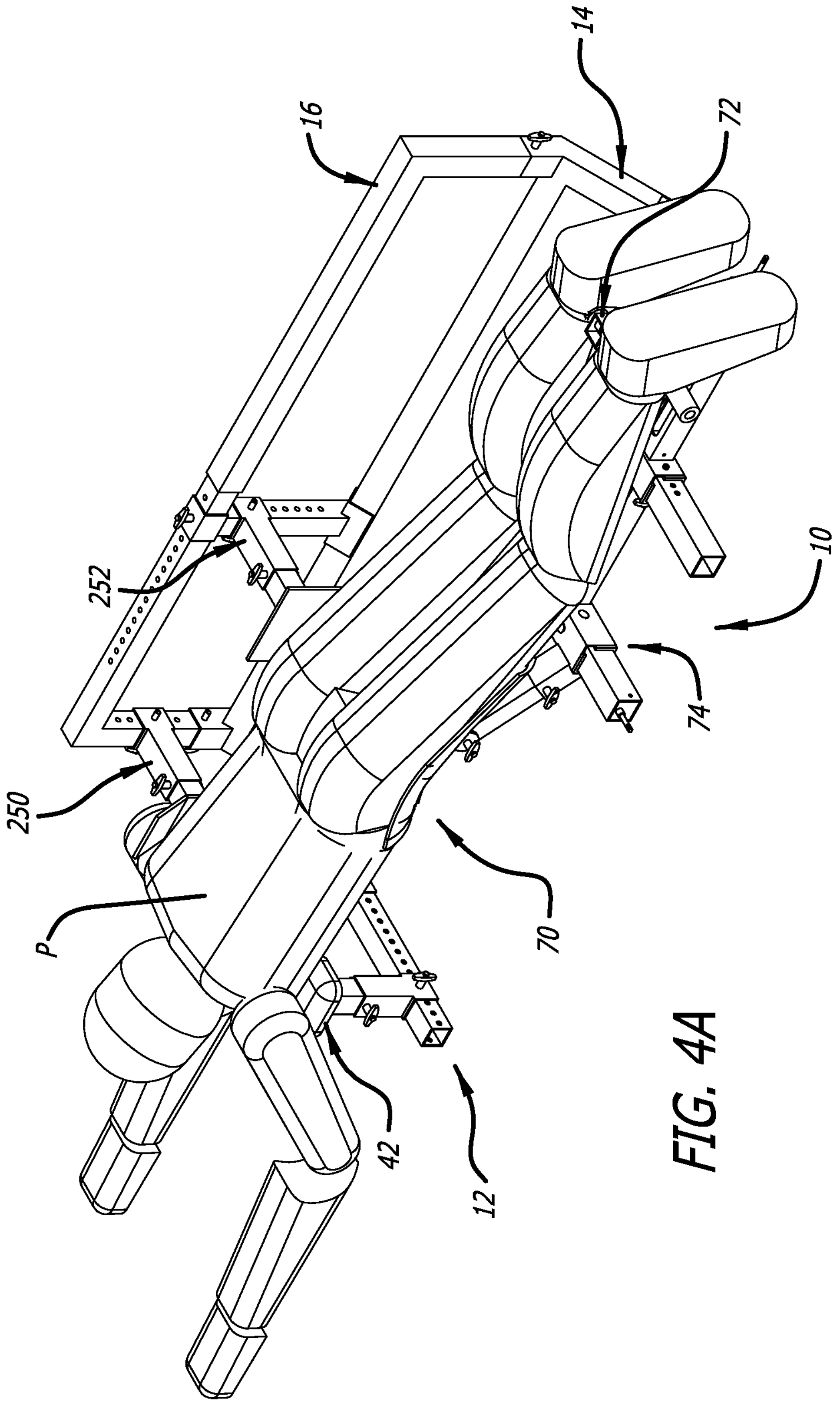
FIG. 4A is a top perspective view of the surgical frame of FIG. 1A, the components thereof having been adjusted to maintain the patient in a third position.
Figure 4B:
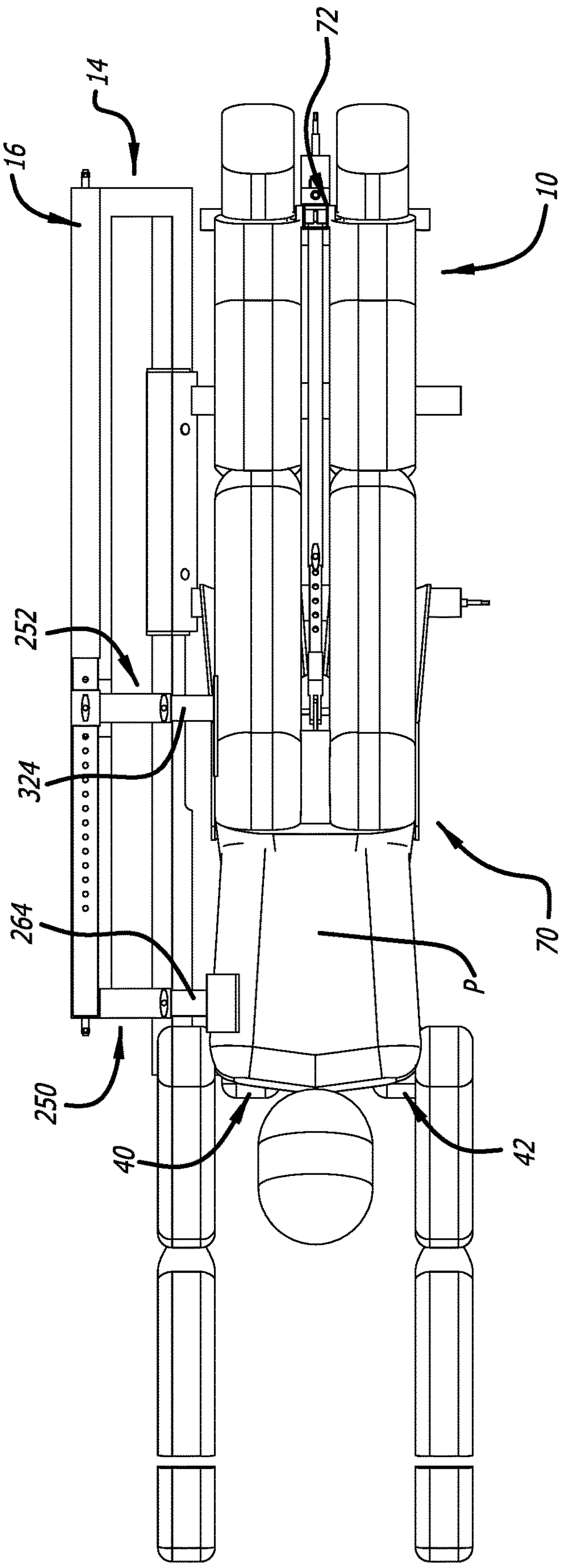
FIG. 4B is a top plan view of the surgical frame of FIG. 1A, the components thereof having been adjusted as shown in FIG. 4A to maintain the patient in the third position.
Figure 4C:
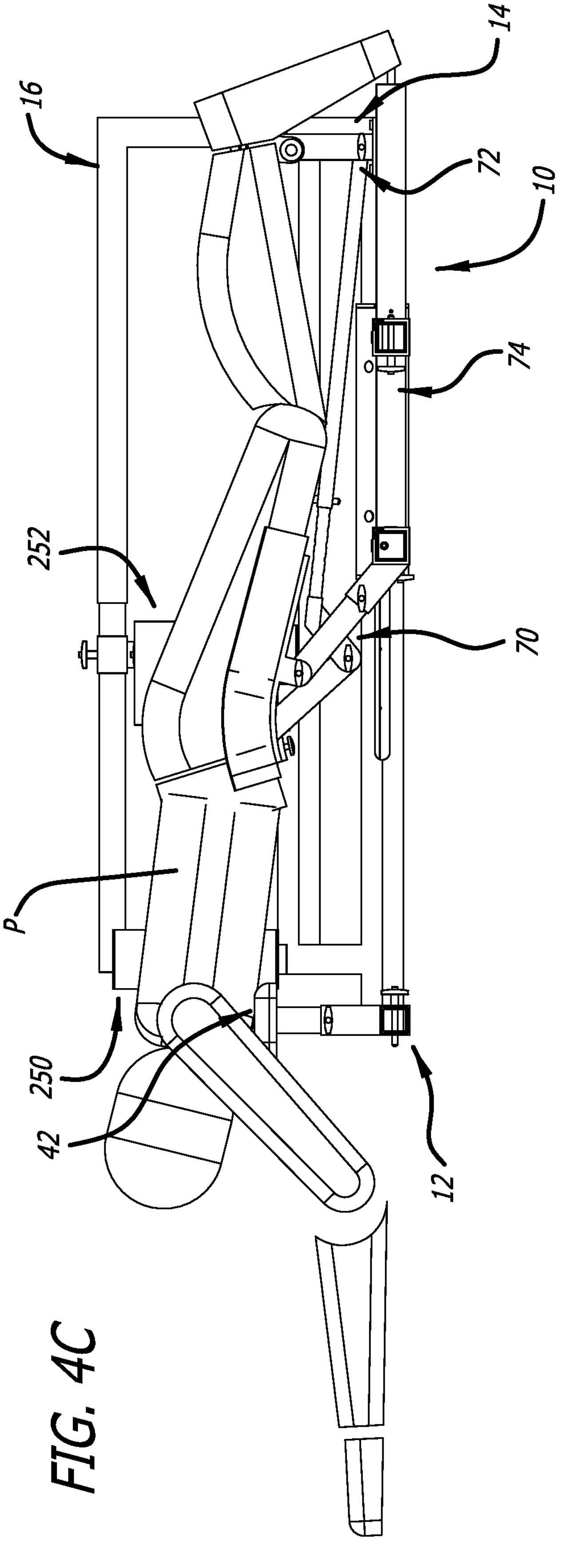
FIG. 4C is a side elevational view of the surgical frame of FIG. 1A, the components thereof having been adjusted as shown in FIG. 4A to maintain the patient in the third position.
Figure 5A:
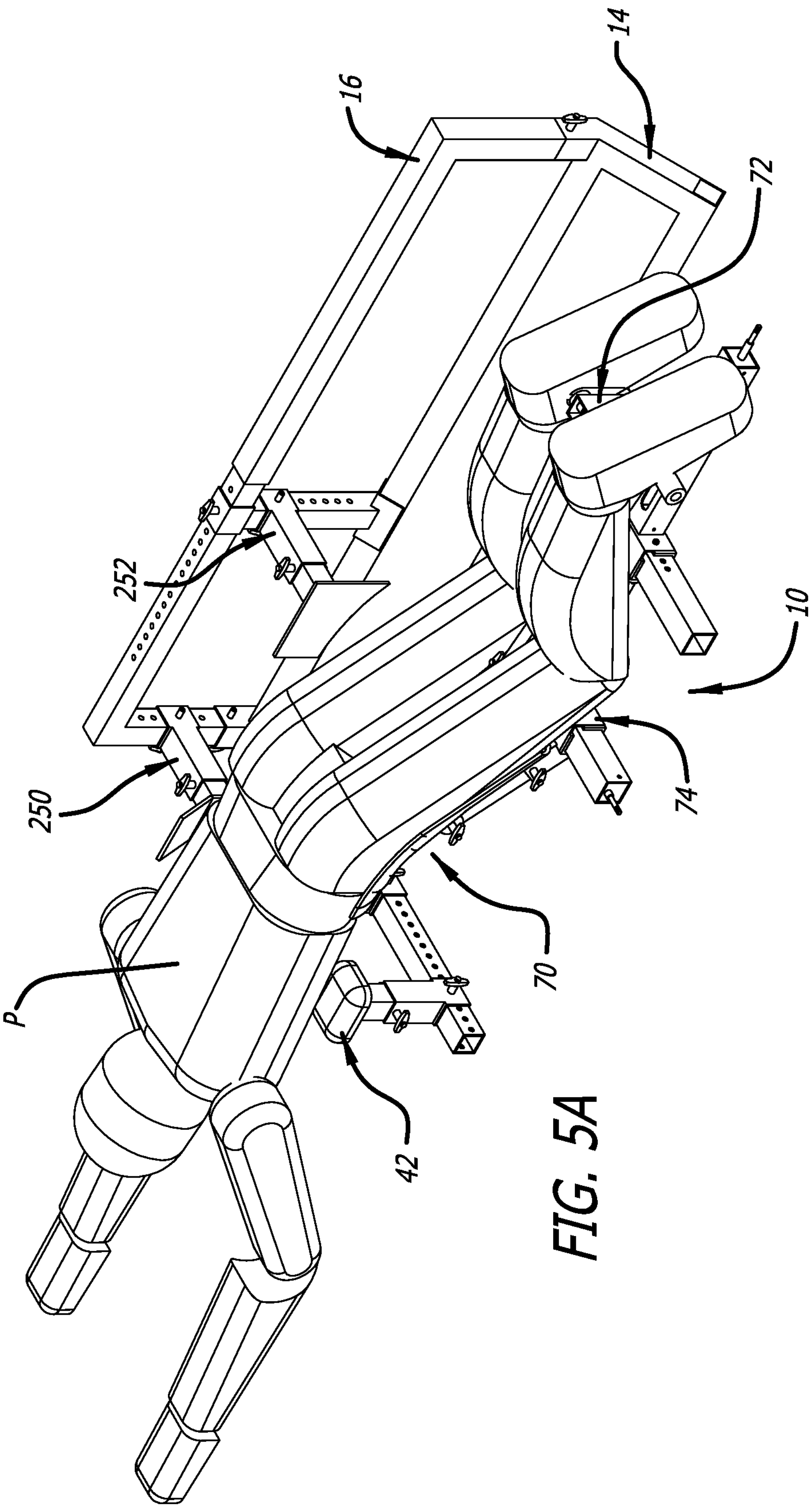
FIG. 5A is a top perspective view of the surgical frame of FIG. 1A, the components thereof having been adjusted to maintain the patient in a fourth position.
Figure 5B:
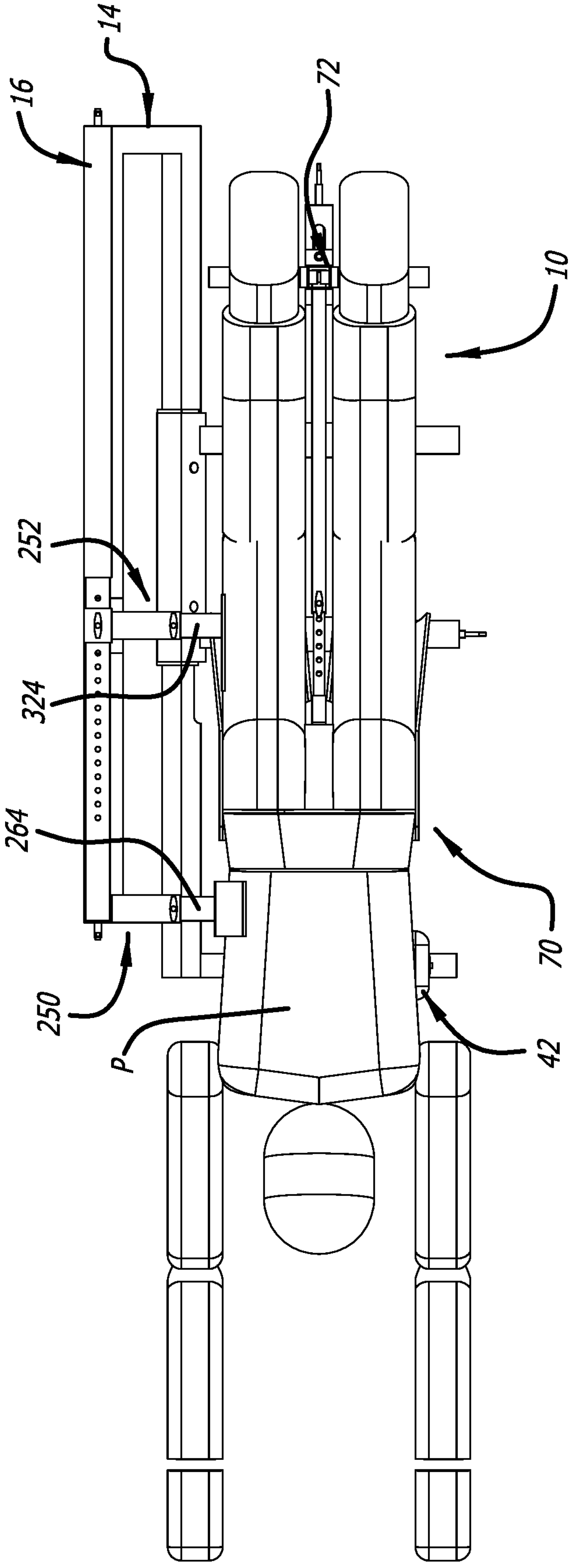
FIG. 5B is a top plan view of the surgical frame of FIG. 1A, the components thereof having been adjusted as shown in FIG. 5A to maintain the patient in the fourth position.
Figure 5C:
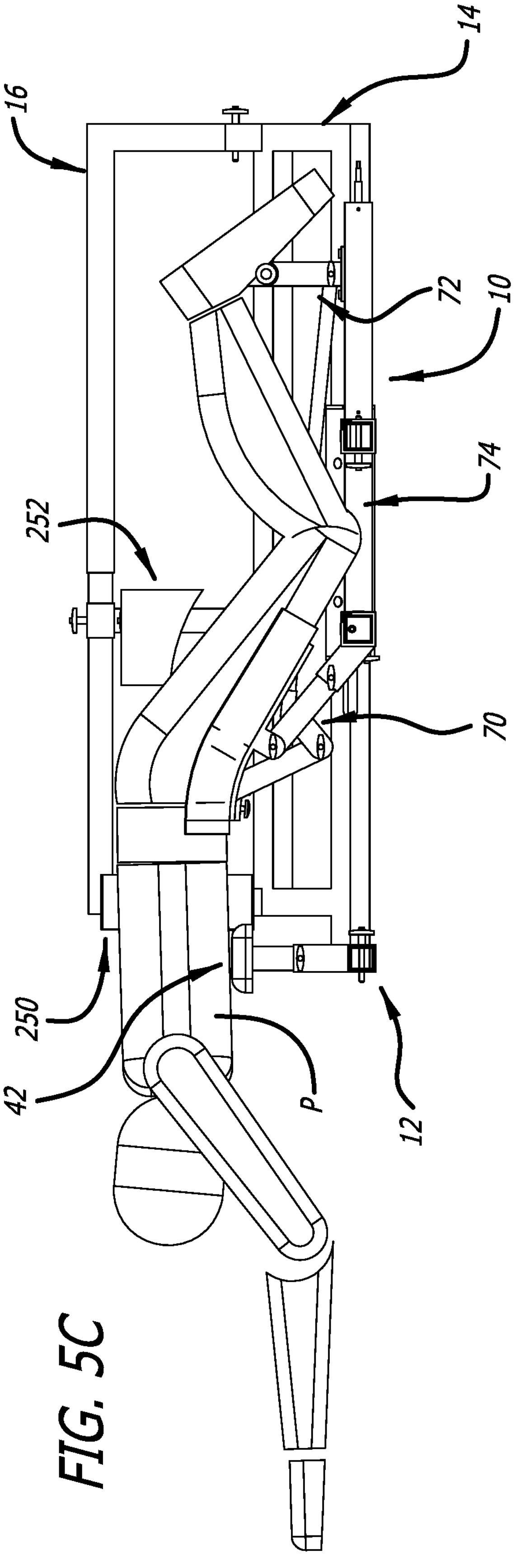
FIG. 5C is a side elevational view of the surgical frame of FIG. 1A, the components thereof having been adjusted as shown in FIG. 5A to maintain the patient in the fourth position.

As shown in FIGS. 2A-2C, the shoulder/upper torso contacting portion 266 of the lateral shoulder/upper torso mechanism 250 and the lateral hip-contacting portion 326 of the hip support mechanism 252 are disengaged from the body of the patient P, and the patient P is supported by the chest support pads 50 of the first and second chest support mechanisms 40 and 42, the patient support platform 130 of the hip and upper leg support mechanism 70, and the first and second foot supports 100 and 102 of the feet support mechanism 72.

In comparison to FIGS. 2A-2C, FIGS. 3A-3C depict the lateral shoulder/upper torso contacting portion 266 of the shoulder/upper torso mechanism 250 having been placed into contact with the left shoulder of the patient P, and the hip-contacting portion 326 of the lateral hip support mechanism 252 having been placed into contact with the left hip of the patient.

In comparison to FIGS. 3A-3C, FIGS. 4A-4C depict the feet support mechanism 72 having been moved away from the fourth frame member 34 to move the feet of the patient P, as well as the angle of the patient support platform 130 having been changed to adjust the angle of the hips of the patient P, to correspondingly increase the length of the patient P.

In comparison to FIGS. 4A-4C, FIGS. 5A-5C depict the moveable frame member 36 (and the sub-frame 74, and the hip and upper leg support mechanism 70 and the feet support mechanism 72 supported by the sub-frame 74) having been moved toward the second frame member 30 to move the hips, legs, and feet of the patient P, as well as the angle of the patient support platform 130 having been changed to adjust the angle of the hips of the patient P, to correspondingly decrease the length of the patient P and also move the patient P relative to the chest support mechanisms 40 and 42.

In addition to the articulation afforded by the various mechanisms of the surgical frame 10, the orientation of the surgical frame 10 can also be changed during surgery. As depicted in FIGS. 1A-1C and 2A-5C, the surgical frame 10 is oriented to rest on the support surfaces 20 of the first portion 12 of the surgical frame 10. The patient P is supported in the prone position when the surgical frame 10 is oriented to rest on the support surfaces 20. The surgical frame 10 can be oriented to rest on the support surfaces 22 of the second portion 14 or rest on the support surfaces 24 of the third portion 16. When the surgical frame 10 is oriented to rest on the support surfaces 22, the patient is supported in the 45°-supported position, and, when the surface frame 10 is oriented to rest on the support surfaces 24, the patient is supported in the side-supported position. In the prone position, the weight of the patient P is primarily supported by the chest support mechanisms 40 and 42, the hip and upper leg support mechanism 70, and the feet support mechanism 72. In the 45°-supported position, the weight of the patient P is primarily supported by the chest support mechanisms 40 and 42, the hip and upper leg support mechanism 70, the feet support mechanism 72, the lateral shoulder/upper torso mechanism 250, and the lateral hip support mechanism 252. In the side-supported position, the weight of the patient P is primarily supported by the lateral shoulder/upper torso mechanism 250 and the lateral hip support mechanism 252. When the patient P is supported by the surgical frame 10 in the prone position, the patient P is in the 45°-supported position, or the patient is in the side-supported position, the various mechanisms of the surgical frame 10 can be adjusted to articulate portions of the body of the patient P.

FIGS. 6-31 depict another preferred embodiment of the surgical support frame generally indicated by the numeral 10'. As discussed below, the surgical support frame 10' serves as an exoskeleton to support the body of the patient P as the patient's body is manipulated thereby, and, in doing so, serves to support the patient P such that the patient's spine does not experience unnecessary torsion.

The surgical frame 10' is configured to provide a relatively minimal amount of structure adjacent the patient's spine to facilitate access thereto and to improve the quality of imaging available before and during surgery. Thus, the surgeon's workspace and imaging access are thereby increased. Furthermore, radio-lucent or low magnetic susceptibility materials can be used in constructing the structural components adjacent the patient's spine in order to further enhance imaging quality.

The surgical frame 10' has a longitudinal axis and a length therealong. As shown in FIGS. 6-10, for example, the surgical frame 10' includes an offset structural main beam 600 spaced from the ground by a support structure 602. As discussed below, the offset main beam 600 is used in supporting the patient P on the surgical frame 10' and various support components of the surgical frame 10' that directly contact the patient P (such as a head support 356, arm supports 364, torso-lift supports 366 and 700, a sagittal adjustment assembly 370 including a pelvic-tilt mechanism 372 and a leg adjustment mechanism 373, and a coronal adjustment assembly 374.) As discussed below, an operator such as a surgeon can control actuation of the various support components to manipulate the position of the patient's body. Soft straps (not shown) are used with these various support components to secure the patient P to the frame and to enable either manipulation or fixation of the patient P. Reusable soft pads can be used on the load-bearing areas of the various support components.

Figure 9:
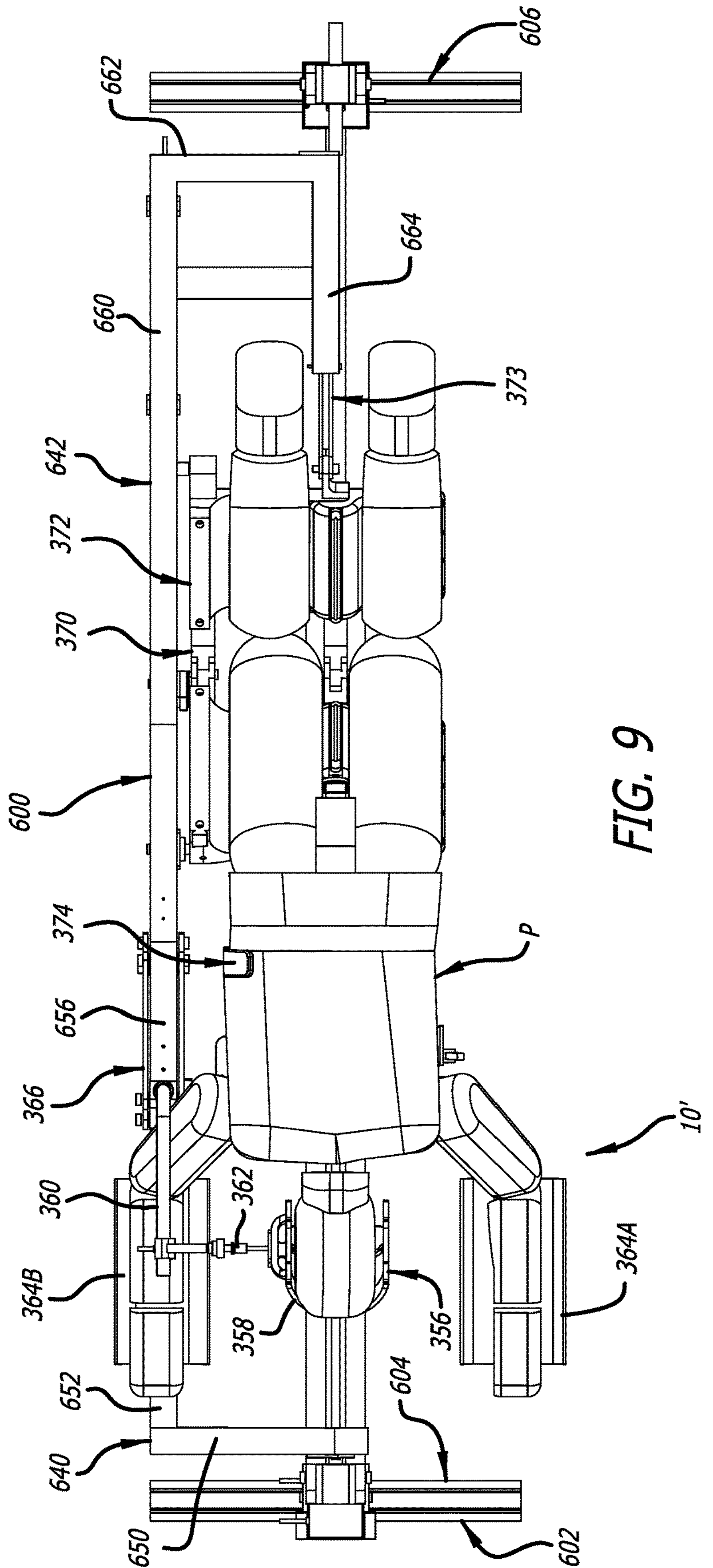
FIG. 9 is a top plan view of the surgical frame of FIG. 6 with the patient positioned thereon in a prone position.
Figure 10:
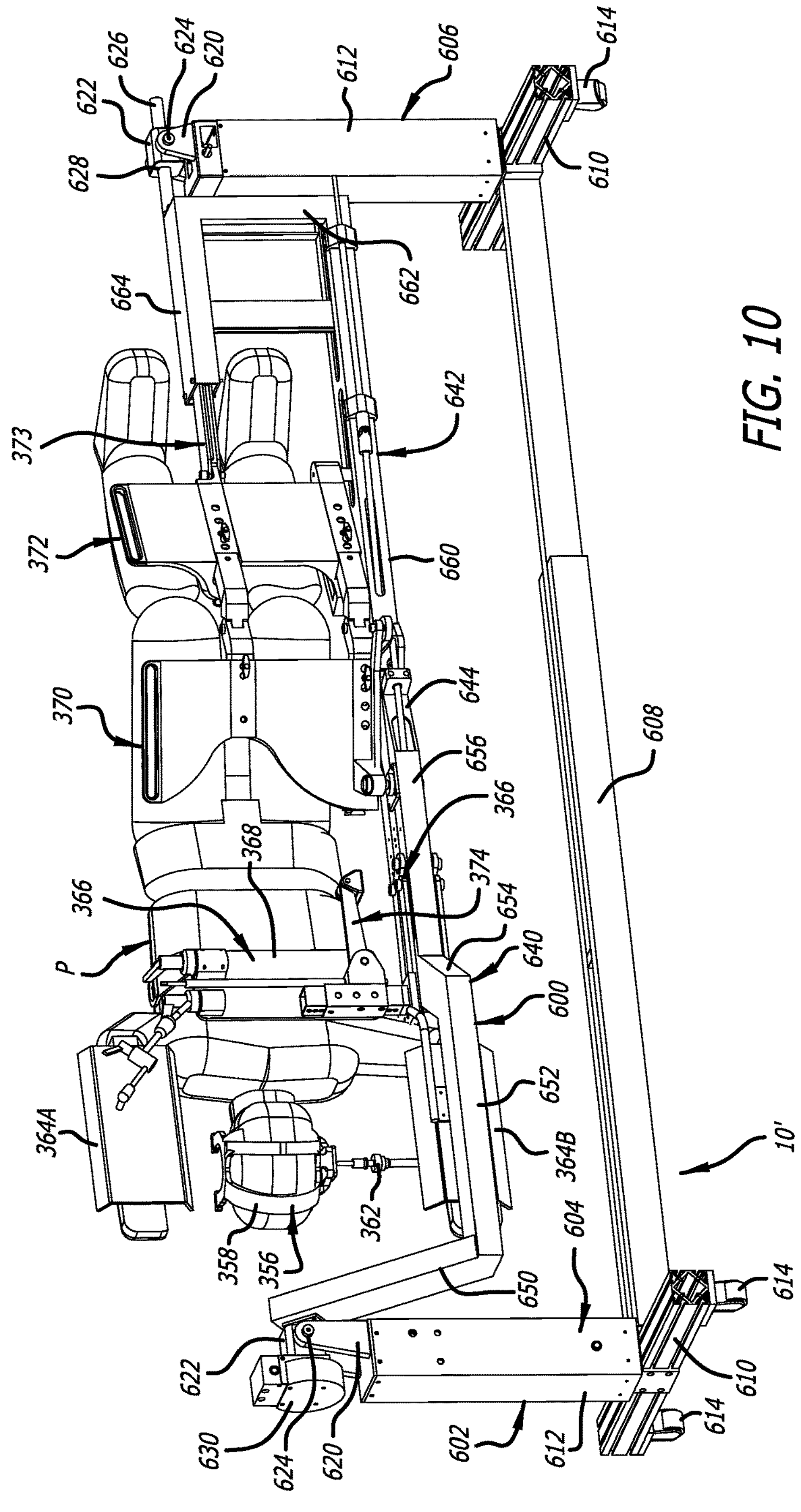
FIG. 10 is a perspective view of the surgical frame of FIG. 6 with the patient positioned thereon in a lateral position.
Figure 11:
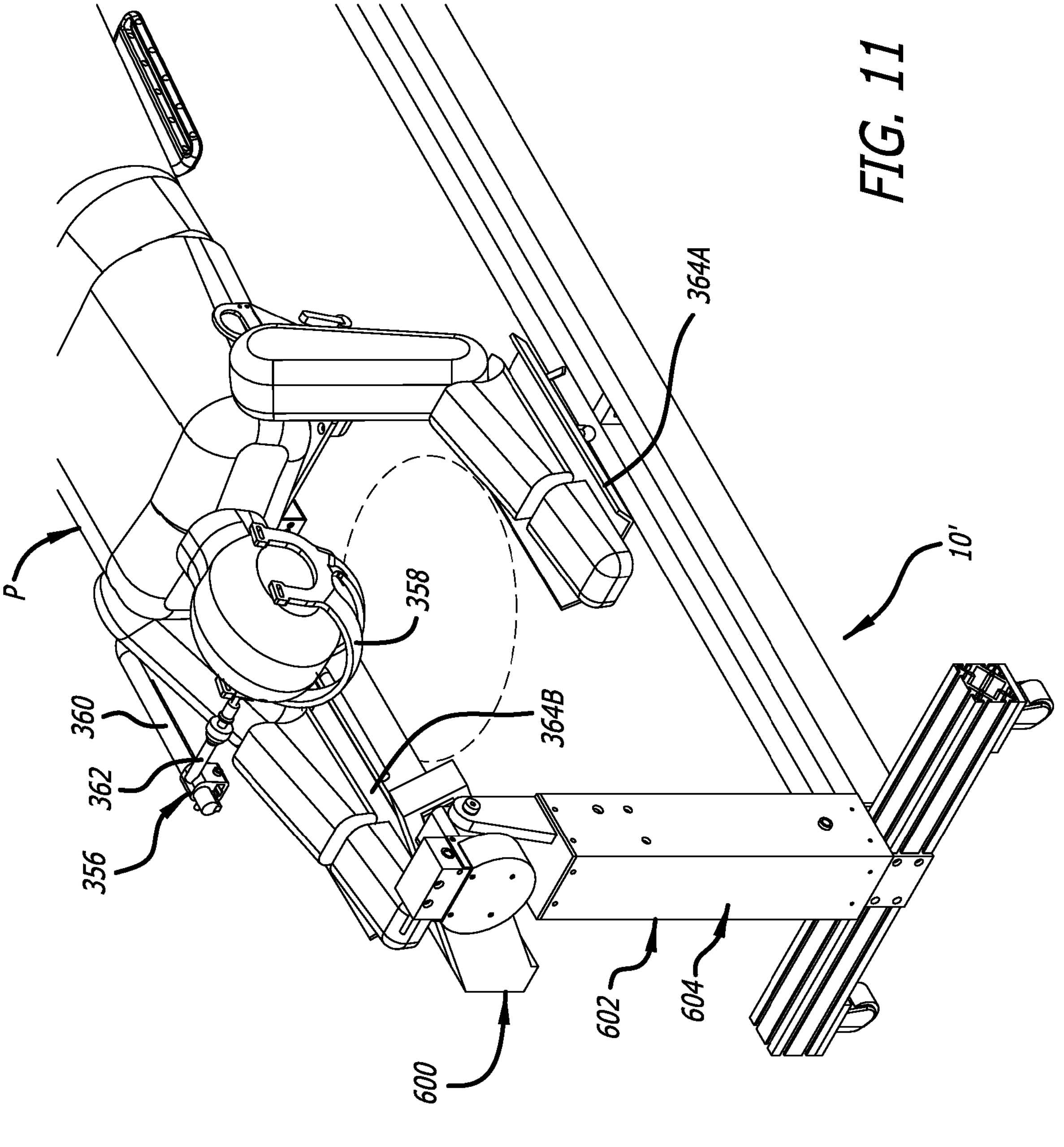
FIG. 11 is a top perspective view of portions of the surgical frame of FIG. 6 showing an area of access to the head of the patient positioned thereon a prone position.

The offset main beam 600 is used to facilitate rotation of the patient P. The offset main beam 600 can be rotated a full 360° before and during surgery to facilitate various positions of the patient to afford various surgical pathways to the patient's spine depending on the surgery to be performed. For example, the offset main beam 600 can be positioned to place the patient P in a prone position (e.g., FIGS. 6-9), a lateral position (e.g., FIG. 10), and in a position 45° between the prone and lateral positions. Furthermore, the offset main beam 600 can be rotated to afford anterior, posterior, lateral, anterolateral, and posterolateral pathways to the spine. As such, the patient's body can be flipped numerous times before and during surgery without compromising sterility or safety. The various support components of the surgical frame 10' are strategically placed to further manipulate the patient's body into position before and during surgery. Such intraoperative manipulation and positioning of the patient P affords a surgeon significant access to the patient's body. To illustrate, when the offset main beam 600 is rotated to position the patient P in a lateral position, as depicted in FIG. 10, the head support 356, the arm supports 364, the torso-lift support 366, the sagittal adjustment assembly 370, and/or the coronal adjustment assembly 374 can be articulated such that the surgical frame 10' is OLIF-capable or DLIF-capable.

Figure 6:
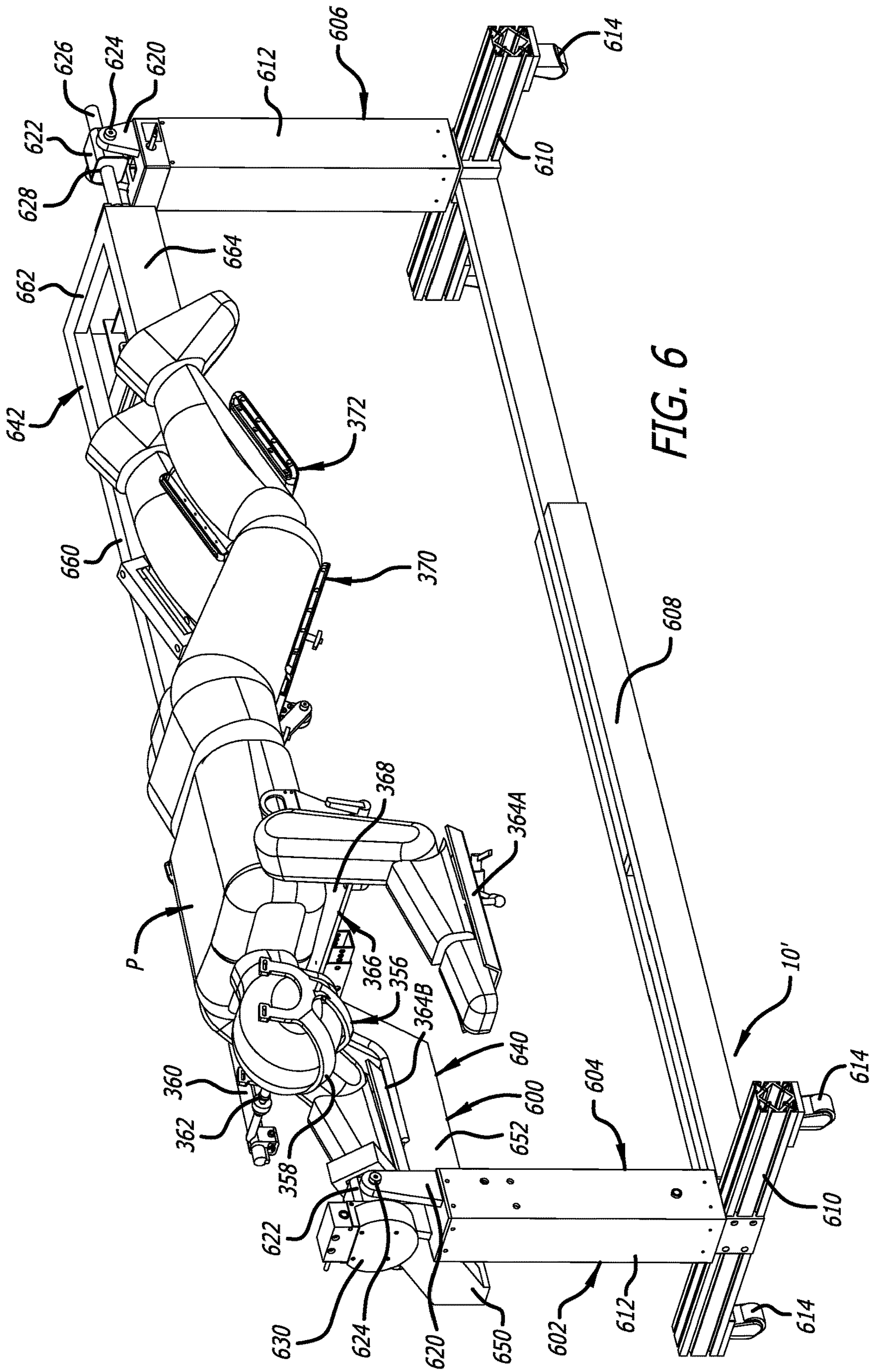
FIG. 6 is a top perspective view of another embodiment of a surgical frame according to the present invention with a patient positioned thereon in a prone position.
Figure 7:
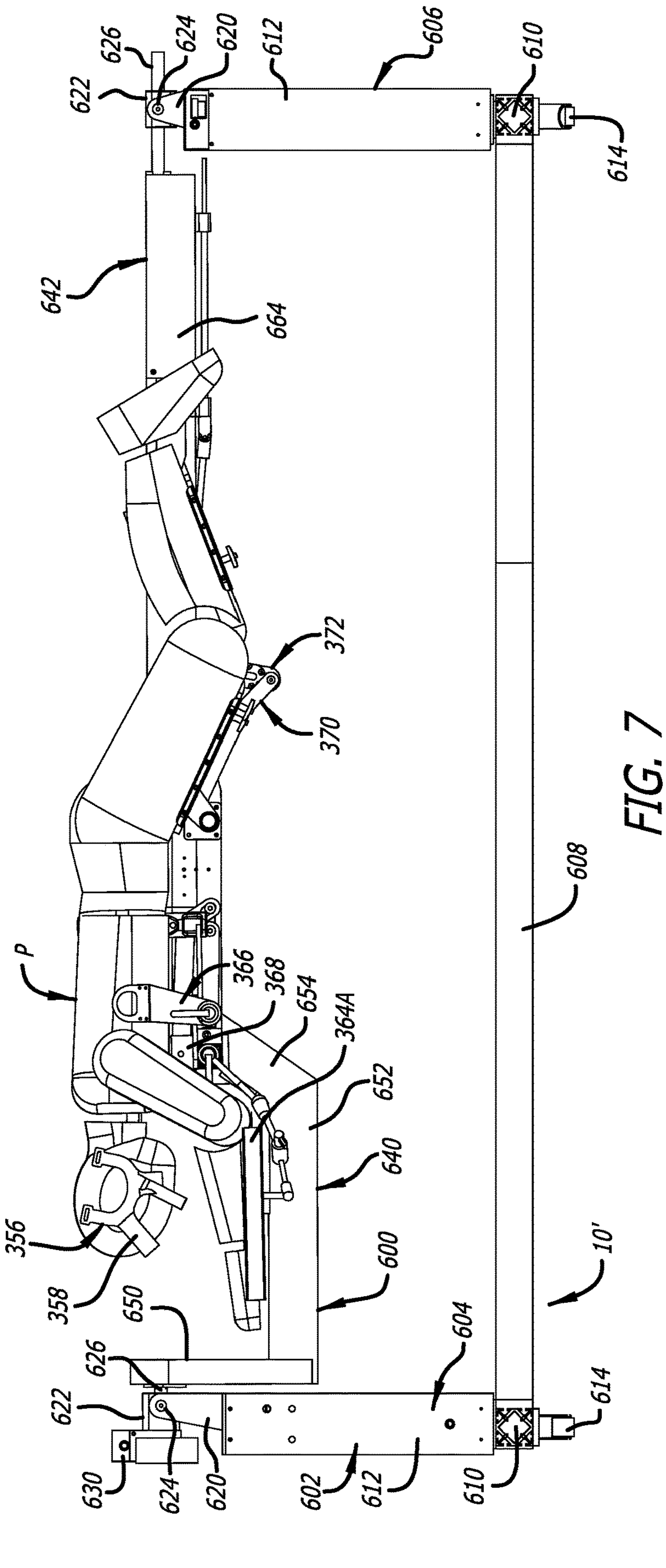
FIG. 7 is a side elevational view of the surgical frame of FIG. 6 with the patient positioned thereon in a prone position.
Figure 8:
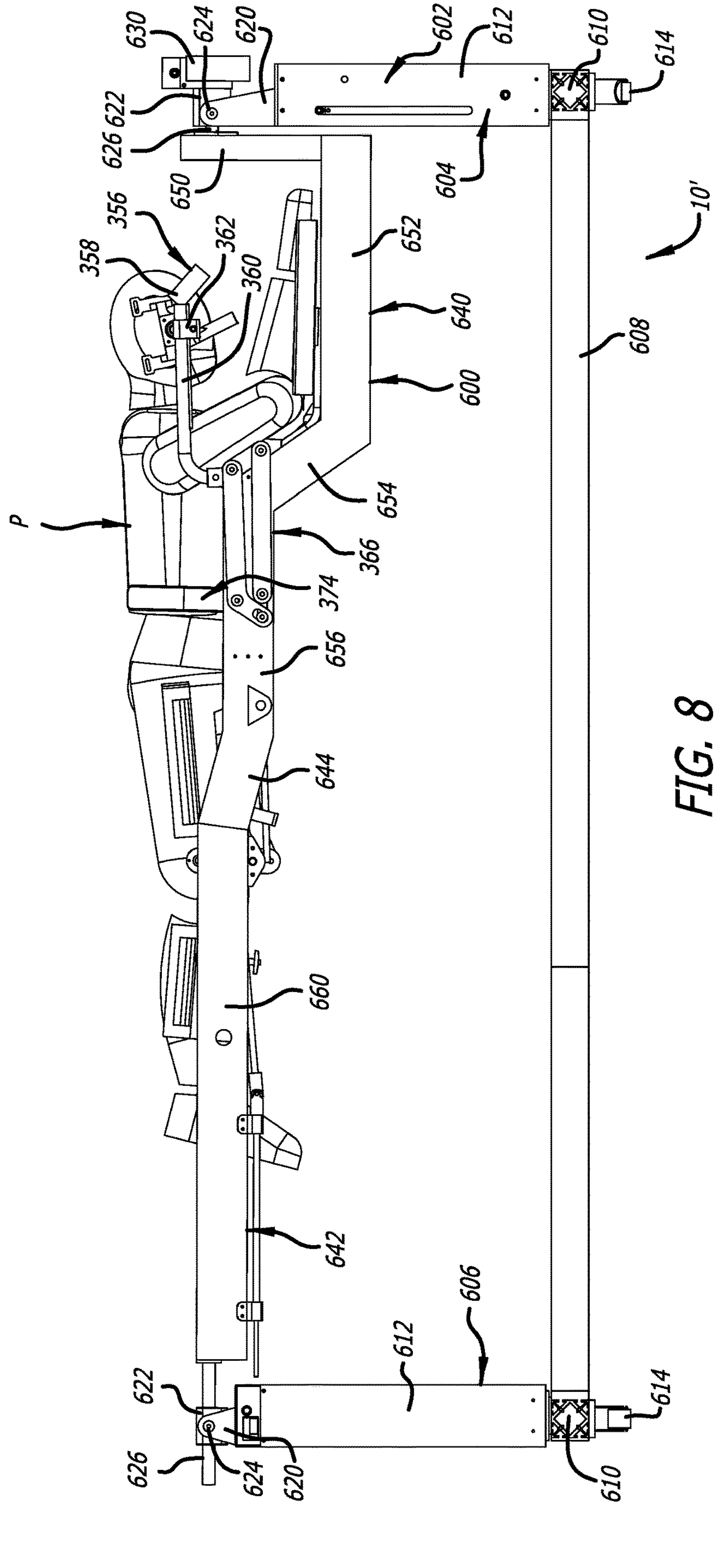
FIG. 8 is another side elevational view of the surgical frame of FIG. 6 with the patient positioned thereon in a prone position.

As depicted in FIG. 6, for example, the support structure 602 includes a first support portion 604 and a second support portion 606 interconnected by a cross member 608. Each of the first and second support portions 604 and 606 include a horizontal portion 610 and a vertical support post 612. The horizontal portions 610 are connected to the cross member 608, and casters 614 can be attached to the horizontal portions 610 to facilitate movement of the surgical frame 10'.

The vertical support posts 612 can be adjustable to facilitate expansion and contraction of the heights thereof. Expansion and contraction of the vertical support posts 612 facilitates raising and lowering, respectively, of the offset main beam 600. As such, the vertical support posts 612 can be adjusted to have equal or different heights. For example, the vertical support posts 612 can be adjusted such that the vertical support post 612 of the second support portion 606 is raised 12 inches higher than the vertical support post 612 of the first support portion 604 to place the patient P in a reverse Trendelenburg position.

Furthermore, cross member 608 can be adjustable to facilitate expansion and contraction of the length thereof. Expansion and contraction of the cross member 608 facilitates lengthening and shortening, respectively, of the distance between the first and second support portions 604 and 606.

The vertical support post 612 of the first and second support portions 604 and 606 have heights at least affording rotation of the offset main beam 600 and the patient P positioned thereon. Each of the vertical support posts 612 include a clevis 620, a support block 622 positioned in the clevis 620, and a pin 624 pinning the clevis 620 to the support block 622. The support blocks 622 are capable of pivotal movement relative to the clevises 620 to accommodate different heights of the vertical support posts 612. Furthermore, axles 626 extending outwardly from the offset main beam 600 are received in apertures 628 formed the support blocks 622. The axles 626 define an axis of rotation of the offset main beam 600, and the interaction of the axles 626 with the support blocks 622 facilitate rotation of the offset main beam 600.

Furthermore, a servomotor 630 can be interconnected with the axle 626 received in the support block 622 of the first support portion 604. The servomotor 630 can be computer controlled and/or operated by the operator of the surgical frame 10' to facilitate controlled rotation of the offset main beam 600. Thus, by controlling actuation of the servomotor 630, the offset main beam 600 and the patient P supported thereon can be rotated to afford the various surgical pathways to the patient's spine.

As depicted in FIGS. 6-10, for example, the offset main beam 600 includes a forward portion 640 and a rear portion 642. The forward portion 640 supports the head support 356, the arm supports 364, the torso-lift support 366, and the coronal adjustment assembly 374, and the rear portion 642 supports the sagittal adjustment assembly 370. The forward and rear portions 640 and 642 are connected to one another by connection member 644 shared therebetween. The forward portion 640 includes a first portion 650, a second portion 652, a third portion 654, and a fourth portion 656. The first portion 650 extends transversely to the axis of rotation of the offset main beam 600, and the second and fourth portions 652 and 656 are aligned with the axis of rotation of the offset main beam 600. The rear portion 642 includes a first portion 660, a second portion 662, and third portion 664. The first and third portions 660 and 664 are aligned with the axis of rotation of the offset main beam 600, and the second portion 662 extends transversely to the axis of rotation of the offset main beam 600.

The axles 626 are attached to the first portion 650 of the forward portion 640 and to the third portion 664 of the rear portion 642. The lengths of the first portion 650 of the forward portion 640 and the second portion 662 of the rear portion 642 serve in offsetting portions of the forward and rear portion 640 and 642 from the axis of rotation of the offset main beam 600. This offset affords positioning of the cranial-caudal axis of patient P approximately aligned with the axis of rotation of the offset main beam 600.

Programmable settings controlled by a computer controller (not shown) can be used to maintain an ideal patient height for a working position of the surgical frame at a near-constant position through rotation cycles, for example, between the patient positions depicted in FIGS. 6 and 10. This allows for a variable axis of rotation between the first portion 604 and the second portion 606.

As depicted in FIG. 10, for example, the head support 356 is attached to a chest support plate 368 of the torso-lift support 366 to support the head of the patient P. If the torso-lift support 366 is not used, the head support 356 can be directly attached to the forward portion 640 of the offset main beam 600. As depicted in FIGS. 9 and 10, for example, the head support 356 further includes a facial support cradle 358, an axially adjustable head support beam 360, and a temple support portion 362. Soft straps (not shown) can be used to secure the patient P to the head support 356. The facial support cradle 358 includes padding across the forehead and cheeks, and provides open access to the mouth of the patient P. The head support 356 also allows for imaging access to the cervical spine. Adjustment of the head support 356 are possible via adjusting the angle and the length of the head support beam 360 and the temple support portion 362.

As depicted in FIG. 10, for example, the arm supports 364 contact the forearms and support the remainder of the arms of the patient P, with a first arm support 364A and a second arm support 364B attached to the chest support plate 368 of the torso-lift support 366. If the torso-lift support 366 is not used, the arm supports 364 can both be directly attached to the offset main beam 600. The arm supports 364 are positioned such that the arms of the patient P are spaced away from the remainder of the patient's body to provide access (FIG. 11) to at least portions of the face and neck of the patient P, thereby providing greater access to the patient.

Figure 12:
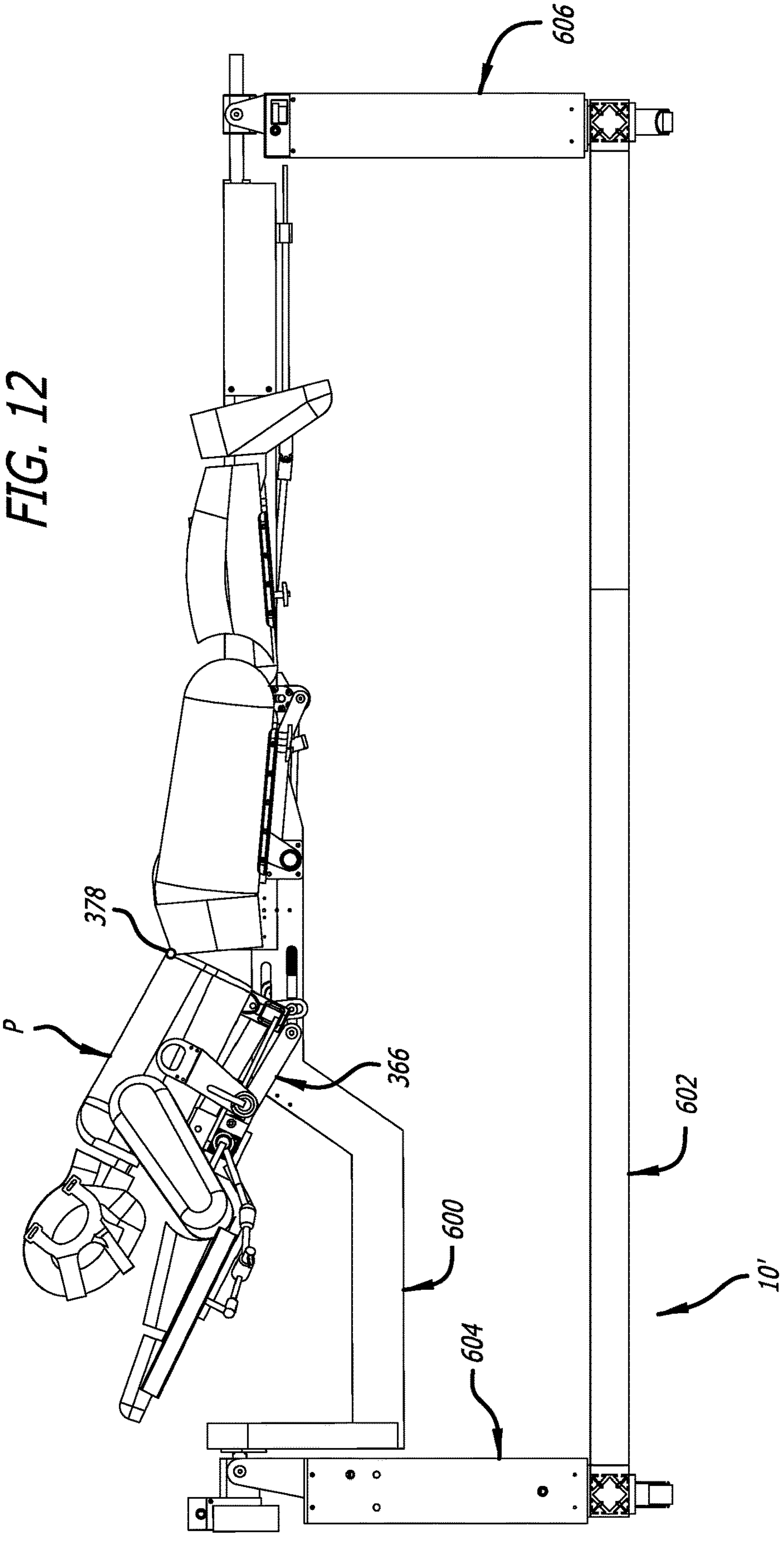
FIG. 12 is a side elevational view of the surgical frame of FIG. 6 showing a torso-lift support supporting the patient in a lifted position.
Figure 13:
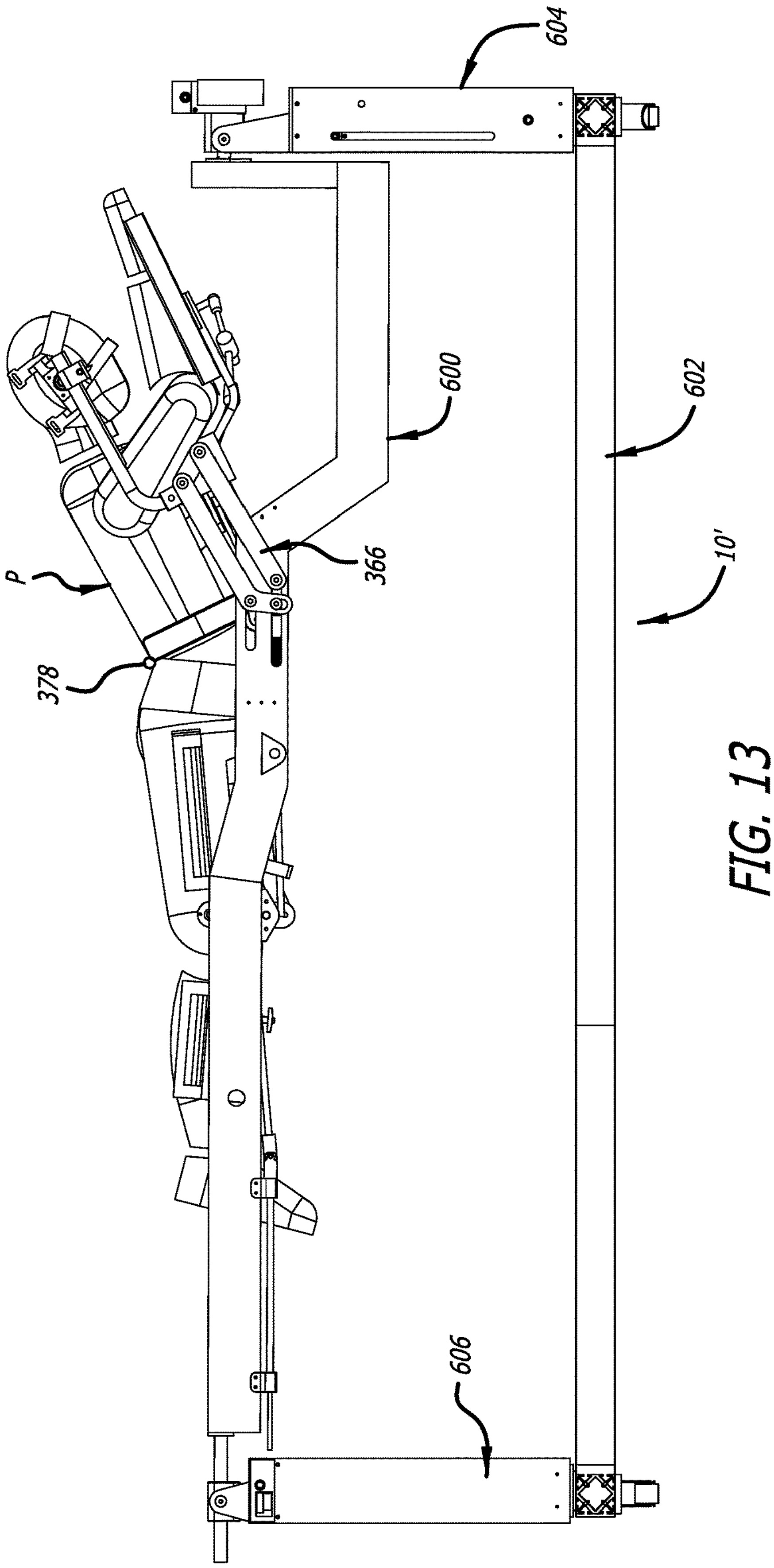
FIG. 13 is another side elevational view of the surgical frame of FIG. 6 showing the torso-lift support supporting the patient in the lifted position.
Figure 14:
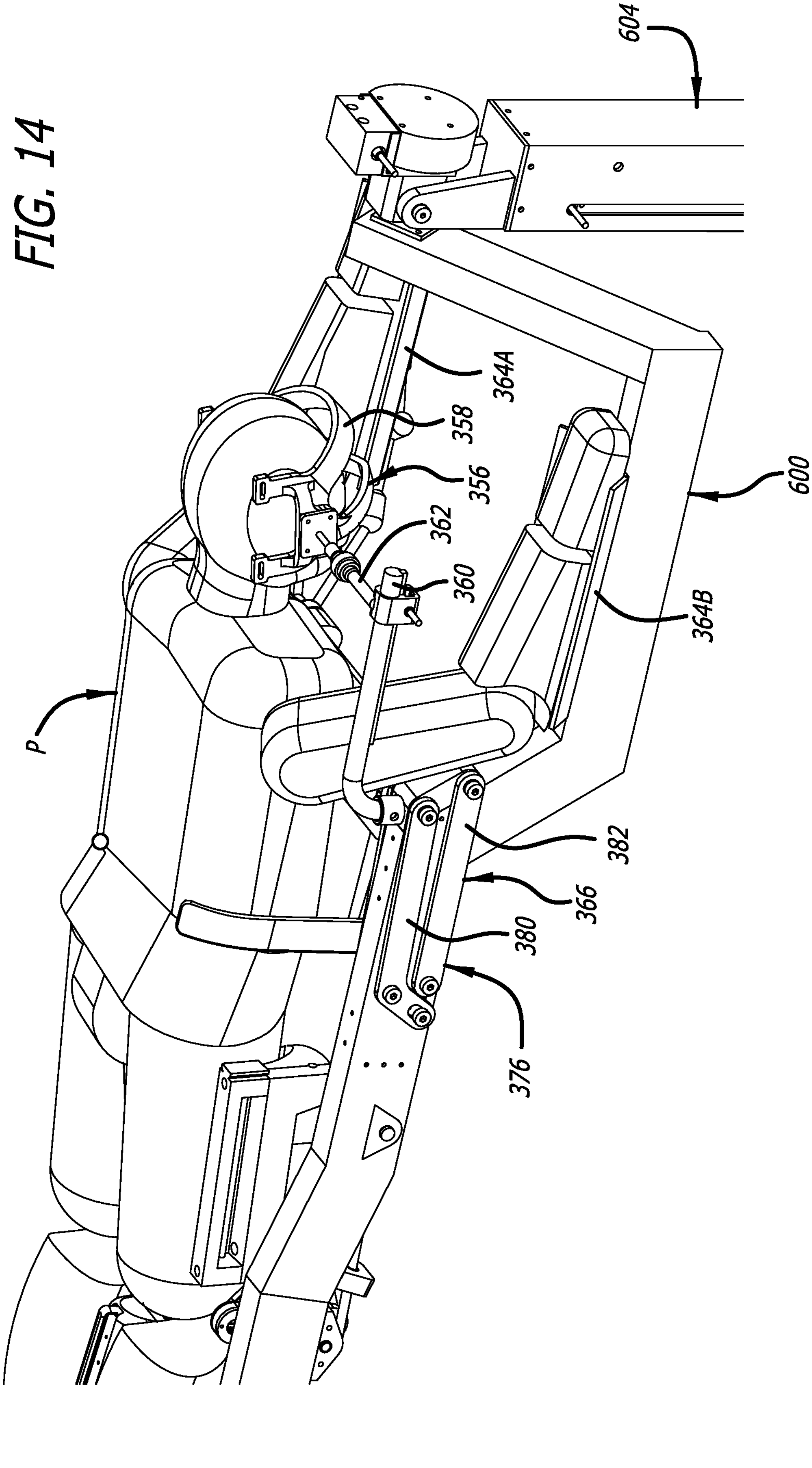
FIG. 14 is an enlarged top perspective view of portions of the surgical frame of FIG. 6 showing the torso-lift support supporting the patient in an unlifted position.
Figure 15:
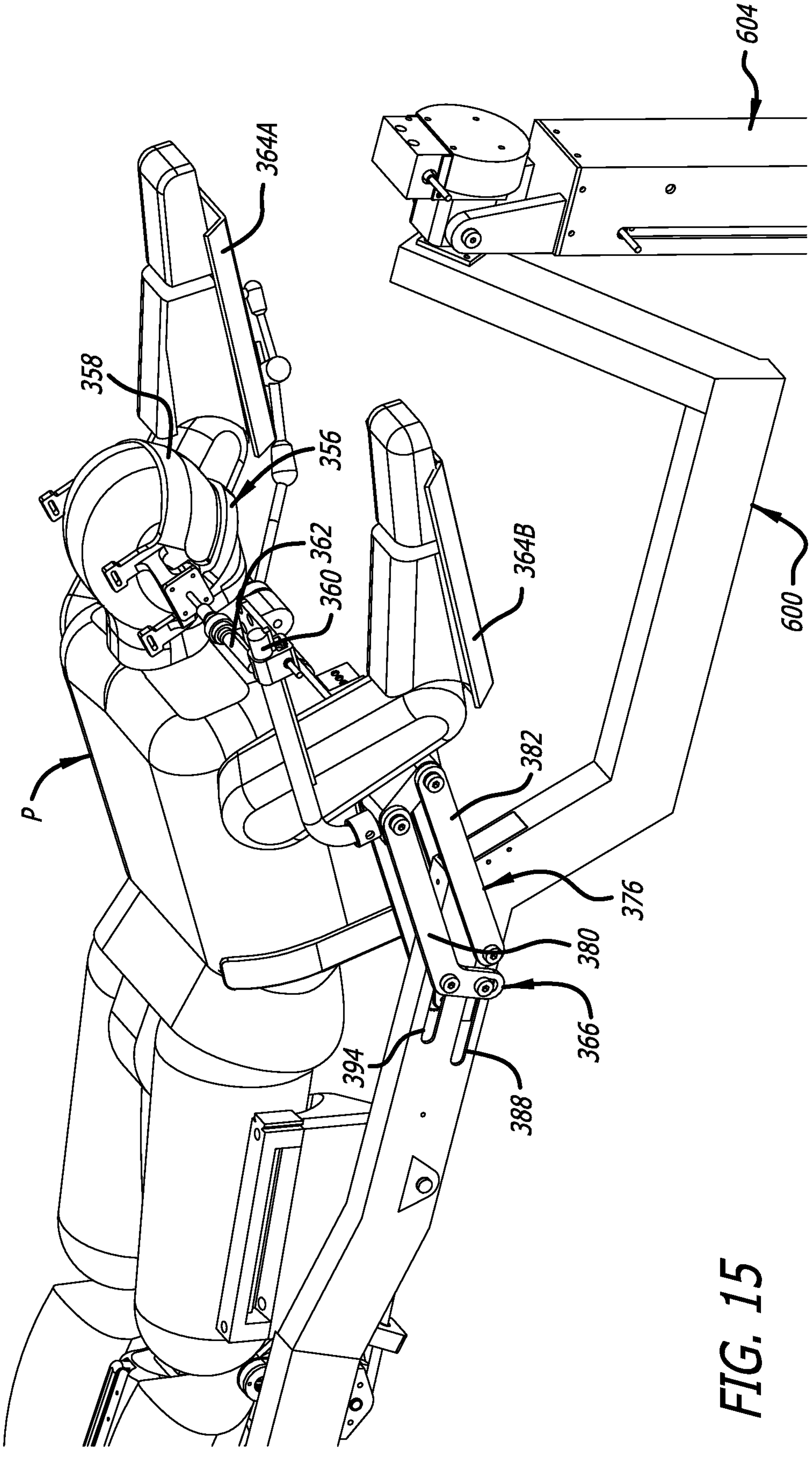
FIG. 15 is an enlarged top perspective view of portions of the surgical frame of FIG. 6 showing the torso-lift support supporting the patient in the lifted position.

As depicted in FIGS. 12-17, for example, the surgical frame 10' includes a torso-lift capability for lifting and lowering the torso of the patient P between an uplifted position and a lifted position, which is described in detail below with respect to the torso-lift support 366. As depicted in FIGS. 12 and 13, for example, the torso-lift capability has an approximate center of rotation ("COR") 378 that is located at a position anterior to the patient's spine about the L2 of the lumbar spine, and is capable of elevating the upper body of the patient at least an additional six inches when measured at the chest support plate 368.

As depicted in FIGS. 14-17, for example, the torso-lift support 366 includes a "crawling" four bar mechanism 376 attached to the chest support plate 368. Soft straps (not shown) can be used to secure the patient P to the chest support plate 368. The head support 356 and the arm supports 364 are attached to the chest support plate 368, thereby moving with the chest support plate 368 as the chest support plate 368 is articulated using the torso-lift support 366. The fixed COR 378 is defined at the position depicted in FIGS. 12 and 13. Appropriate placement of the COR 378 is important so that spinal cord integrity is not compromised (i.e., overly compressed or stretched) during the lift maneuver performed by the torso-life support 366.

Figure 16:
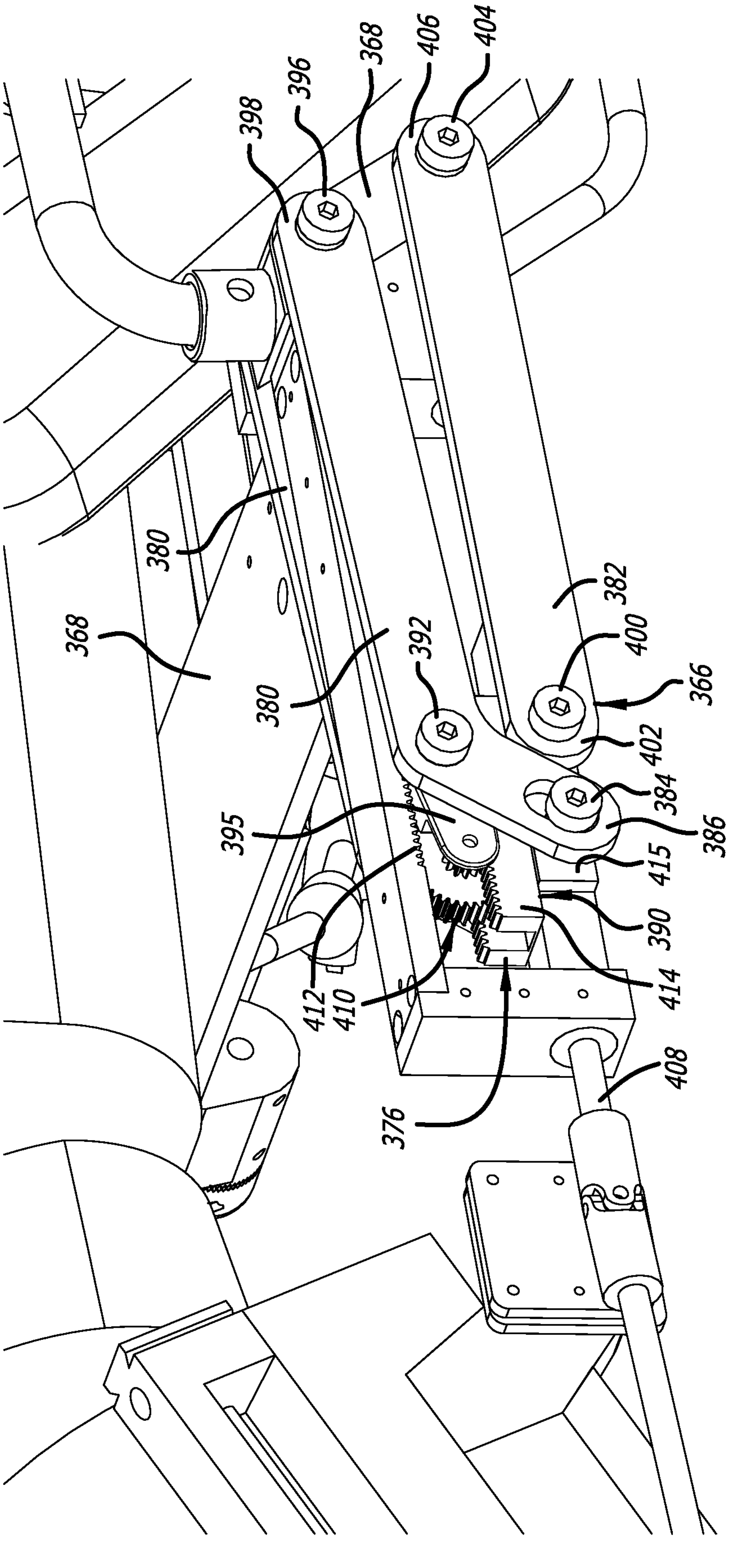
FIG. 16 is an enlarged top perspective view of componentry of the torso-lift support in the unlifted position.
Figure 17:
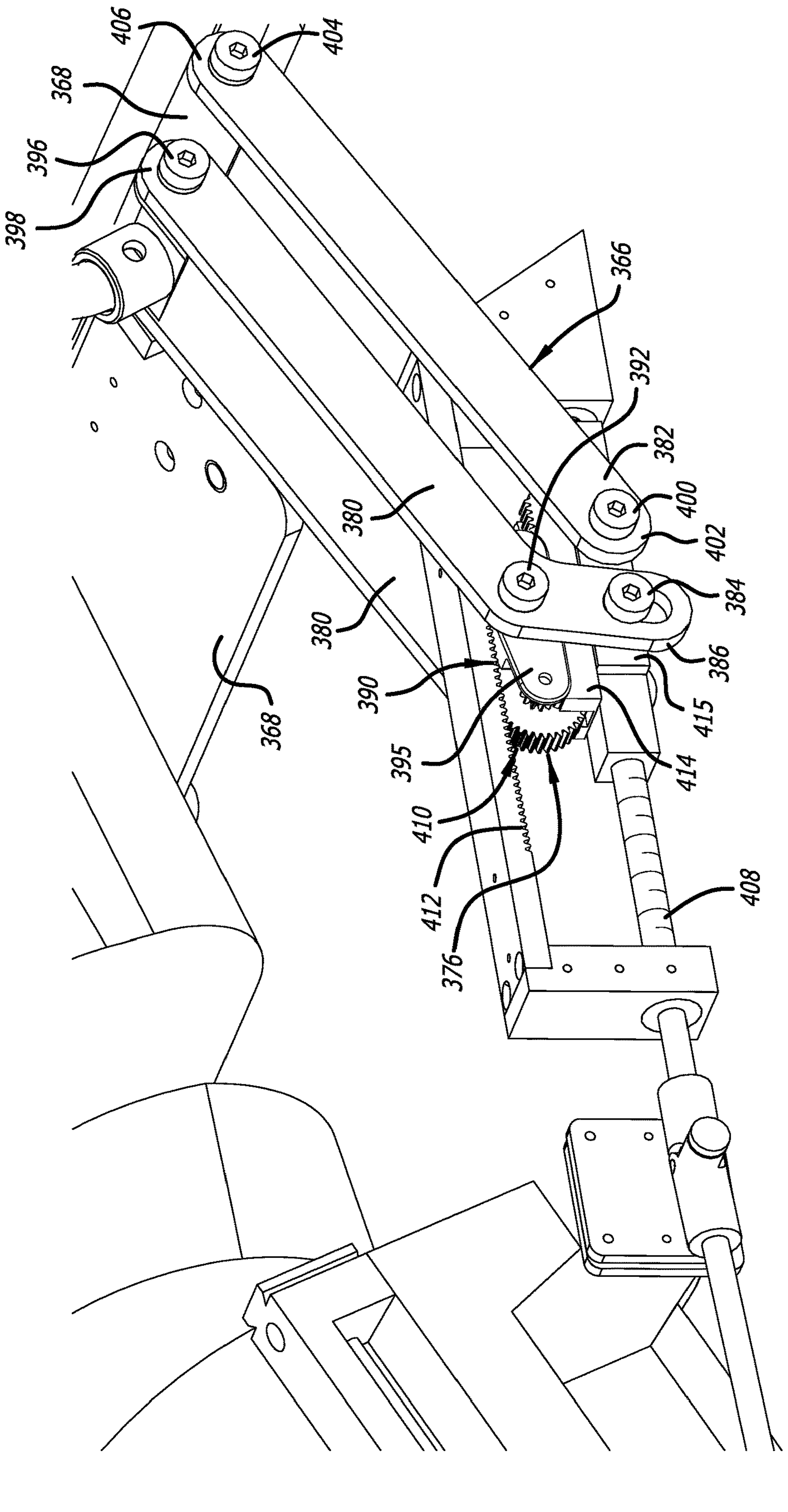
FIG. 17 is an enlarged top perspective view of the componentry of the torso-lift support in the lifted position.

As depicted in FIGS. 14-17, for example, the four bar mechanism 376 includes first links 380 pivotally connected between offset main beam 600 and the chest support plate 368, and second links 382 pivotally connected between the offset main beam 600 and the chest support plate 368. As depicted in FIGS. 16 and 17, for example, in order to maintain the COR 378 at the desired fixed position, the first and second links 380 and 382 of the four bar mechanism 376 crawl toward the first portion 604 of the support structure 602, when the patient's upper body is being lifted. The first and second links 380 and 382 are arranged such that neither the surgeon's workspace nor imaging access are compromised while the patient's torso is being lifted.

As depicted in FIGS. 16 and 17, for example, each of the first links 380 define an L-shape, and includes a first pin 384 at a first end 386 thereof. The first pin 384 extends through first elongated slots 388 defined in the offset main beam 600, and the first pin 384 connects the first links 380 to a dual rack and pinion mechanism 390 via a drive nut 415 provided within the offset main beam 600, thus defining a lower pivot point thereof. Each of the first links 380 also includes a second pin 392 positioned proximate the corner of the L-shape. The second pin 392 extends through second elongated slots 394 defined in the offset main beam 600, and is linked to a carriage 395 of rack and pinion mechanism 390. Each of the first links 380 also includes a third pin 396 at a second end 398 that is pivotally attached to chest support plate 368, thus defining an upper pivot point thereof.

As depicted in FIGS. 16 and 17, for example, each of the second links 382 includes a first pin 400 at a first end 402 thereof. The first pin 400 extends through the first elongated slot 388 defined in the offset main beam 600, and the first pin 400 connects the second links 382 to the drive nut 415 of the rack and pinion mechanism 390, thus defining a lower pivot point thereof. Each of the second links 382 also includes a second pin 404 at a second end 406 that is pivotally connected to the chest support plate 368, the defining an upper pivot point thereof.

As depicted in FIGS. 16 and 17, the rack and pinion mechanism 390 includes a drive screw 408 engaging the drive nut 415. Coupled gears 410 are attached to the carriage 395. The larger of the gears 410 engage an upper rack 412 (fixed within the offset main beam 600), and the smaller of the gears 410 engage a lower rack 414. The carriage 395 is defined as a gear assembly that floats between the two racks 412 and 414.

As depicted in FIGS. 16 and 17, the rack and pinion mechanism 390 converts rotation of the drive screw 408 into linear translation of the first and second links 380 and 382 in the first and second elongated slots 388 and 394 toward the first portion 604 of the support structure 602. As the drive nut 415 translates along drive screw 408 (via rotation of the drive screw 408), the carriage 395 translates towards the first portion 604 with less travel due to the different gear sizes of the coupled gears 410. The difference in travel, influenced by different gear ratios, causes the first links 380 pivotally attached thereto to lift the chest support plate 368. Lowering of the chest support plate 368 is accomplished by performing this operation in reverse. The second links 382 are "idler" links (attached to the drive nut 415 and the chest support plate 368) that controls the tilt of the chest support plate 368 as it is being lifted and lowered. All components associated with lifting while tilting the chest plate predetermine where COR 378 resides. Furthermore, a servomotor (not shown) interconnected with the drive screw 408 can be computer controlled and/or operated by the operator of the surgical frame 10' to facilitate controlled lifting and lowering of the chest support plate 368. A safety feature can be provided, enabling the operator to read and limit a lifting and lowering force applied by the torso-lift support 366 in order to prevent injury to the patient P. Moreover, the torso-lift support 366 can also include safety stops (not shown) to prevent over-extension or compression of the patient P, and sensors (not shown) programmed to send patient position feedback to the safety stops.

Figure 18A:
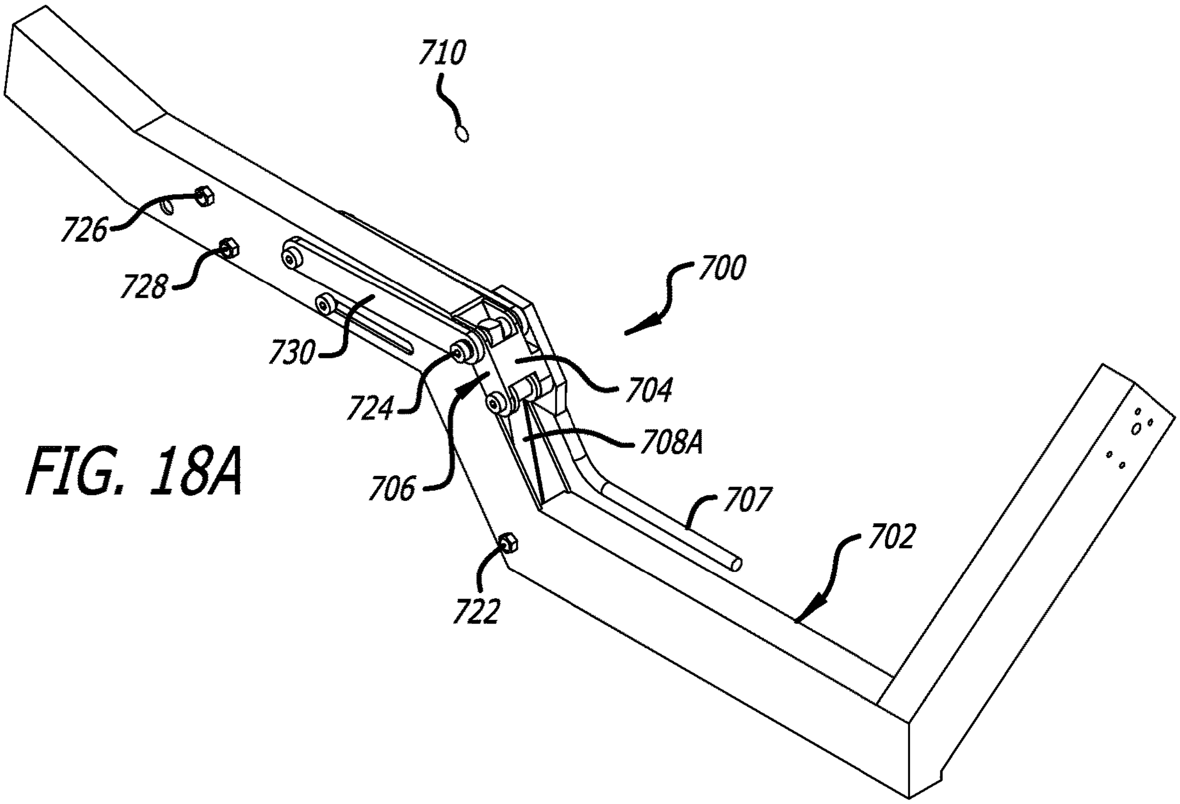
FIG. 18A is a perspective view of an embodiment of a structural offset main beam for use with another embodiment of a torso-lift support showing the torso-lift support in a retracted position.

An alternative preferred embodiment of a torso-lift support is generally indicated by the numeral 700 in FIGS. 18A-20. As depicted in FIGS. 18A-18C, an alternate offest main beam 702 is utilized with the torso-lift support 700. Furthermore, the torso-lift support 700 has a support plate 704 pivotally linked to the offset main beam 702 by a chest support lift mechanism 706. An arm support rod/plate 707 is connected to the support plate 704, and the second arm support 364B. The support plate 704 is attached to the chest support plate 368, and the chest support lift mechanism 706 includes various actuators 708 used to facilitate positioning and repositioning of the support plate 704 (and hence, the chest support plate 368).

Figure 18B:
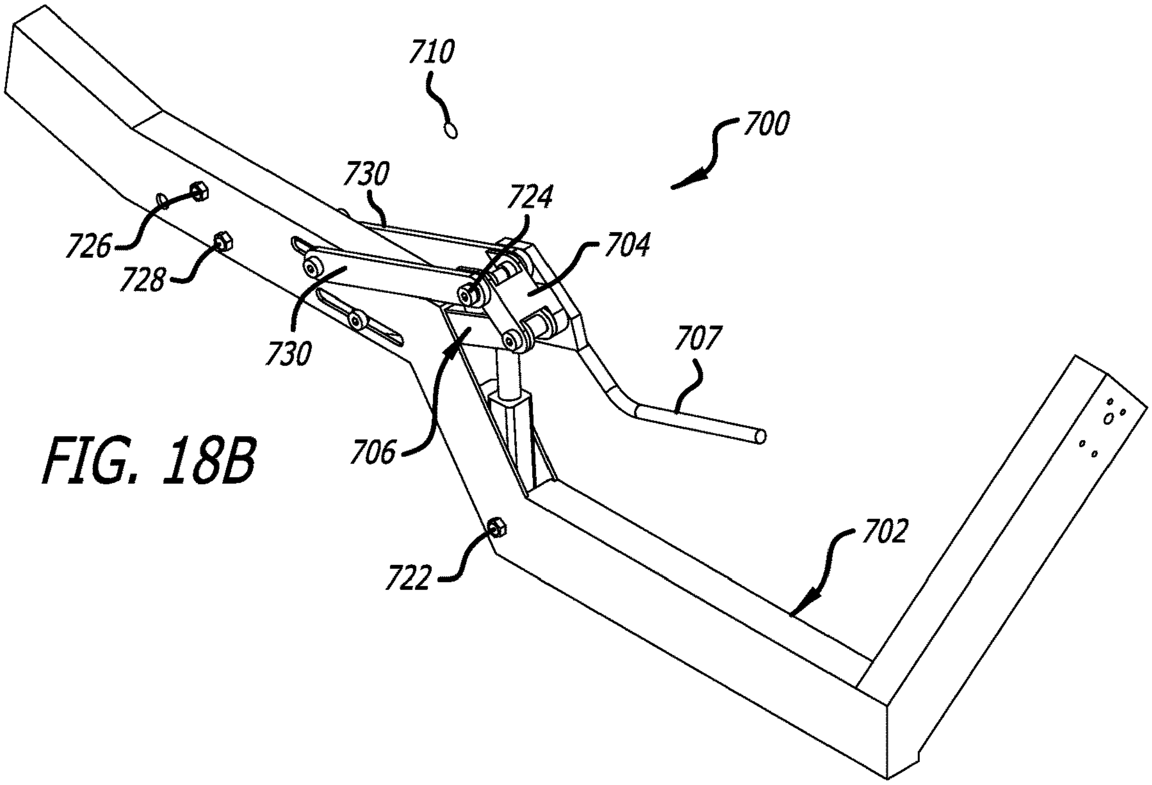
FIG. 18B is a perspective view similar to FIG. 18A showing the torso-lift support at half travel.
Figure 18C:
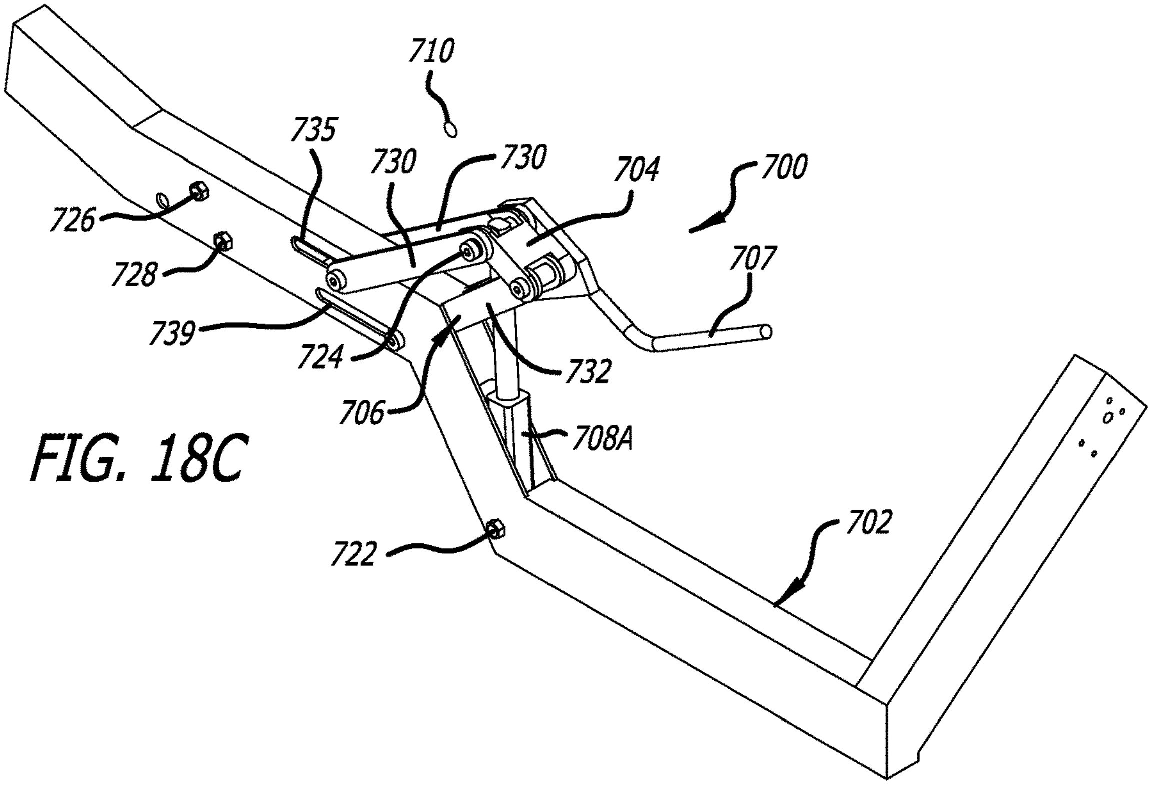
FIG. 18C is a perspective view similar to FIGS. 18A and 18B showing the torso-lift support at full travel.

As discussed below, the torso-lift support 700 depicted in FIGS. 18A-20 enables a COR 710 of the patient P thereof to be programmably altered such that the COR 710 can be a fixed COR or a variable COR. As their names suggest, the fixed COR stays in the same position as the torso-lift support 700 is actuated, and the variable COR moves between a first position and a second position as the torso-lift support 700 is actuated between its initial position and final position at full travel thereof. Appropriate placement of the COR 710 is important so that spinal cord integrity is not compromised (i.e., overly compressed or stretched). Thus, the support plate 704 (and hence, the chest support plate 368) follows a path coinciding with a predetermined COR 710 (either fixed or variable). FIG. 18A depicts the torso-lift support 700 retracted, FIG. 18B depicts the torso-lift support 700 at half travel, and FIG. 18C depicts the torso-lift support 700 at full travel.

Figure 19:
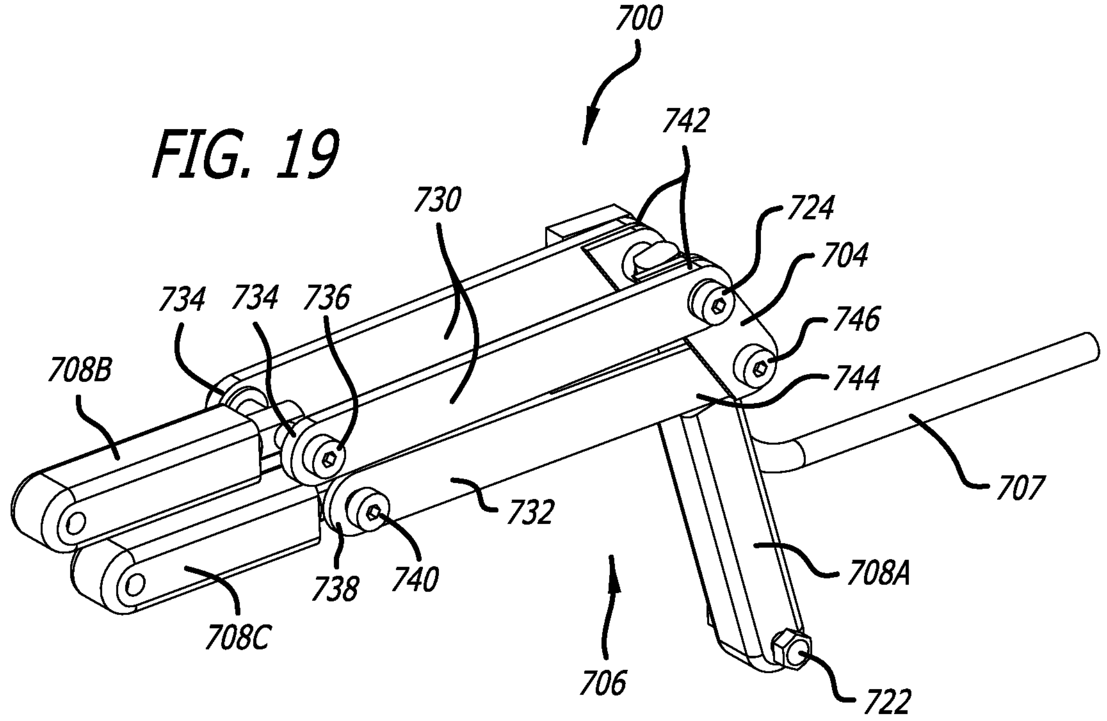
FIG. 19 is a perspective view of a chest support lift mechanism of the torso-lift support of FIGS. 18A-18C with actuators thereof retracted.
Figure 20:
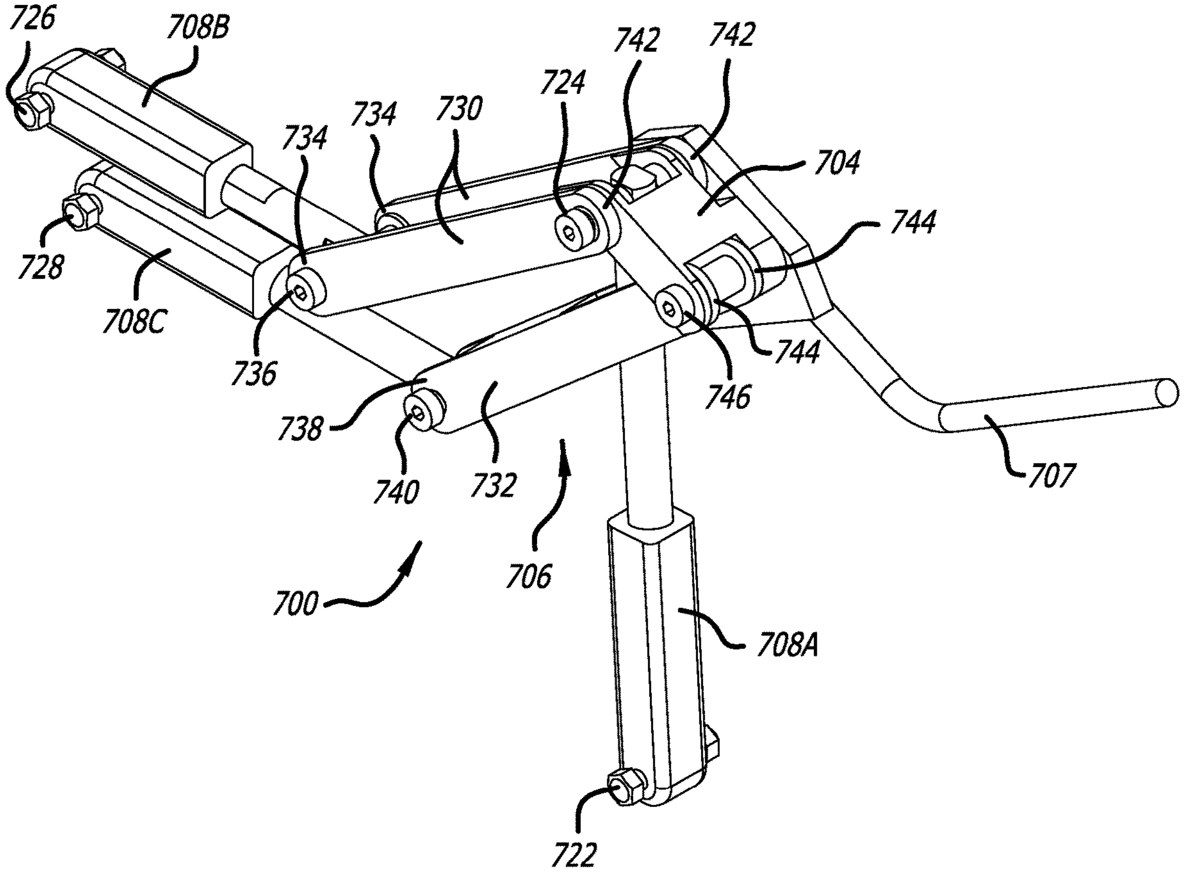
FIG. 20 is another perspective view of a chest support lift mechanism of the torso-lift support of FIGS. 18A-18C with the actuators thereof extended.

As discussed above, the chest support lift mechanism 706 includes actuators 708 to position and reposition the support plate 704 (and hence, the chest support plate 368). As depicted in FIGS. 19 and 20, for example, a first actuator 708A, a second actuator 708B, and a third actuator 708C are provided. Each of the actuators 708A, 708B, and 708C are interconnected with the offset main beam 600 and the support plate 704, and each of the actuators 708A, 708B, and 708C are moveable between a retracted and extended position. As depicted in FIGS. 18A-18C, the first actuator 708A is pinned to the offset main beam 702 using a pin 722 and pinned to the support plate 704 using a pin 724. Furthermore, the second and third actuators 708B and 708C are received within the offset main beam 702. The second actuator 708B is interconnected with the offset main beam 702 using a pin 726, and the third actuator 708C is interconnected with the offset main beam 702 using a pin 728.

The second actuator 708B is interconnected with the support plate 704 via first links 730, and the third actuator 708C is interconnected with the support plate 704 via second links 732. First ends 734 of the first links 730 are pinned to the second actuator 708B and elongated slots 735 formed in the offset main beam 702 using a pin 736, and first ends 738 of the second links 732 are pinned to the third actuator 708C and elongated slots 739 formed in the offset main beam 702 using a pin 740. The pins 736 and 740 are moveable within the elongated slots 735 and 739. Furthermore, second ends 742 of the first links 730 are pinned to the support plate 704 using the pin 724, and second ends 744 of the second links 732 are pinned to the support plate 704 using a pin 746. To limit interference therebetween, as depicted in FIGS. 18A-18C, the first links 730 are provide on the exterior of the offset main beam 702, and, depending on the position thereof, the second links 732 are positioned on the interior of the offset main beam 702.

Actuation of the actuators 708A, 708B, and 708C facilitates movement of the support plate 704. Furthermore, the amount of actuation of the actuators 708A, 708B, and 708C can be varied to affect different positions of the support plate 704. As such, by varying the amount of actuation of the actuators 708A, 708B, and 708C, the COR 710 thereof can be controlled. As discussed above, the COR 710 can be predetermined, and can be either fixed or varied. Furthermore, the actuation of the actuators 708A, 708B, and 708C can be computer controlled and/or operated by the operator of the surgical frame 10', such that the COR 710 can be programmed by the operator'. As such, an algorithm can be used to determine the rates of extension of the actuators 708A, 708B, and 708C to control the COR 710, and the computer controls can handle implementation of the algorithm to provide the predetermined COR. A safety feature can be provided, enabling the operator to read and limit a lifting force applied by the actuators 708A, 708B, and 708C in order to prevent injury to the patient P. Moreover, the torso-lift support 700 can also include safety stops (not shown) to prevent over-extension or compression of the patient P, and sensors (not shown) programmed to send patient position feedback to the safety stops.

FIGS. 21-28 depict portions of the sagittal adjustment assembly 370. The sagittal adjustment assembly 370 can be used to distract or compress the patient's lumbar spine during or after lifting or lowering of the patient's torso by the torso-lift supports. The sagittal adjustment assembly 370 supports and manipulates the lower portion of the patient's body. In doing so, the sagittal adjustment assembly 370 is configured to make adjustments in the sagittal plane of the patient's body, including tilting the pelvis, controlling the position of the upper and lower legs, and lordosing the lumbar spine.

Figure 21:
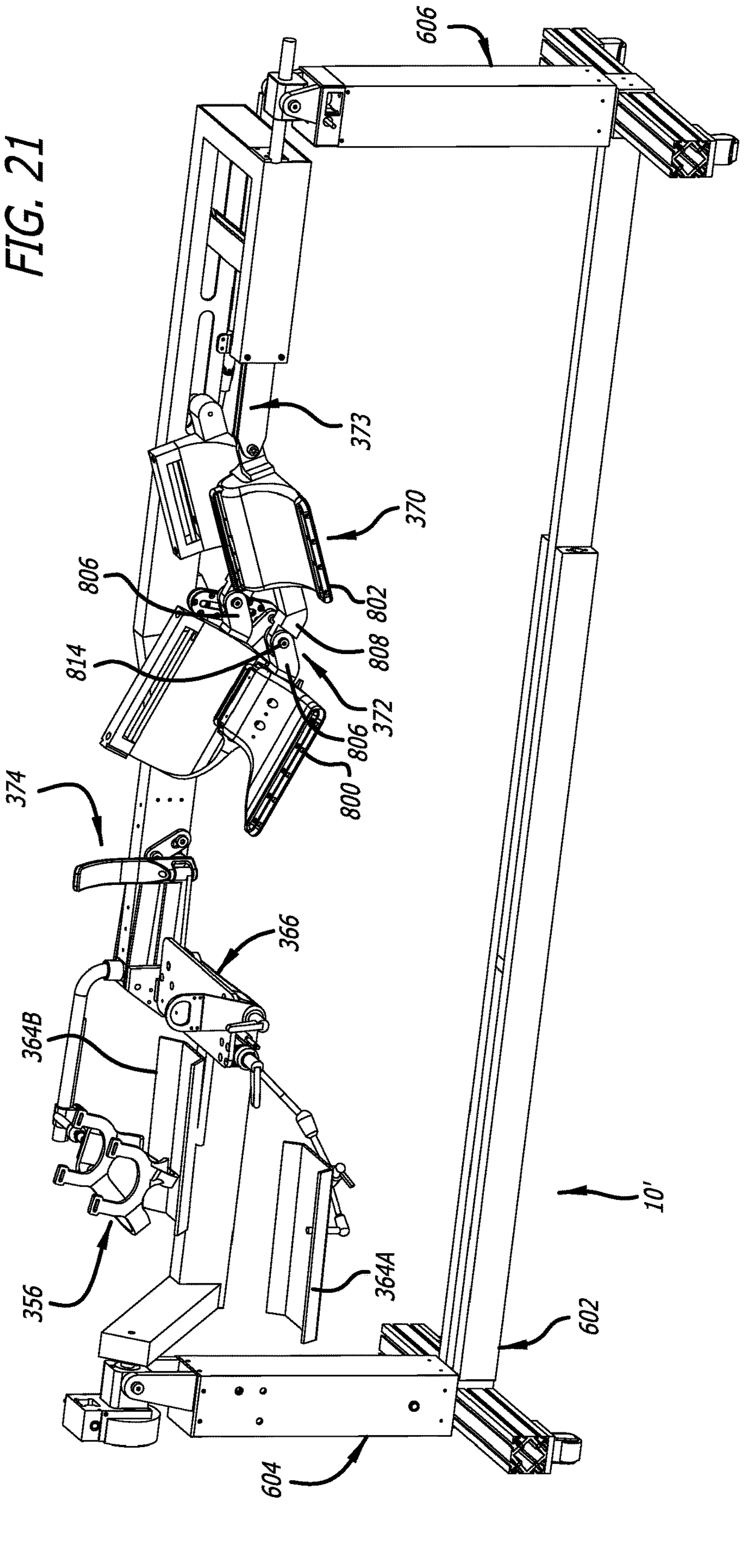
FIG. 21 is a top perspective view of the surgical frame of FIG. 6.
Figure 22:
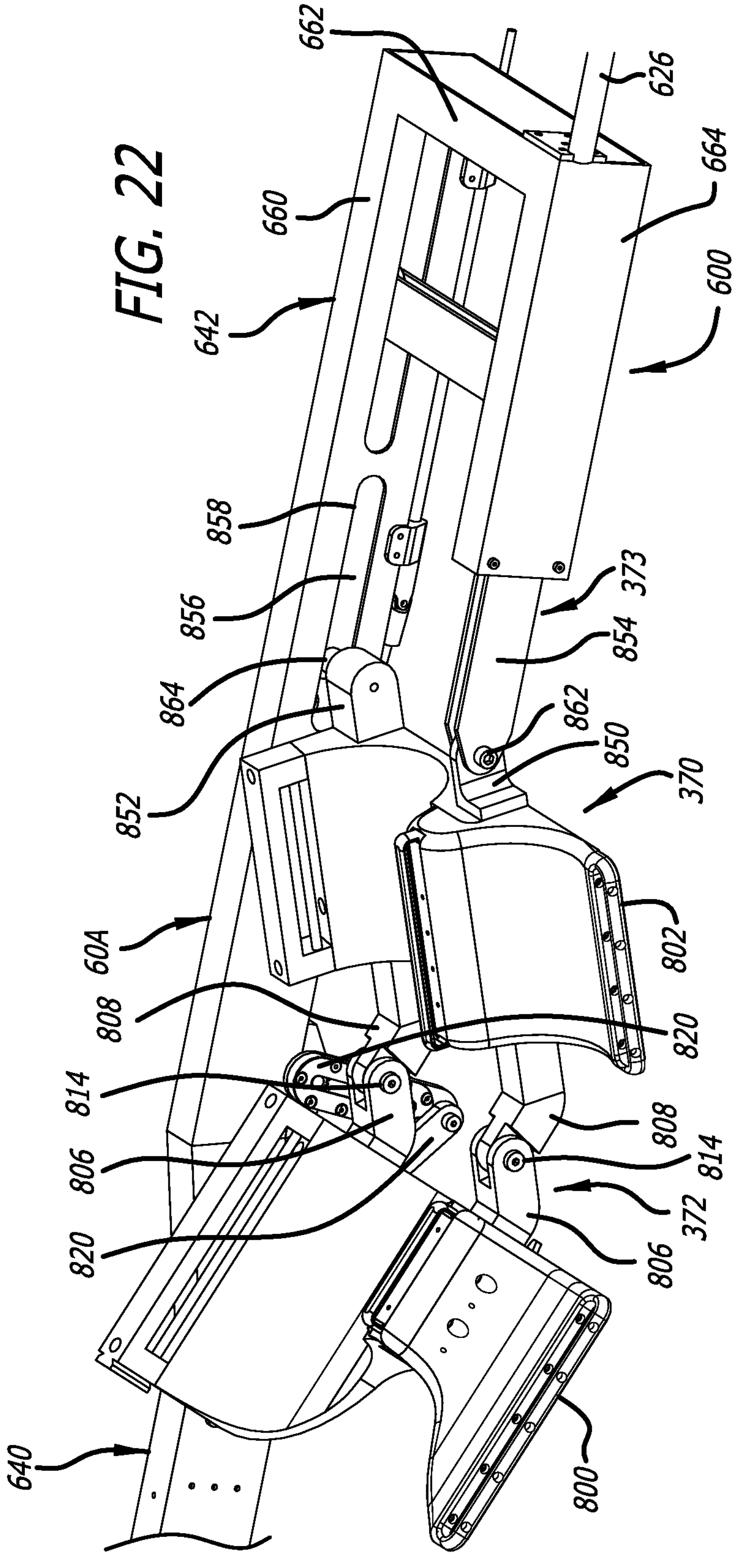
FIG. 22 is an enlarged top perspective view of portions of the surgical frame of FIG. 6 showing a sagittal adjustment assembly Including a pelvic-tilt mechanism and leg adjustment mechanism.
Figure 23:
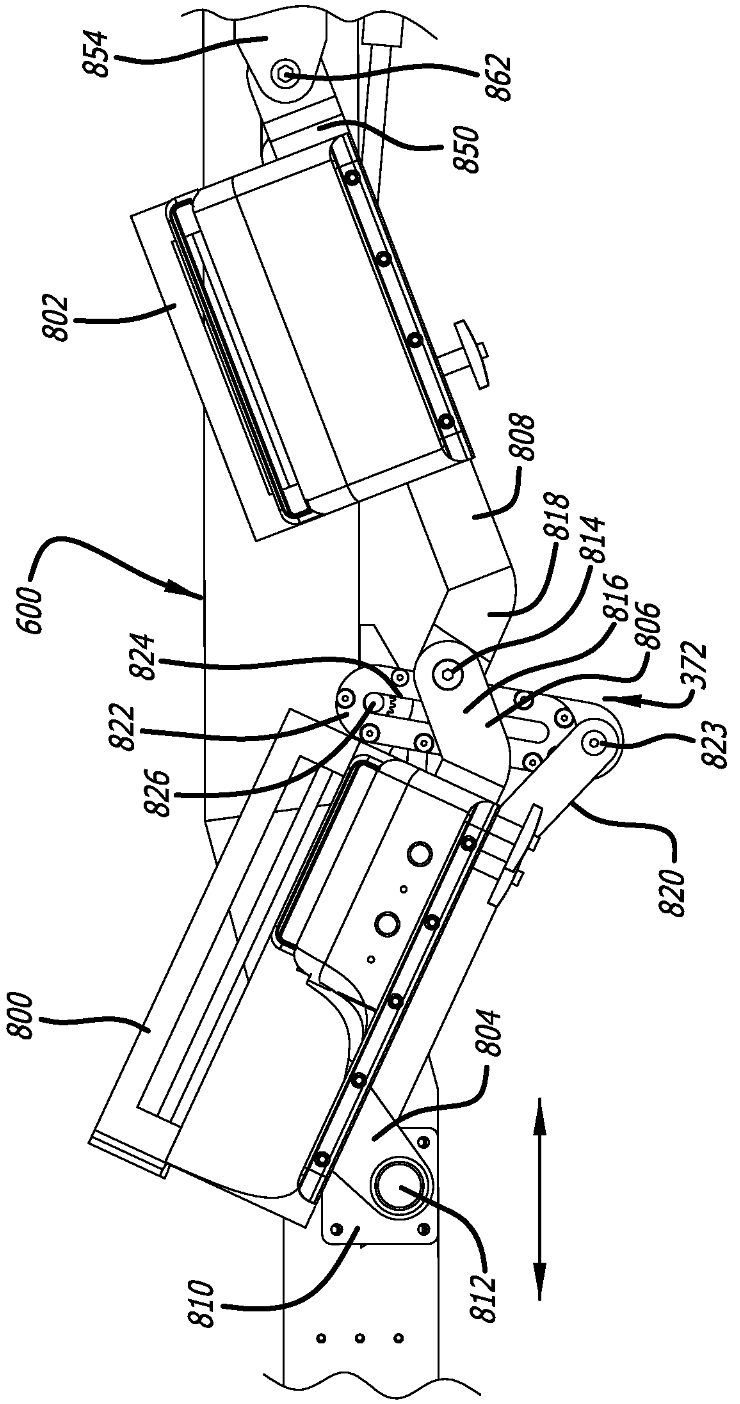
FIG. 23 is an enlarged side elevational view of portions of the surgical frame of FIG. 6 showing the pelvic-tilt mechanism.

As depicted in FIGS. 21 and 22, for example, the sagittal adjustment assembly 370 includes the pelvic-tilt mechanism 372 for supporting the thighs and lower legs of the patient P. The pelvic-tilt mechanism 372 includes a thigh cradle 800 configured to support the patient's thighs, and a lower leg cradle 802 configured to support the patient's shins. Different sizes of thigh and lower leg cradles can be used to accommodate different sizes of patients, i.e., smaller thigh and lower leg cradles can be used with smaller patients, and larger thigh and lower leg cradles can be used with larger patients. Soft straps (not shown) can be used to secure the patient P to the thigh cradle 800 and the lower leg cradle 802. The thigh cradle 800 and the lower leg cradle 802 are moveable and pivotal with respect to one another and to the offset main beam 600. To facilitate rotation of the patient's hips, the thigh cradle 800 and the lower leg cradle 802 can be positioned anterior and inferior to the patient's hips.

As depicted in FIGS. 21, 22, 23, and 30, for example, a first support strut 804 and second support struts 806 are attached to the thigh cradle 800. Furthermore, third support struts 808 are attached to the lower leg cradle 802. The first support strut 804 is pivotally attached to the offset main beam 600 via a support plate 810 and a pin 812, and the second support struts 806 are pivotally attached to the third support struts 808 via pins 814. The pins 814 extend through angled end portions 816 and 818 of the second and third support struts 806 and 808, respectively. Furthermore, the lengths of second and third support struts 806 and 808 are adjustable to facilitate expansion and contraction of the lengths thereof.

To accommodate patients with different torso lengths, the position of the thigh cradle 800 can be adjustable by moving the plate 810 along the offset main beam 600. Furthermore, to accommodate patients with different thigh and lower leg lengths, the lengths of the second and third support struts 806 and 808 can be adjusted.

Figure 24:
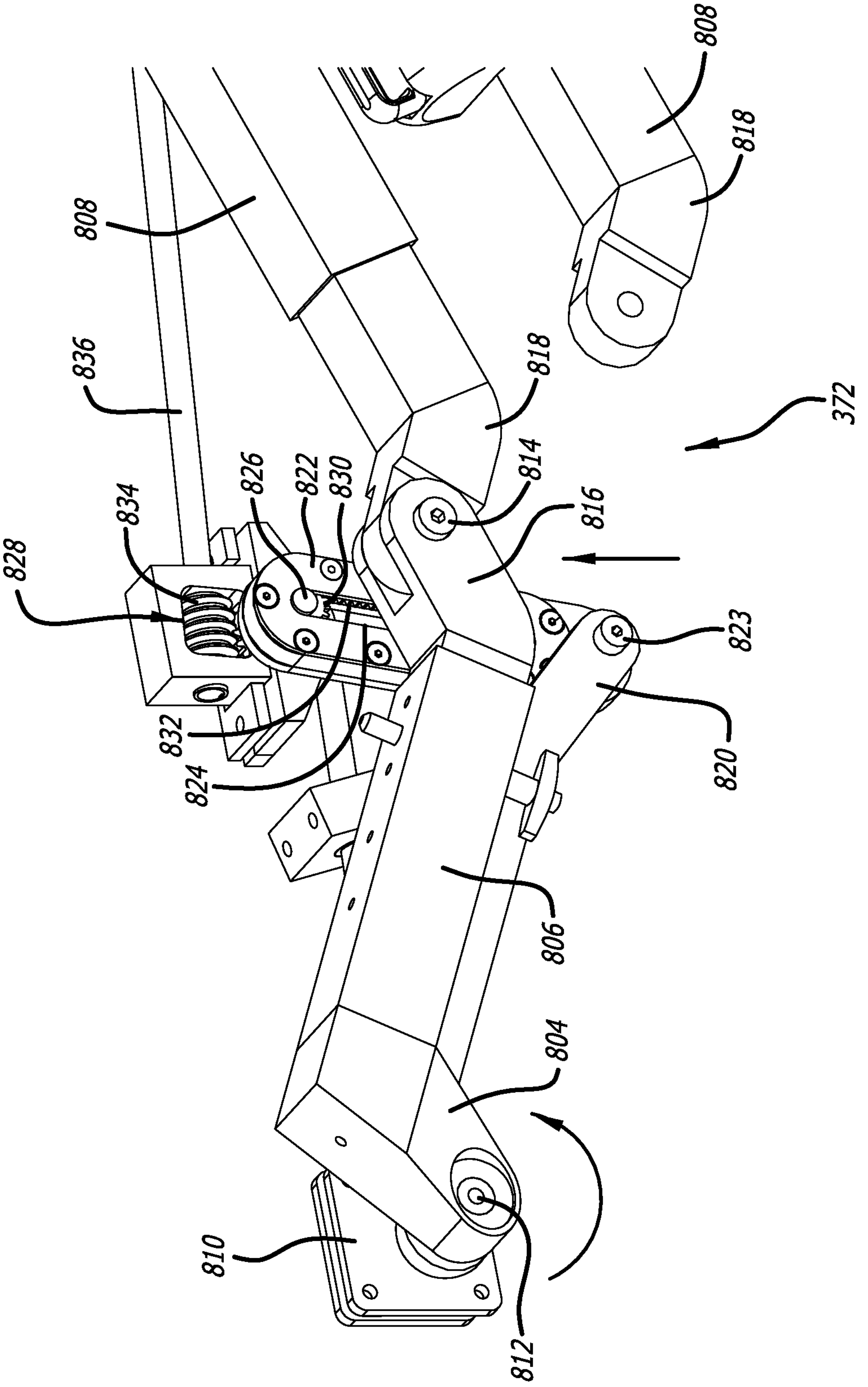
FIG. 24 is an enlarged perspective view of componentry of the pelvic-tilt mechanism.
Figure 25:
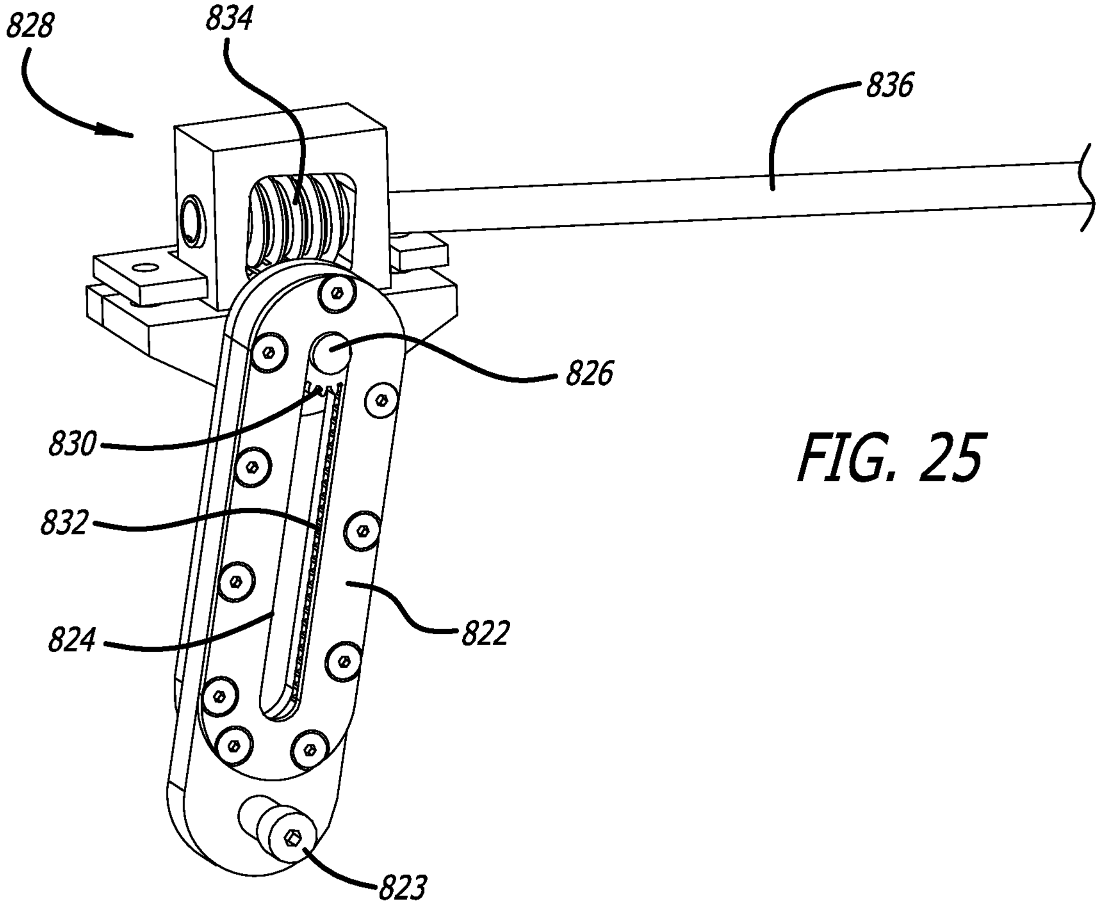
FIG. 25 is an enlarged perspective view of a captured rack and a worm gear assembly of the componentry of the pelvic-tilt mechanism.
Figure 26:
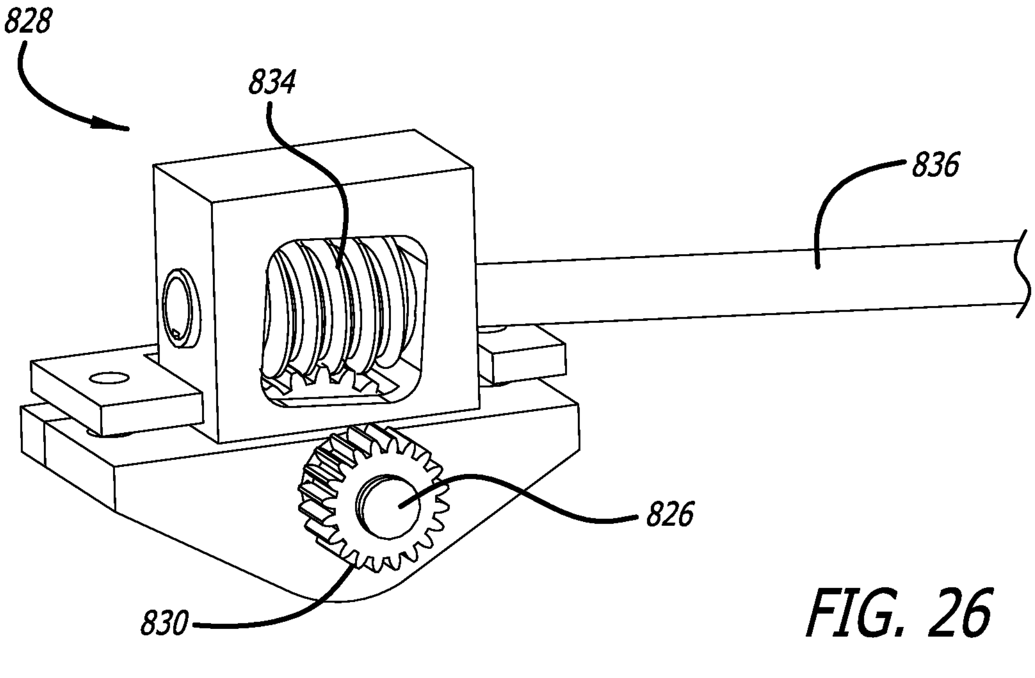
FIG. 26 is an enlarged perspective view of the worm gear assembly of FIG. 25.

To control the pivotal angle between the second and third struts 806 and 808 (and hence, the pivotal angle between the thigh cradle 800 and lower leg support 802), a link 820 is pivotally connected to a captured rack 822 via a pin 823. The captured rack 822 includes an elongated slot 824, through which is inserted a worm gear shaft 826 of a worm gear assembly 828. The worm gear shaft 826 is attached to a gear 830 provided on the interior of the captured rack 822. The gear 830 contacts teeth 832 provided inside the captured rack 822, and rotation of the gear 830 (via contact with the teeth 832) causes motion of the captured rack 822 upwardly and downwardly. The worm gear assembly 828, as depicted in FIGS. 24-26, for example, includes worm gears 834 which engage a drive shaft 836, and which are connected to the worm gear shaft 826.

The worm gear assembly 828 also is configured to function as a brake, which prevents unintentional movement of the sagittal adjustment assembly 370. Rotation of the drive shaft 836 causes rotation of the worm gears 834, thereby causing reciprocal vertical motion of the captured rack 822. The vertical reciprocal motion of the captured rack 822 causes corresponding motion of the link 820, which in turn pivots the second and third support struts 806 and 808 to correspondingly pivot the thigh cradle 800 and lower leg cradle 802. A servomotor (not shown) interconnected with the drive shaft 836 can be computer controlled and/or operated by the operator of the surgical frame 10' to facilitate controlled reciprocal motion of the captured rack 822.

The sagittal adjustment assembly 370 also includes the leg adjustment mechanism 373 facilitating articulation of the thigh cradle 800 and the lower leg cradle 802 with respect to one another. In doing so, the leg adjustment mechanism 373 accommodates the lengthening and shortening of the patient's legs during bending thereof. As depicted in FIG. 22, for example, the leg adjustment mechanism 373 includes a first bracket 850 and a second bracket 852 attached to the lower leg cradle 802. The first bracket 850 is attached to a first carriage portion 854, and the second bracket 852 is attached to a second carriage portion 856 via pins 862 and 864, respectively. The first carriage portion 854 is slidable within third portion 664 of the rear portion 642 of the offset main beam 600, and the second carriage portion 856 is slidable within the first portion 660 of the rear portion 642 of the offset main beam 600. An elongated slot 858 is provided in the first portion 660 to facilitate engagement of the second bracket 852 and the second carriage portion 856 via the pin 864. As the thigh cradle 800 and the lower leg cradle 802 articulate with respect to one another (and the patient's legs bend accordingly), the first carriage 854 and the second carriage 856 can move accordingly to accommodate such movement.

Figure 27:
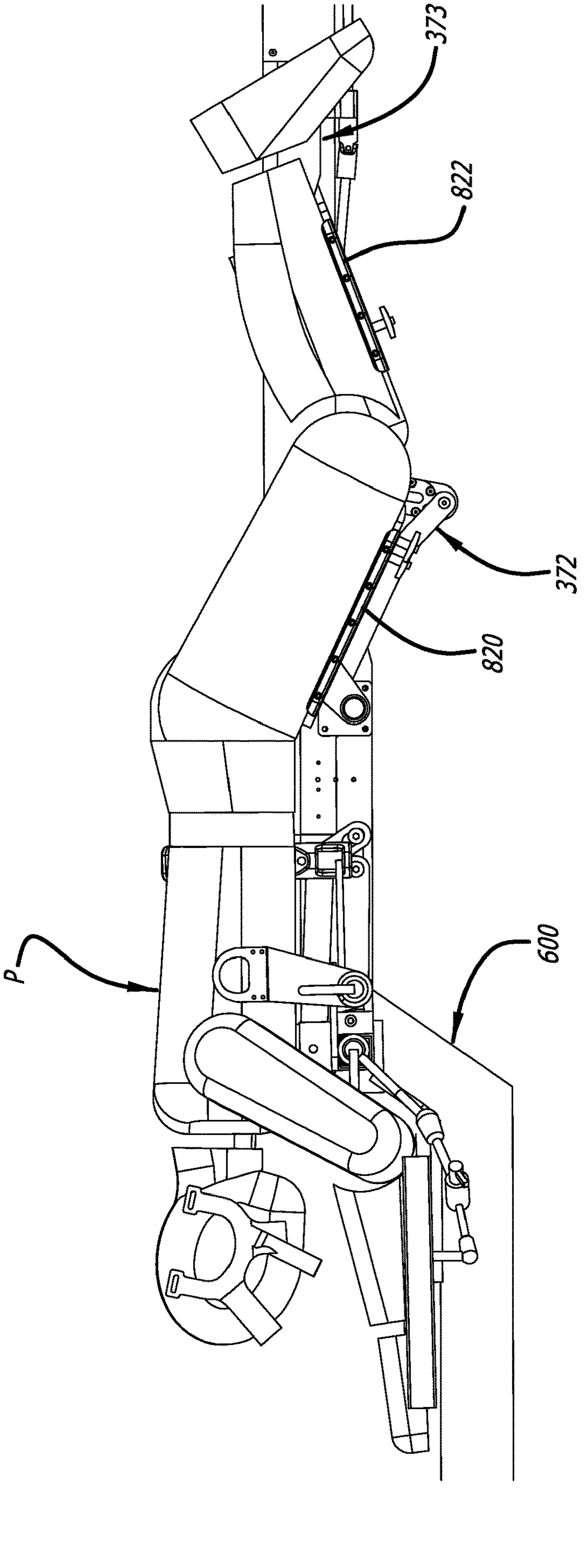
FIG. 27 is a side elevational view of portions of the surgical frame of FIG. 6 showing the patient positioned thereon and the pelvic-tilt mechanism of the sagittal adjustment assembly in the flexed position.
Figure 28:
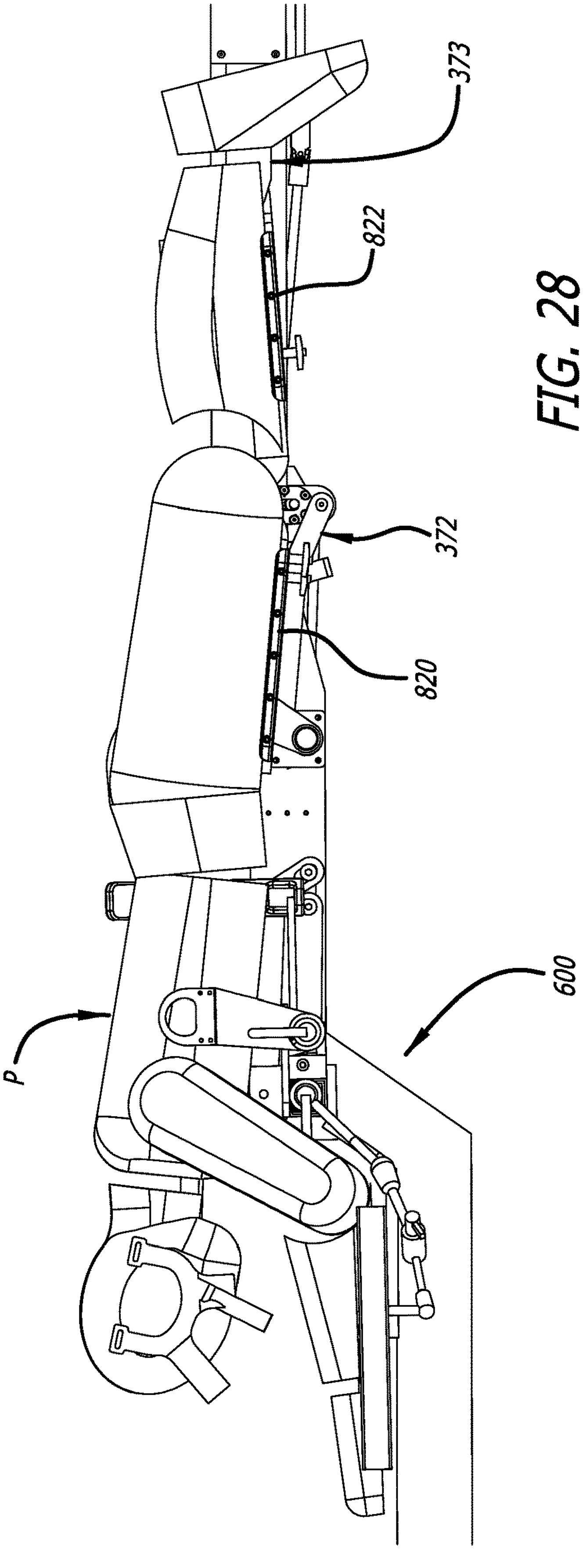
FIG. 28 is another side elevational view of portions of the surgical frame of FIG. 6 showing the patient positioned thereon and the pelvic-tilt mechanism of the sagittal adjustment assembly in the fully extended position.

The pelvic-tilt mechanism 372 is movable between a flexed position and a fully extended position. As depicted in FIG. 27, in the flexed position, the lumbar spine is hypolordosed. This opens the posterior boundaries of the lumbar vertebral bodies and allows for easier placement of any interbody devices. The lumbar spine stretches slightly in this position. As depicted in FIG. 28, in the extended position, the lumbar spine is lordosed. This compresses the lumbar spine. When posterior fixation devices, such as rods and screws are placed, optimal sagittal alignment can be achieved. During sagittal alignment, little to negligible angle change occurs between the thighs and the pelvis. The pelvic-tilt mechanism 372 also can hyper-extend the hips as a means of lordosing the spine, in addition to tilting the pelvis. One of ordinary skill will recognize, however, that straightening the patient's legs does not lordose the spine. Leg straightening is a consequence of rotating the pelvis while maintaining a fixed angle between the pelvis and the thighs.

The sagittal adjustment assembly 370, having the configuration described above, further includes an ability to compress and distract the spine dynamically while in the lordosed or flexed positions. The sagittal adjustment assembly 370 also includes safety stops (not shown) to prevent over-extension or compression of the patient, and sensors (not shown) programmed to send patient position feedback to the safety stops.

Figure 29:
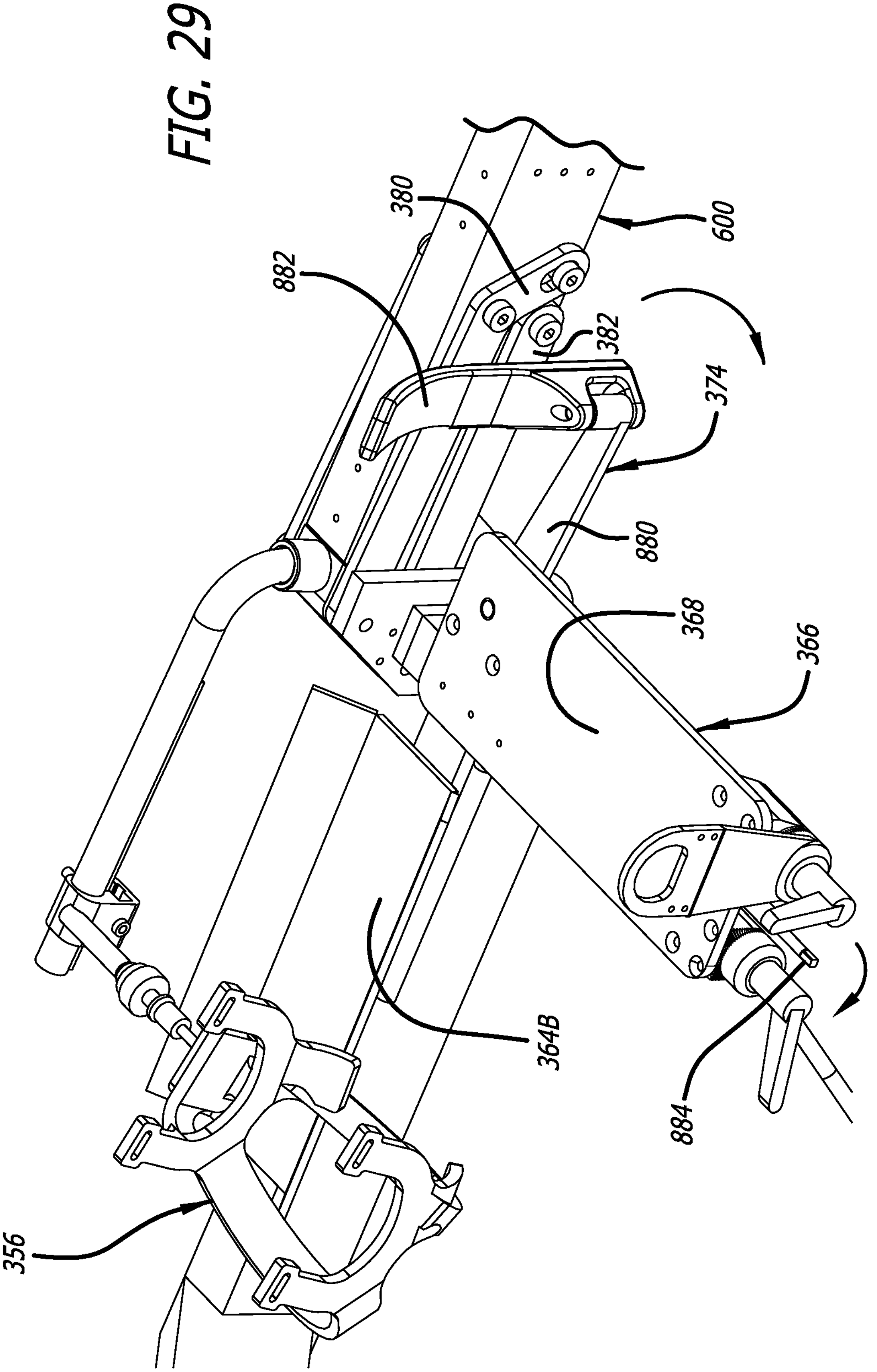
FIG. 29 is an enlarged top perspective view of portions of the surgical frame of FIG. 6 showing a coronal adjustment assembly.
Figure 30:
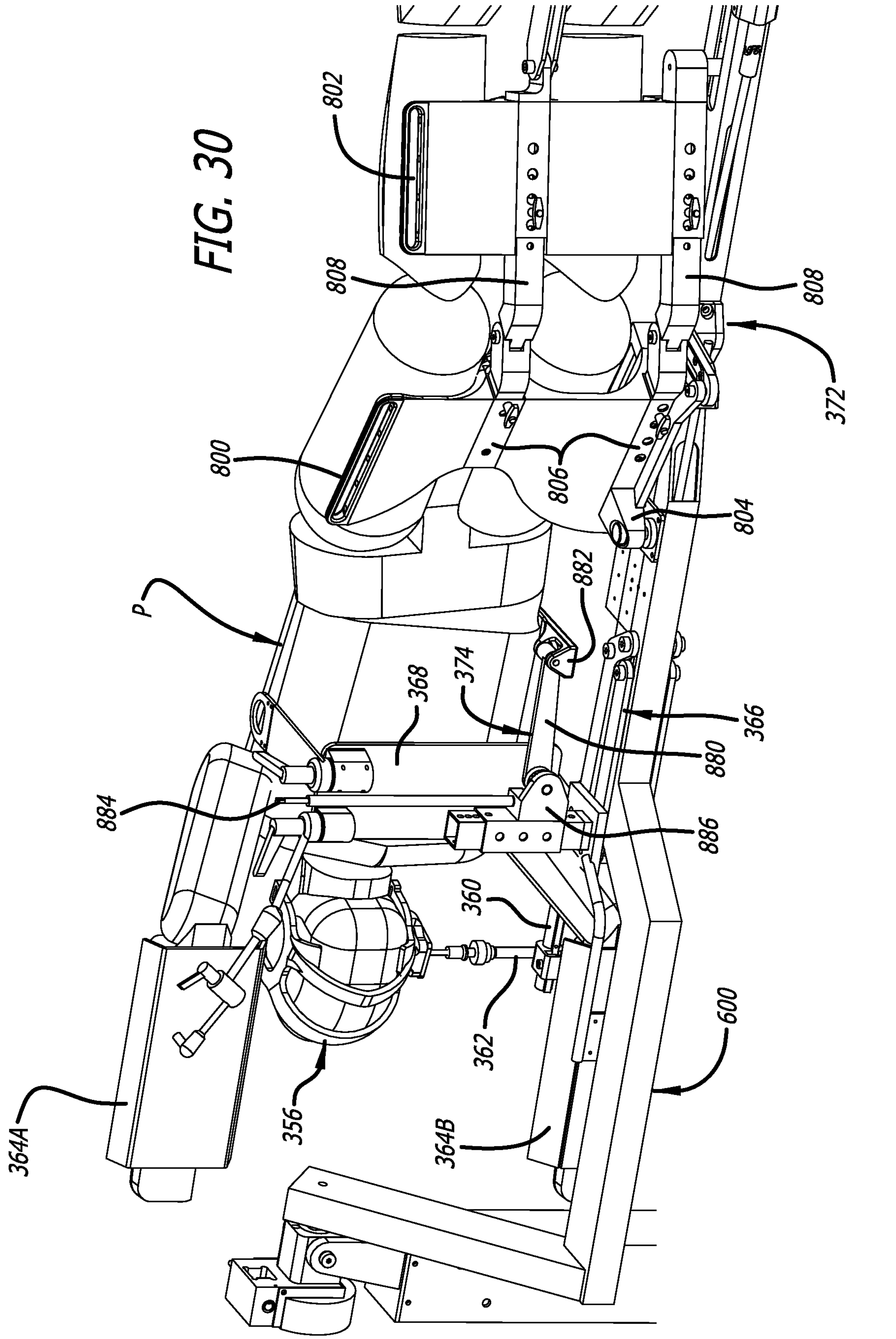
FIG. 30 is a bottom perspective view of portions of the surgical frame of FIG. 6 showing operation of the coronal adjustment assembly.
Figure 31:
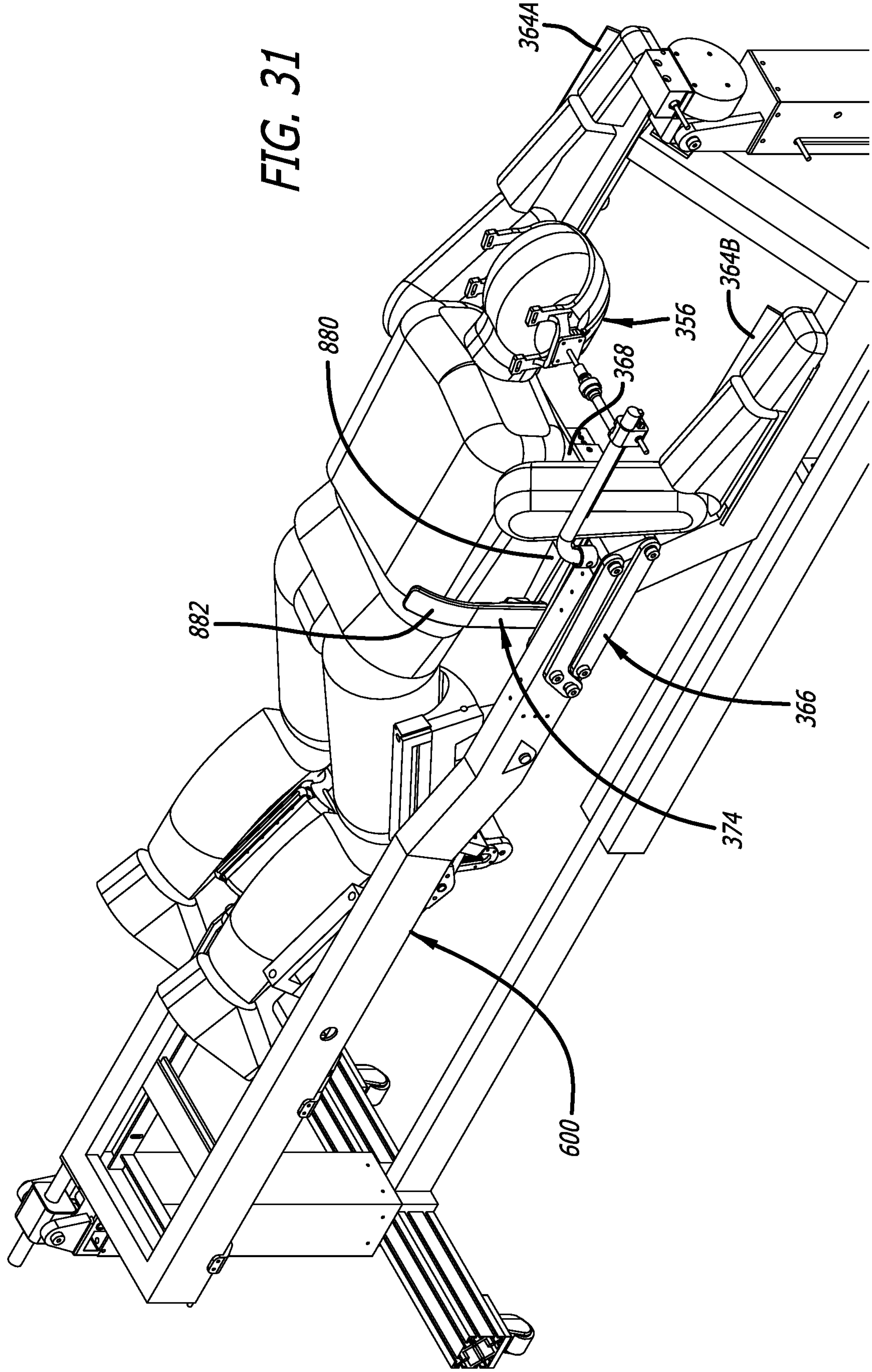
FIG. 31 is a top perspective view of portion of the surgical frame of FIG. 6 showing operation of the coronal adjustment assembly.

As depicted in FIGS. 29-31, for example, the coronal adjustment assembly 374 is configured to support and manipulate the patient's torso, and further to correct a spinal deformity, including but not limited to a scoliotic spine. As depicted in FIGS. 29-31, for example, the coronal adjustment assembly 374 includes a lever 880 linked to an arcuate radio-lucent paddle 882. As depicted in FIGS. 29 and 30, for example, a rotatable shaft 884 is linked to the lever 880 via a transmission 886, and the rotatable shaft 884 projects from an end of the chest support plate 368. Rotation of the rotatable shaft 884 is translated by the transmission 886 into rotation of the lever 880, causing the paddle 882, which is linked to the lever 880, to swing in an arc. Furthermore, a servomotor (not shown) interconnected with the rotatable shaft 884 can be computer controlled and/or operated by the operator of the surgical frame 10' to facilitate controlled rotation of the lever 880.

As depicted in FIG. 29, for example, adjustments can be made to the position of the paddle 882 to manipulate the torso and straighten the spine. As depicted in FIG. 30, when the offset main beam 600 is positioned such that the patient P is positioned in a lateral position, the coronal adjustment assembly 374 supports the patient's torso. As further depicted in FIG. 31, when the offset main beam 600 is positioned such that the patient P is positioned in a prone position, the coronal adjustment assembly 374 can move the torso laterally, to correct a deformity, including but not limited to a scoliotic spine. When the patient is strapped in via straps (not shown) at the chest and legs, the torso is relatively free to move and can be manipulated. Initially, the paddle 882 is moved by the lever 880 away from the offset main beam 600. After the paddle 882 has been moved away from the offset main beam 600, the torso can be pulled with a strap towards the offset main beam 600. The coronal adjustment assembly 374 also includes safety stops (not shown) to prevent over-extension or compression of the patient, and sensors (not shown) programmed to send patient position feedback to the safety stops.

Preferably the surgical frames further can be used in association with a traditional surgical table by placing the surgical frames on top of the surgical table. The surgical frames preferably could be secured to the surgical table via straps, clamps, or other fastening device to ensure the surgical frames do not inadvertently move relative to the surgical table.

Other embodiments of the invention will be apparent to those skilled in the art from consideration of the specification and practice of the invention disclosed herein.

In one embodiment, external tooling devices can be provided, adapted either to be hand-held by a surgeon or to be applied from an external frame not connected to the surgical frames, for the purpose of a combination of surgical frame position, dual or simultaneous access, and applying controlled forces to specific aspects of instrumentation or inserted tools during a surgery. The surgical frames can change the 360° of global body position and can add vectors of forces with the head support, arm supports, the torso-lift supports, the sagittal adjustment assembly, and the coronal adjustment assembly. For example, during application of the sagittal adjustment assembly for performance of an osteotomy on a patient, constraint of fixation points on one side of the osteotomy by the external frame, or by hand by the surgeon, results in the vectors of forces acting together to reduce the osteotomy, to improve the sagittal plane, to reduce risk to the patient, and to maximize corrections. Through the use of live imaging, such as OKI live imaging, which is well known in the art, the change of angulation, pelvic parameters, and global alignment can be seen in real time while the vectors of forces are applied for reduction of the osteotomy.

In one embodiment, the surgeon can hold tools that modulate instrumentation in concert with actions of the surgical frames, and in concert with real-time computer-generated data of sagittal balance. Movement of the surgical frames can be controlled by robotic arms, combined with computer oversight, rather than being controlled directly by the surgeon. In this embodiment, the surgical frame movement, the movement of the robotic arms, and the input by the surgeon, together create a real-time dynamic sagittal plane correction that is predetermined by preoperative measurements.

For example, if it is determined that a 30° correction of lumbar lordosis is required, after the surgeon has made approaches connecting the robotic arms to a simultaneous access, a feedback loop between the surgical frames and the robotic arms gives the surgeon an ability to "dial-in" 30° of lordosis at the L4-L5 lumbar spine vertebrae, and the computer drives the surgical frames and the robotic arms in harmony to make this exact change, under the observation and guidance of the surgeon.

In one embodiment, the surgical table provides an option for the surgeon to perform separate surgeries on a single patient at the same time, rather than performing the surgeries at different times.

For example, in a case of a patient having a cervical degenerative disc disease ("DDD") or deformity, and a lumbar DDD or deformity, such patient often elects two separate surgeries. The surgical frames enable the surgeon to operate initially, for example, on the cervical DDD or deformity, flip the patient, and next operate on the lumbar DDD or deformity, or else to operate initially on the lumbar DDD or deformity, flip the patient, and next operate on the cervical DDD or deformity. Alternately, the surgical frames enable the surgeon to rotate the patient to a single position, and perform surgery on both the lumbar DDD or deformity, and the cervical DDD or deformity, via the same point of access.

It is intended that the specification and examples be considered as exemplary only, with a true scope and spirit of the invention being indicated by the following claims.

We claim:

1. A method for manipulating a patient by a surgical frame supporting the patient, the method comprising:

supporting a first portion of a single main beam of the surgical frame at a first main-beam end by a first support structure provided at a first end of the surgical frame;

supporting a second portion of the single main beam of the surgical frame at a second main-beam end by a second support structure provided at a second end of the surgical frame;

supporting a third portion of the single main beam between the first portion and the second portion, the third portion including a first side;

spacing the single main beam from the ground via support of the single main beam between the first support structure and the second support structure;

supporting a portion of a chest of the patient on the single main beam by supporting the portion of the chest on a torso support attached to the first side portion of the single main beam;

supporting a portion of legs of the patient on the single main beam by supporting the portion of the legs on a pelvic support attached to the first side of the single main beam; and rotating the patient supported by rotating the single main beam about an axis of rotation extending through portions of the first portion of the single main beam, the second portion of the single main beam, the first support structure, and the second support structure;

wherein the first portion of the single main beam extends at least in part in a first direction transverse to the axis of rotation, the second portion of the single main beam extends at least in part in a second direction transverse to the axis of rotation, and the third portion of the single main beam is offset from the axis of rotation of the single main beam by the first portion and the second portion of the single main beam;

wherein a first relational plane extends perpendicular to the axis of rotation and between the torso support and the pelvic support, and a second relational plane is parallel to the axis of rotation and perpendicular to the first relational plane, the second relational plane extending along portions of the single main beam and being proximate the first side of the third portion lying within the first relational plane, the second relational plane being on a first side of a cranial-caudal axis of the patient by the torso support and the pelvic support; and wherein no portion of the positioning frame being used to support the patient that is rotatable about the axis of rotation and located within the first relational plane being on a second side of the cranial-caudal axis of the patient opposite the first side.

2. The method of claim 1, wherein the torso support includes a chest support being configured to support the chest of the patient, and the chest support is pivotally moveable with respect to the single main beam; and further comprising pivoting the chest support to move the chest of the patient between a first unlifted position and a second lifted position.

3. The method of claim 2, further comprising a head support and arm supports connected to the chest support, the head support and the arm supports being configured to support a head and arms of the patient during pivotal movement of the chest support.

4. The method of claim 1, wherein the pelvic support includes a thigh cradle and a lower leg cradle, the thigh cradle is configured to support thighs of the patient, the lower leg cradle is configured to support lower legs of the patient, and the thigh cradle and the lower leg cradle are pivotal with respect to one another to facilitate adjustment of hips of the patient; and further comprising pivoting one of the lower leg cradle and the upper leg cradle to move the hips between a first adjusted position and a second adjusted position.

5. The method of claim 4, wherein the pelvic support is configured to manipulate the patient to open at least one space between adjacent vertebral bodies of the patient to facilitate placement of an interbody device in the at least one space.

6. The method of claim 1, further comprising at least one actuator for articulating at least one of the single main beam, the torso support, and the pelvic support.

7. The method of claim 1, wherein the third portion of the single main beam includes a portion substantially parallel to the axis of rotation of the single main beam.

8. The method of claim 1, wherein, during rotation of the single main beam, the single main beam is configured to support the patient in a prone position in a first rotational position thereof, and is configured to support the patient in a lateral position in a second rotational position thereof.

9. A method for manipulating a patient by a surgical frame supporting the patient, the method comprising:

supporting a first portion of a single main beam of the surgical frame at a first main-beam end by a first support structure provided at a first end of the surgical frame;

supporting a second portion of the single main beam of the surgical frame at a second main-beam end by a second support structure provided at a second end of the surgical frame;

supporting a third portion of the single main beam between the first portion and the second portion, the third portion including a first side;

spacing the single main beam from the ground via support of the single main beam between the first support structure and the second support structure;

supporting a portion of a chest of the patient on the single main beam by supporting the portion of the chest on a torso support attached to the first side portion of the single main beam;

supporting a portion of legs of the patient on the single main beam by supporting the portion of the legs on a pelvic support attached to the first side of the single main beam; and rotating the patient supported by rotating the single main beam about an axis of rotation between at least a first rotational position of the single main beam with the patient in a prone position, and a second rotational position of the single main with the patient in a lateral position, the axis of rotational extending through portions of the first portion of the single main beam, the second portion of the single main beam, the first support structure, and the second support structure;

wherein the third portion of the single main beam is offset from the axis of rotation of the single main beam by the first portion and the second portion of the single main beam;

wherein a first relational plane extends perpendicular to the axis of rotation and between the torso support and the pelvic support, and a second relational plane is parallel to the axis of rotation and perpendicular to the first relational plane, the second relational plane extending along portions of the single main beam and being proximate the first side of the third portion lying within the first relational plane, the second relational plane being on a first side of a cranial-caudal axis of the patient by the torso support and the pelvic support; and wherein no portion of the positioning frame being used to support the patient that is rotatable about the axis of rotation and located within the first relational plane being on a second side of the cranial-caudal axis of the patient opposite the first side.

10. The method of claim 9, wherein the torso support includes a chest support being configured to support the chest of the patient, and the chest support is pivotally moveable with respect to the single main beam; and further comprising pivoting the chest support to move the chest of the patient between a first unlifted position and a second lifted position.

11. The method of claim 10, further comprising a head support and arm supports connected to the chest support, the head support and the arm supports being configured to support a head and arms of the patient during pivotal movement of the chest support.

12. The method of claim 9, wherein the pelvic support includes a thigh cradle and a lower leg cradle, the thigh cradle is configured to support thighs of the patient, the lower leg cradle is configured to support lower legs of the patient, and the thigh cradle and the lower leg cradle are pivotal with respect to one another to facilitate adjustment of hips of the patient; and further comprising pivoting one of the lower leg cradle and the upper leg cradle to move the hips between a first adjusted position and a second adjusted position.

13. The method of claim 12, wherein the pelvic support is configured to manipulate the patient to open at least one space between adjacent vertebral bodies of the patient to facilitate placement of an interbody device in the at least one space.

14. The method of claim 9, further comprising at least one actuator for articulating at least one of the single main beam, the torso support, and the pelvic support.

15. The method of claim 9, wherein the third portion of the single main beam includes a portion substantially parallel to the axis of rotation of the single main beam.

16. A method for manipulating a patient by a surgical frame supporting the patient, the method comprising:

supporting a first portion of a single main beam of the surgical frame at a first main-beam end by a first support structure provided at a first end of the surgical frame;

supporting a second portion of the single main beam of the surgical frame at a second main-beam end by a second support structure provided at a second end of the surgical frame;

supporting a third portion of the single main beam between the first portion and the second portion, the third portion including a first side;

spacing the single main beam from the ground via support of the single main beam between the first support structure and the second support structure;

supporting the patient on the single main beam by at least one patient support structure attached to the first side portion of the single main beam; and rotating the patient supported by rotating the single main beam about an axis of rotation between at least a first rotational position of the single main beam with the patient in a prone position, and a second rotational position of the single main with the patient in a lateral position, the axis of rotational extending through portions of the first portion of the single main beam, the second portion of the single main beam, the first support structure, and the second support structure;

wherein the third portion of the single main beam is offset from the axis of rotation of the single main beam by the first portion and the second portion of the single main beam;

wherein a first relational plane extends perpendicular to the axis of rotation and between the torso support and the pelvic support, and a second relational plane is parallel to the axis of rotation and perpendicular to the first relational plane, the second relational plane extending along portions of the single main beam and being proximate the first side of the third portion lying within the first relational plane, the second relational plane being on a first side of a cranial-caudal axis of the patient by the torso support and the pelvic support; and wherein no portion of the positioning frame being used to support the patient that is rotatable about the axis of rotation and located within the first relational plane being on a second side of the cranial-caudal axis of the patient opposite the first side.

17. The method of claim 16, wherein the at least one patient support includes a torso support including a chest support being configured to support the chest of the patient, and the chest support is pivotally moveable with respect to the single main beam; and further comprising pivoting the chest support to move the chest of the patient between a first unlifted position and a second lifted position.

18. The method of claim 17, further comprising a head support and arm supports connected to the chest support, the head support and the arm supports being configured to support a head and arms of the patient during pivotal movement of the chest support.

19. The method of claim 16, wherein the at least one patient support includes a pelvic support including a thigh cradle and a lower leg cradle, the thigh cradle is configured to support thighs of the patient, the lower leg cradle is configured to support lower legs of the patient, and the thigh cradle and the lower leg cradle are pivotal with respect to one another to facilitate adjustment of hips of the patient; and further comprising pivoting one of the lower leg cradle and the upper leg cradle to move the hips between a first adjusted position and a second adjusted position.

20. The method of claim 19, wherein the pelvic support is configured to manipulate the patient to open at least one space between adjacent vertebral bodies of the patient to facilitate placement of an interbody device in the at least one space.

* * * * *